(12) United States Patent
Kakinuma et al.

(10) Patent No.: US 6,744,471 B1
(45) Date of Patent: Jun. 1, 2004

(54) ELECTRONIC CAMERA THAT SYNTHESIZES TWO IMAGES TAKEN UNDER DIFFERENT EXPOSURES

(75) Inventors: Minoru Kakinuma, Hachioji (JP);
Hidetoshi Fukuda, Yokohama (JP);
Hiroaki Koseki, Kokubunji (JP);
Osamu Inagaki, Hachioji (JP);
Kuniaki Saito, Tokorozawa (JP)

(73) Assignee: Olympus Optical Co., LTD, Tokyo (JP)

( * ) Notice: Subject to any disclaimer, the term of this patent is extended or adjusted under 35 U.S.C. 154(b) by 0 days.

(21) Appl. No.: 09/204,276

(22) Filed: Dec. 3, 1998

(30) Foreign Application Priority Data

Dec. 5, 1997 (JP) ............................................. 9-350185
Dec. 11, 1997 (JP) ............................................. 9-361661
Feb. 16, 1998 (JP) ........................................... 10-048594

(51) Int. Cl.$^7$ ......................... G03B 9/70; H04N 5/222; H04N 5/225
(52) U.S. Cl. ................. 348/371; 348/216.1; 348/218.1; 396/166
(58) Field of Search .................... 548/370, 371, 548/216.1, 217.1, 296, 218.1; 396/61, 160, 173, 322, 182; 382/159, 161, 166

(56) References Cited

U.S. PATENT DOCUMENTS

| | | | | |
|---|---|---|---|---|
| 4,467,248 A | * | 8/1984 | Watanabe et al. ......... 315/241 P |
| 4,647,975 A | * | 3/1987 | Alston et al. ............. 348/222.1 |
| 5,111,116 A | * | 5/1992 | Takeda ..................... 315/241 P |
| 5,115,169 A | * | 5/1992 | Aoki ........................ 315/241 R |
| 5,148,212 A | * | 9/1992 | Serikawa et al. .............. 396/61 |
| 5,282,042 A | * | 1/1994 | Yoshida et al. .............. 348/367 |
| 5,420,635 A | * | 5/1995 | Konishi et al. .............. 348/362 |
| 5,640,622 A | * | 6/1997 | Matsui et al. ................ 396/173 |
| 5,640,624 A | * | 6/1997 | Lee ............................. 396/205 |
| 5,682,201 A | * | 10/1997 | Ogawa ..................... 348/224.1 |
| 5,835,794 A | * | 11/1998 | Lo et al. ......................... 396/4 |
| 5,946,035 A | * | 8/1999 | Suh ............................. 348/371 |
| 6,195,127 B1 | * | 2/2001 | Sugimoto .................... 348/370 |
| 6,278,490 B1 | * | 8/2001 | Fukuda et al. .............. 348/362 |

FOREIGN PATENT DOCUMENTS

| | | | | |
|---|---|---|---|---|
| JP | 02100028 A | * | 4/1990 | ........... G03B/15/05 |
| JP | 02125573 | | 5/1990 | |
| JP | 02125573 A | * | 5/1990 | ........... H04N/5/225 |

(List continued on next page.)

*Primary Examiner*—Wendy R. Garber
*Assistant Examiner*—John M. Villecco
(74) *Attorney, Agent, or Firm*—Westerman, Hattori, Daniels & Adrian, LLP

(57) ABSTRACT

Disclosed herein is an electronic camera for generating an image having a wide dynamic range by synthesizing two image pickup signals of different exposure amount generated by using an electronic shutter function and means for shutting off light, shading of image pickup signals resulting from difference in charge accumulating time among the pixels of image pickup device due to operation from opened state to closed state of the means for shutting off light being corrected by a shading correction means to form a synthesized image without an occurrence of false color due to shading. Also provided is an electronic camera generating two image pickup signals of different exposure amount by two shots of picture taking each using a flash emission in combination, at least one of an electronic shutter of image pickup device and means for shutting off light, as well as an emission of the flash emission means, being controlled to equalize between the two shots of picture taking ratio of exposure by normal light excluding light from the flash emission means and ratio of emission amount by the light from the flash emission means so that the two image pickup signals can be readily generated as having a predetermined exposure amount ratio in every part of a frame of picture even when a flash emission is used in combination.

57 Claims, 31 Drawing Sheets

FOREIGN PATENT DOCUMENTS

| | | | | |
|---|---|---|---|---|
| JP | 04207581 | 7/1992 | | |
| JP | 04207581 A * | 7/1992 | .......... | H04N/5/235 |
| JP | 06141229 | 5/1994 | | |
| JP | 06141229 A * | 5/1994 | .......... | H04N/5/235 |
| JP | 07131708 | 5/1995 | | |
| JP | 07131708 A * | 5/1995 | .......... | H04N/5/202 |
| JP | 11234550 A * | 8/1999 | .......... | H04N/5/232 |
| JP | 11252451 A * | 9/1999 | .......... | H04N/5/235 |

* cited by examiner

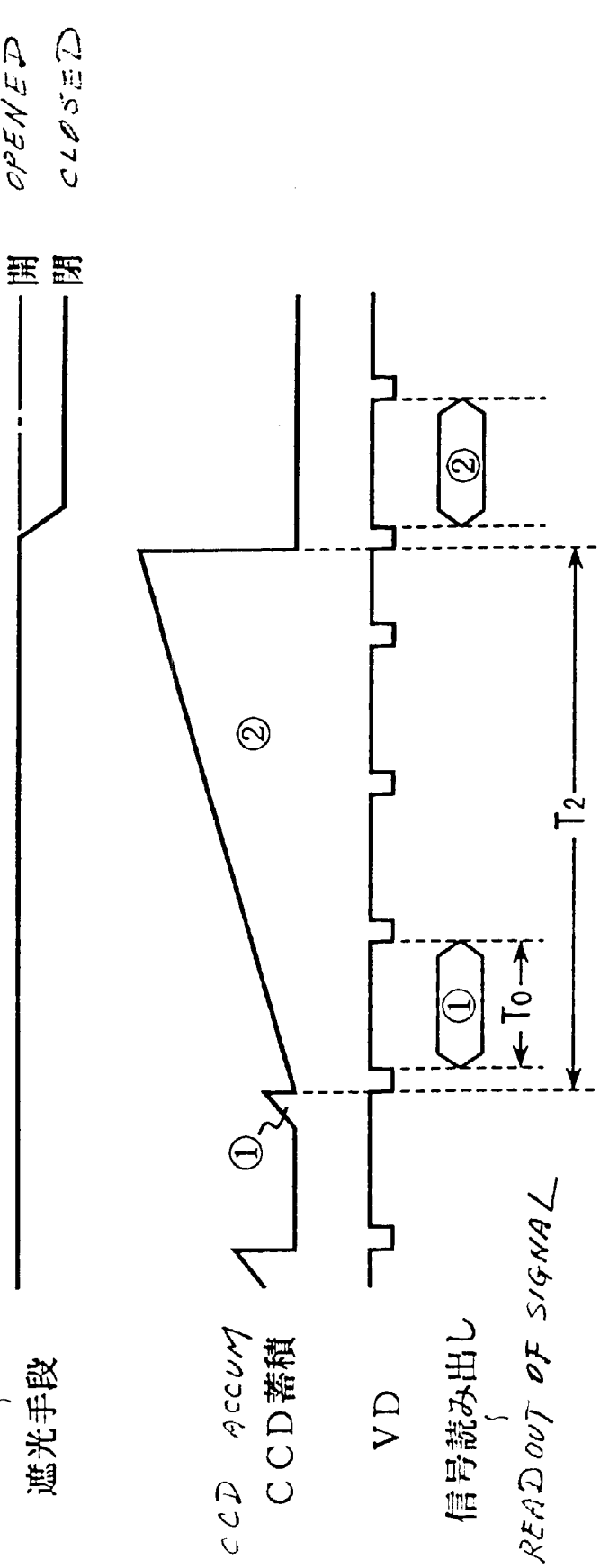

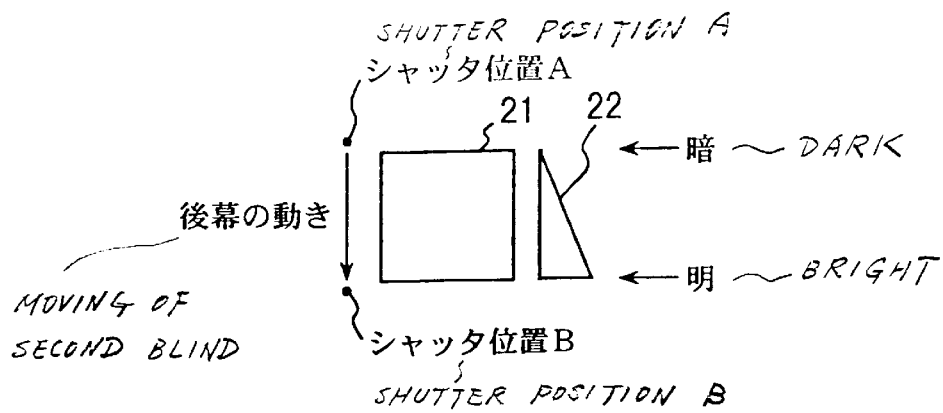
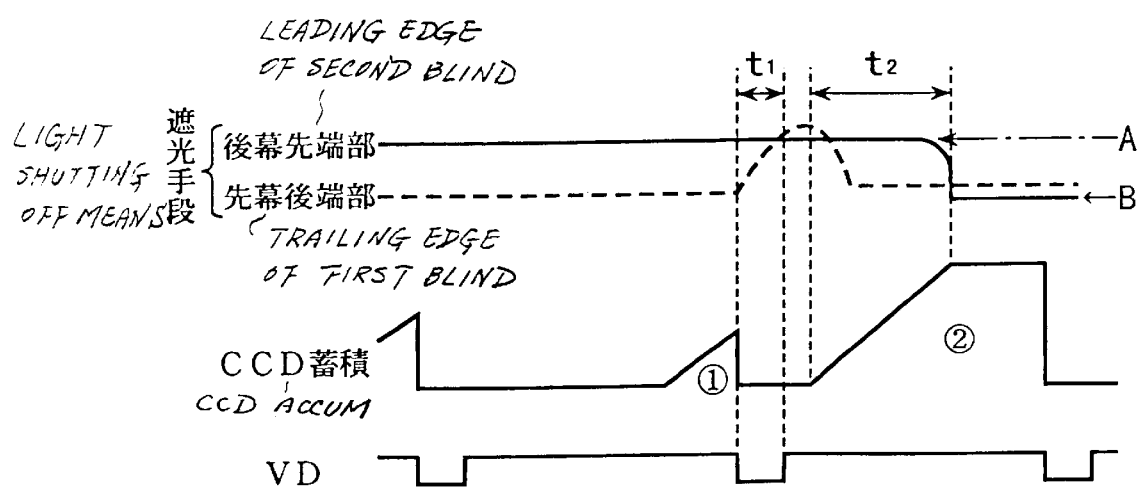

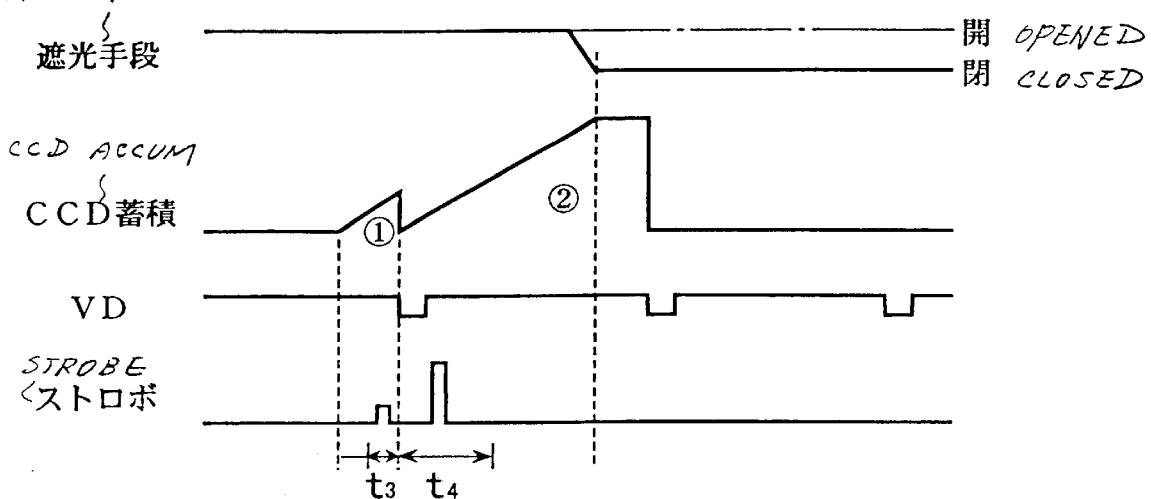

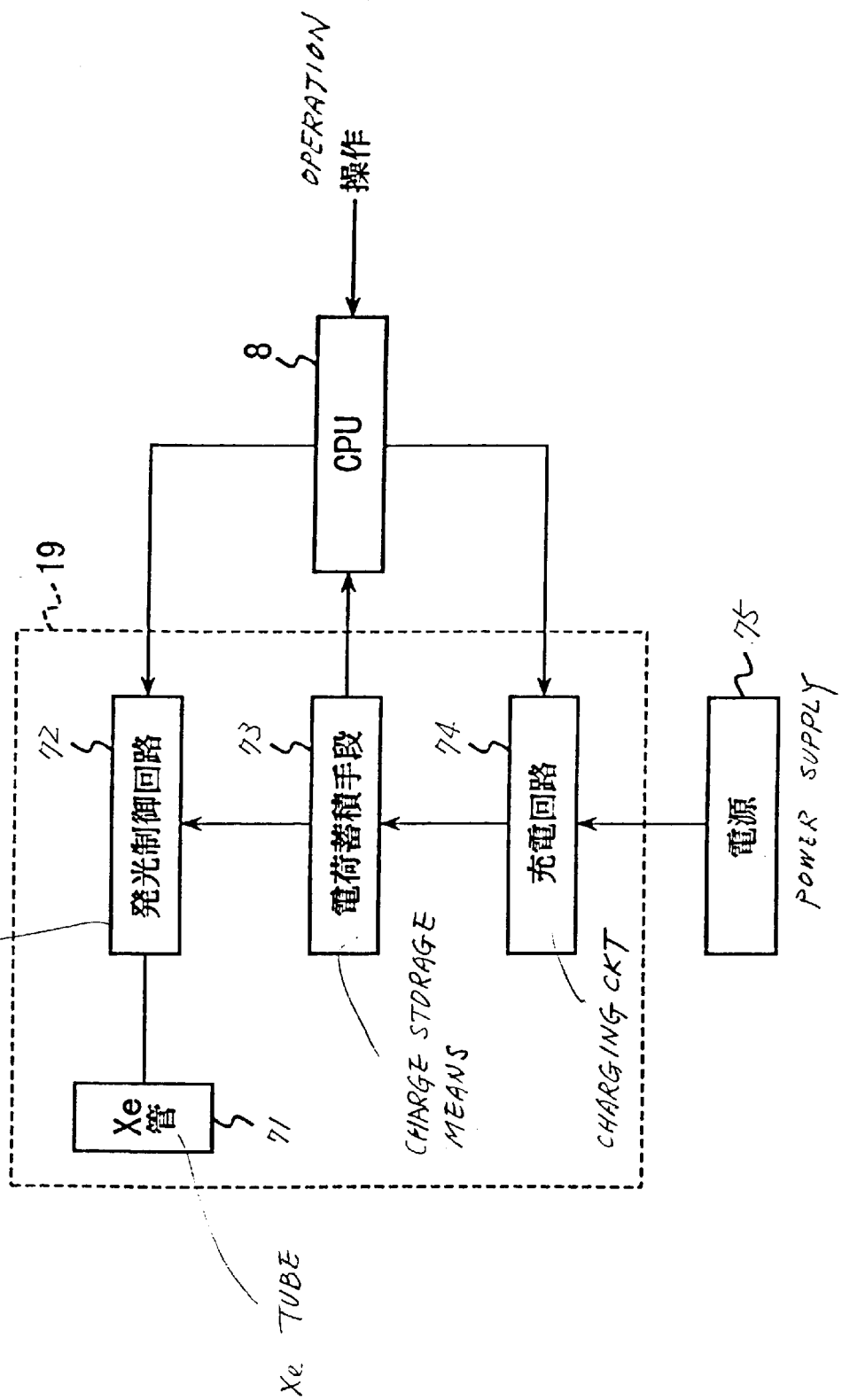

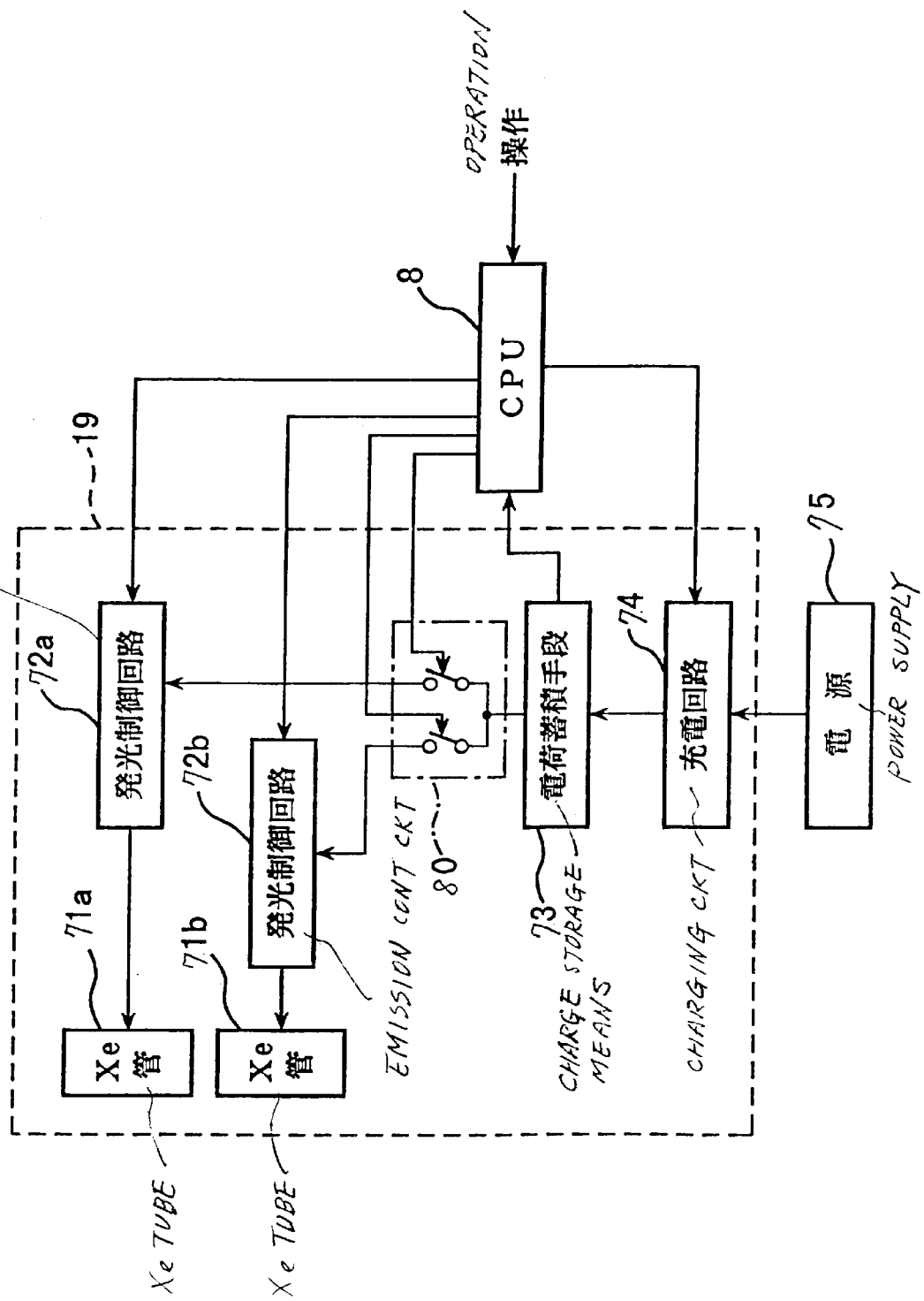

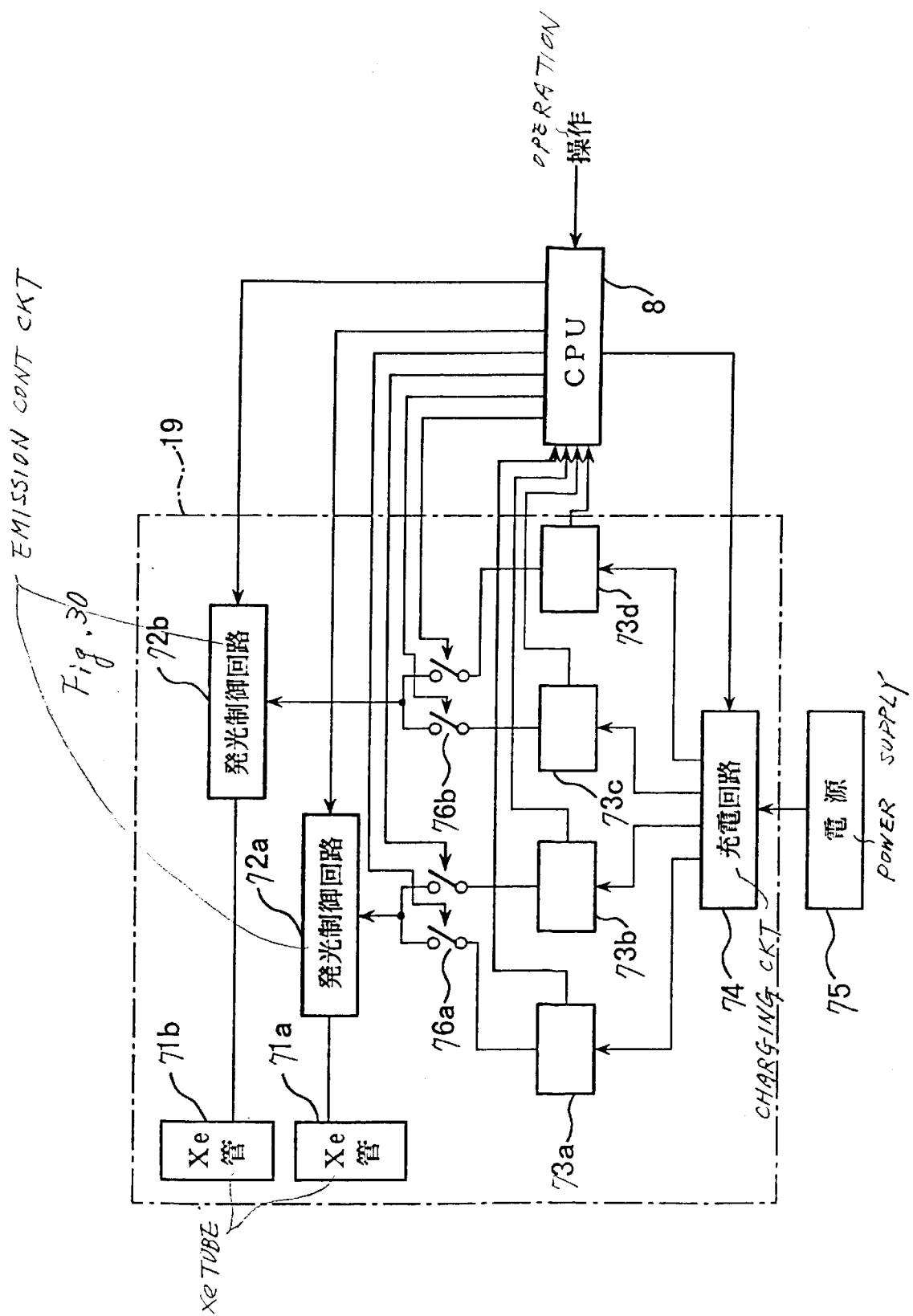

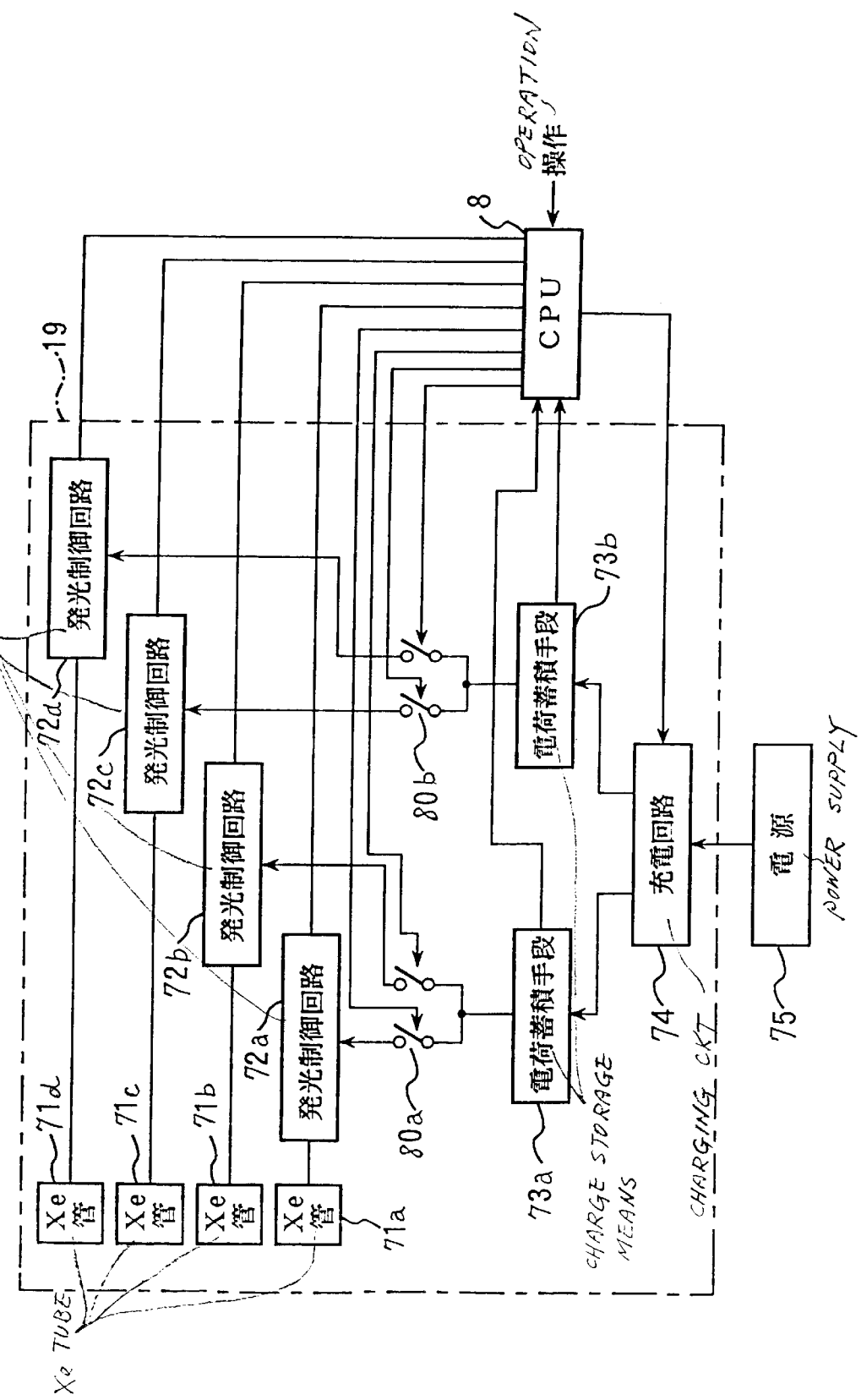

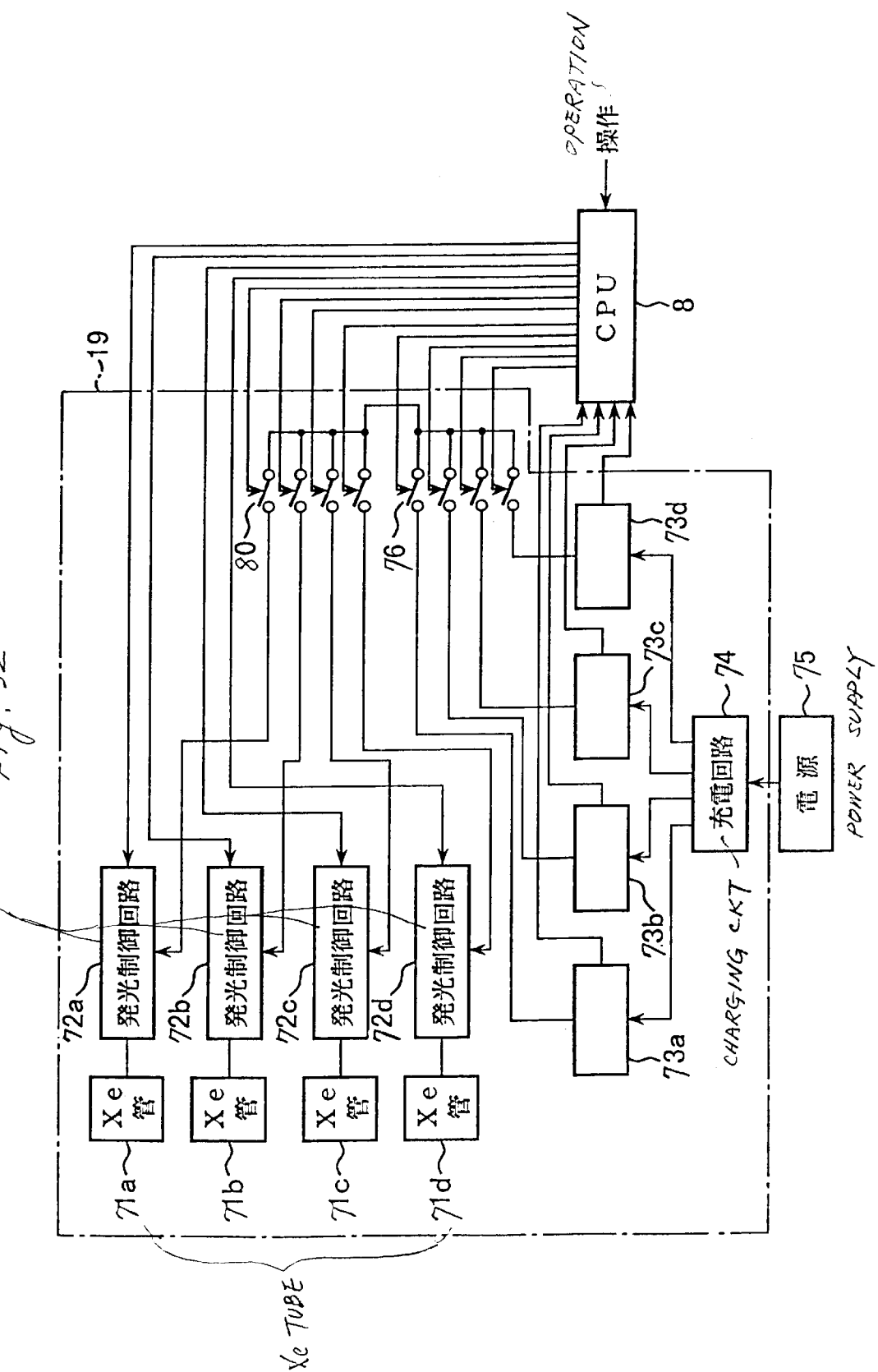

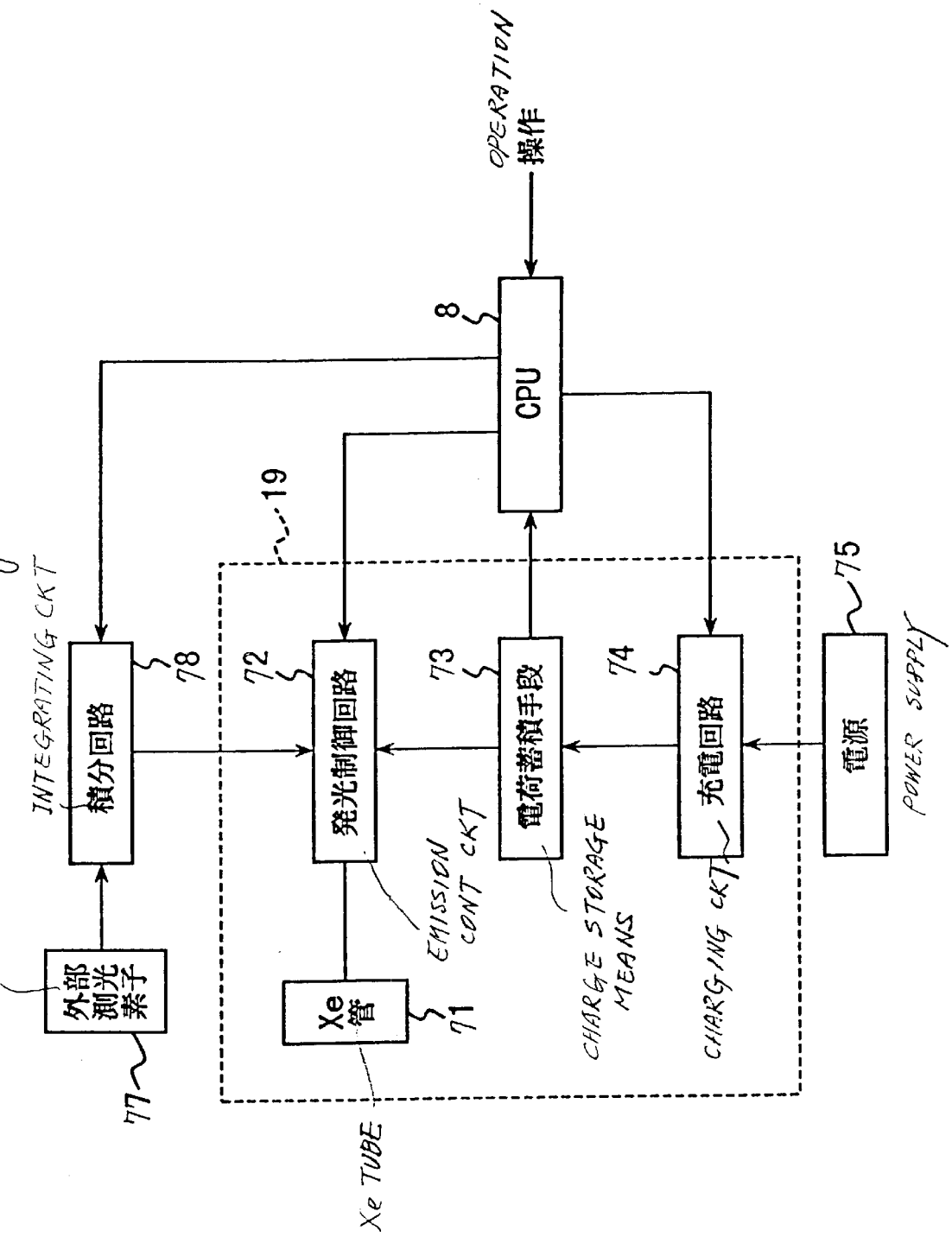

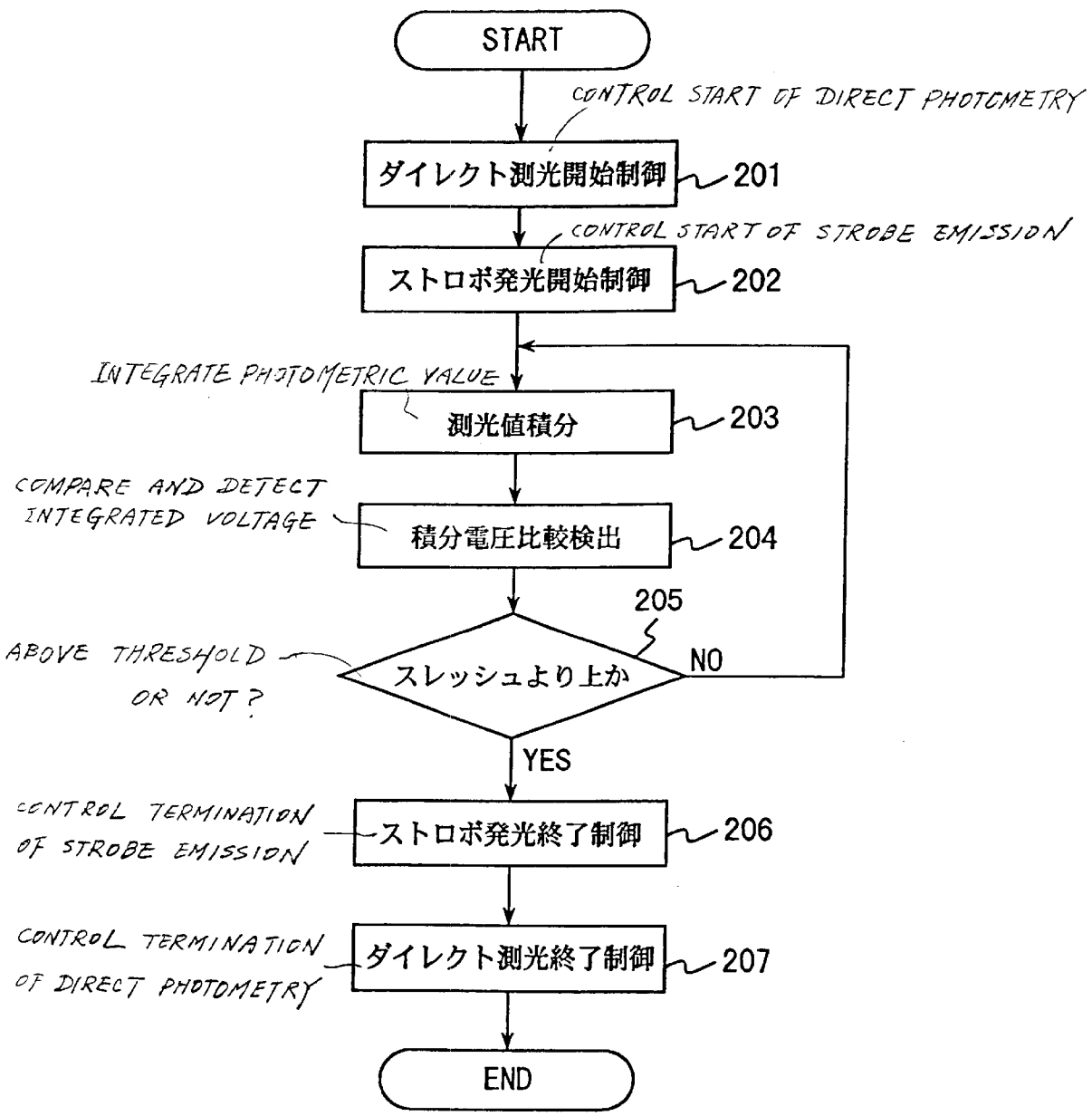

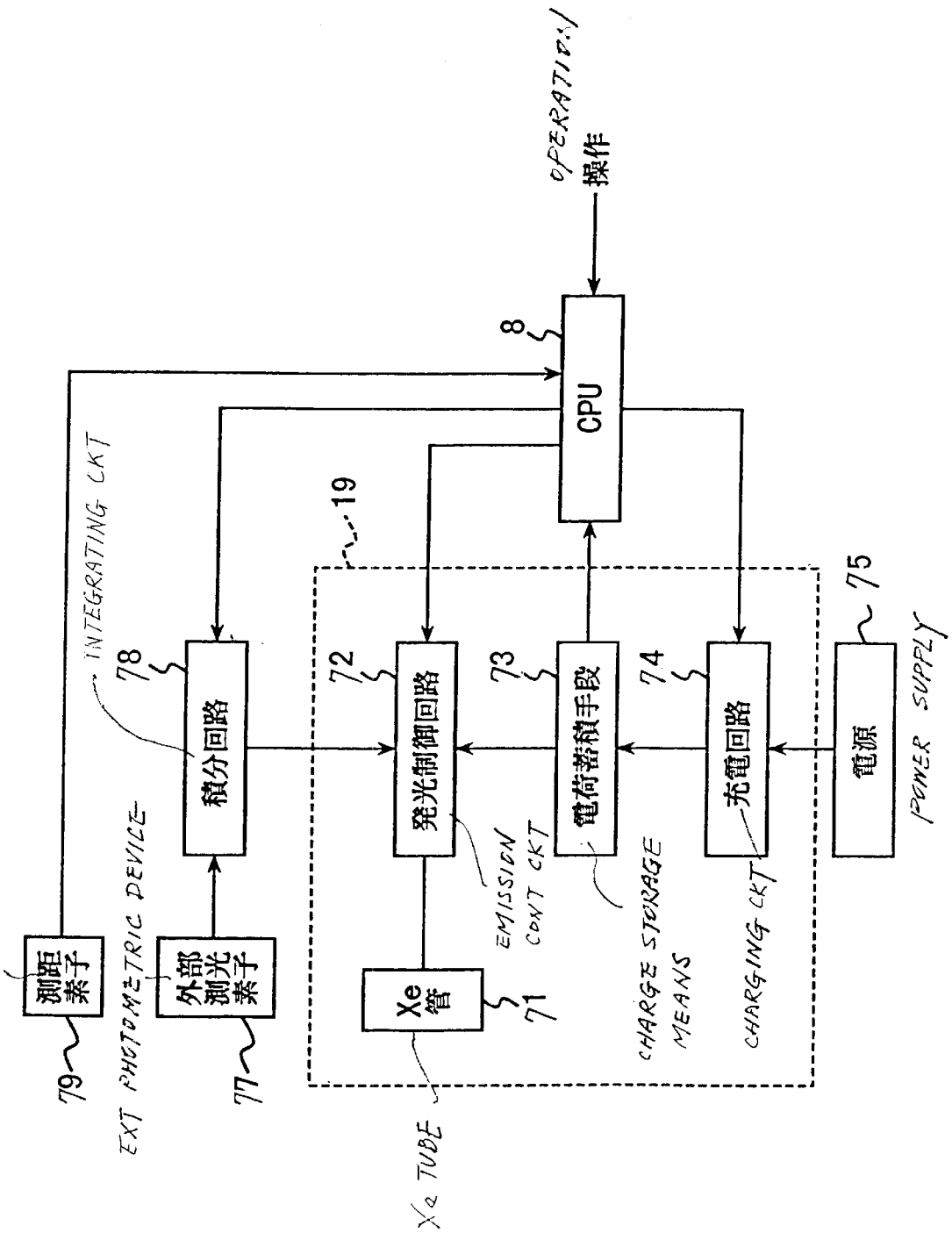

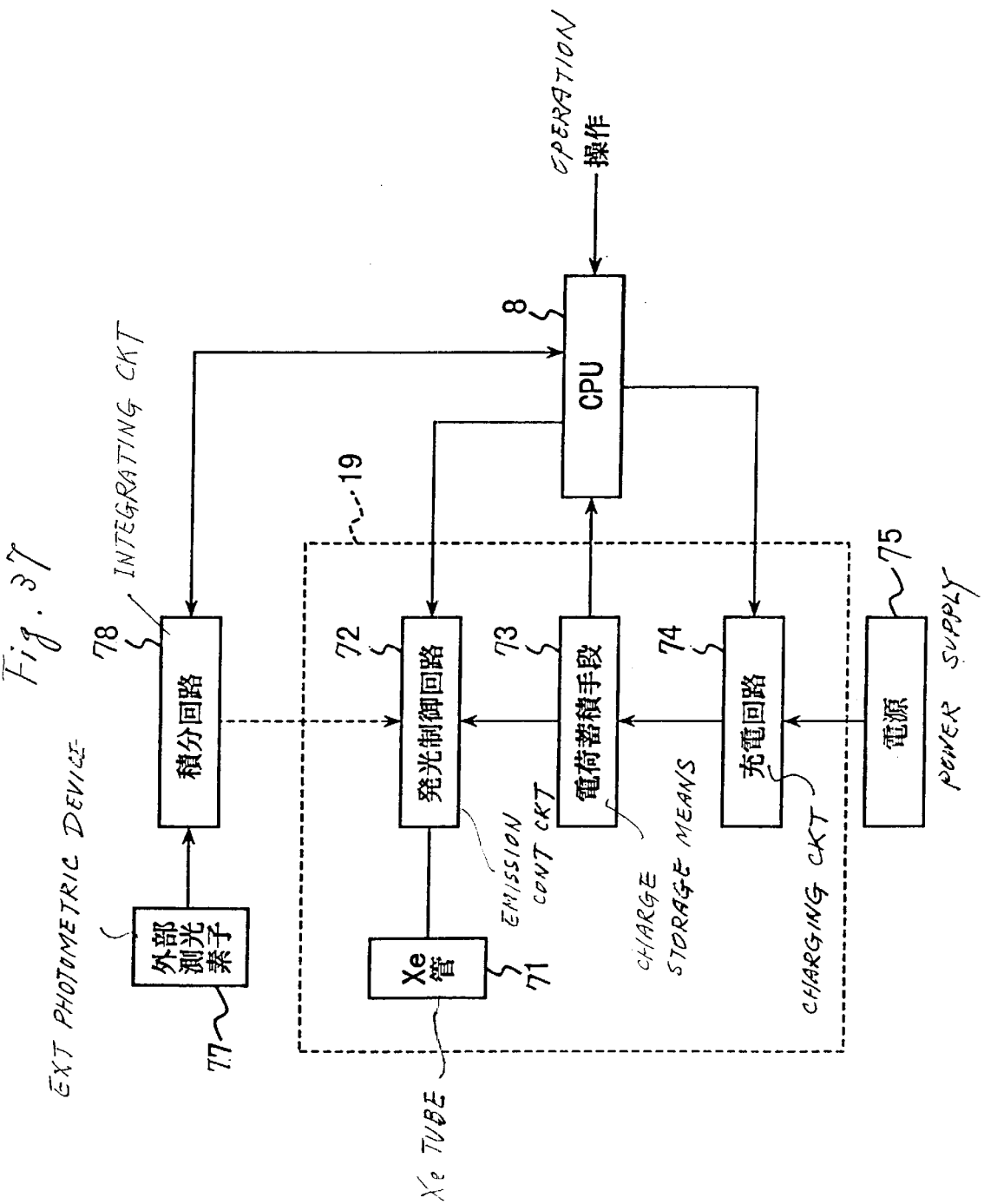

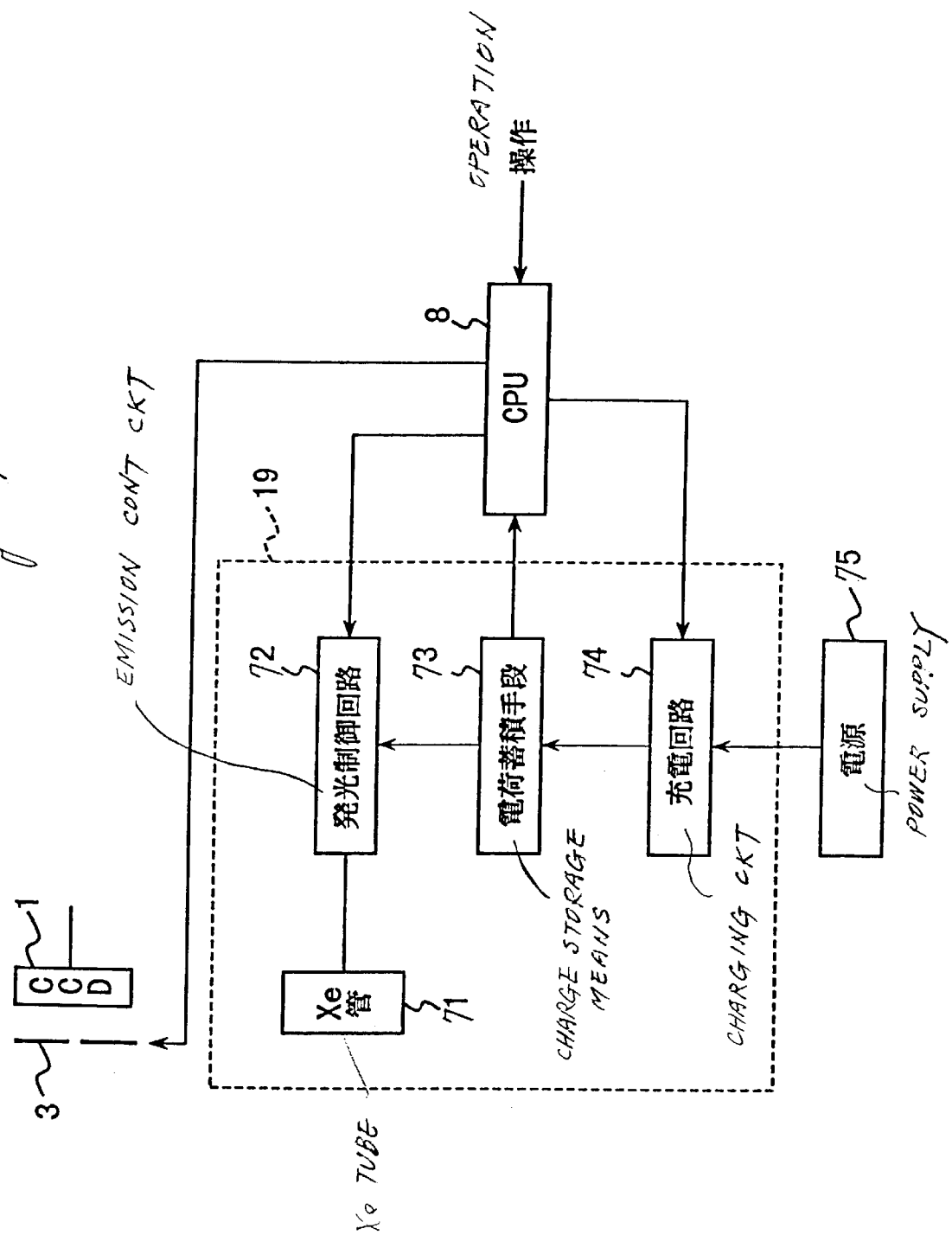

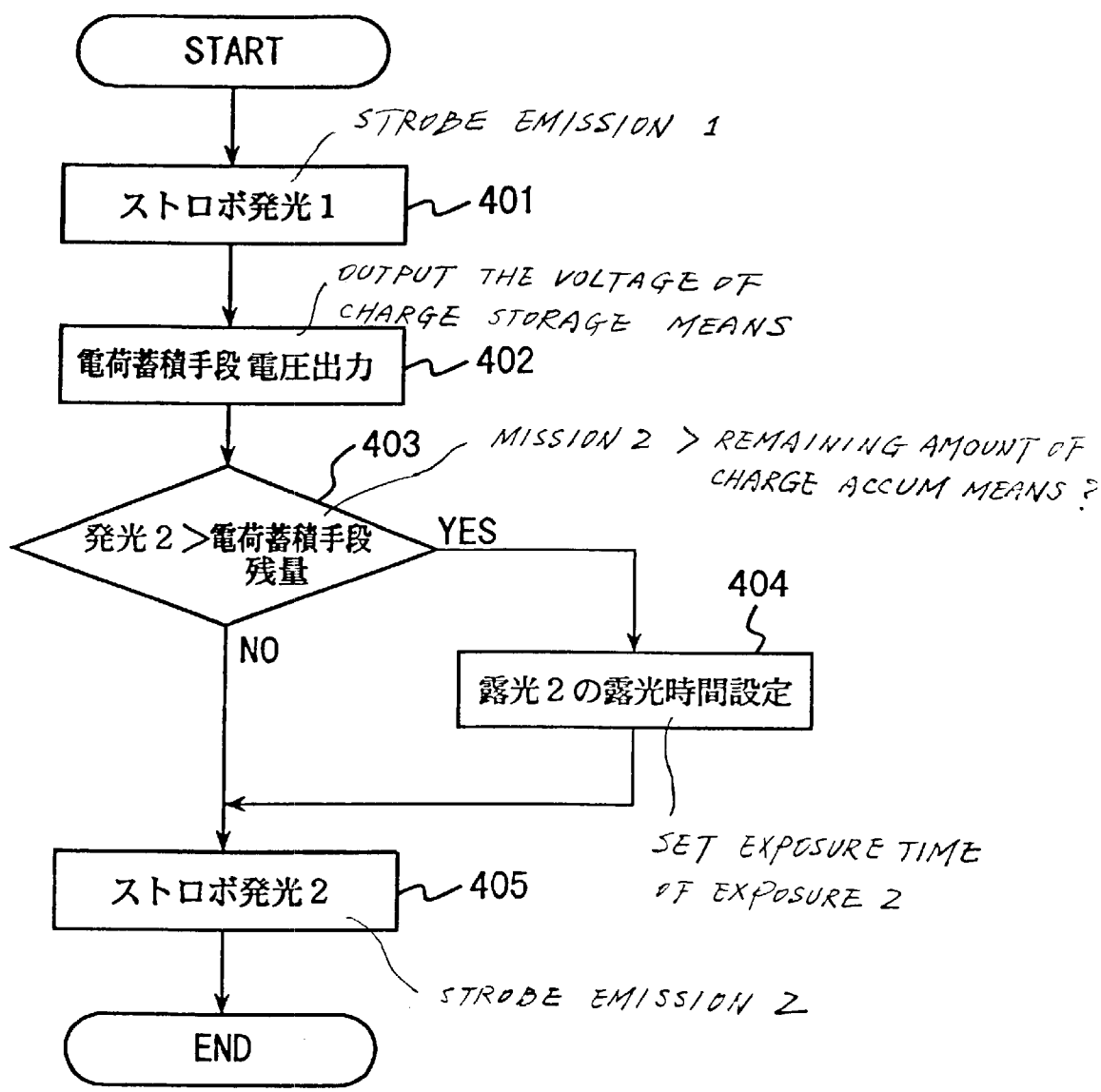

ELECTRONIC CAMERA THAT SYNTHESIZES TWO IMAGES TAKEN UNDER DIFFERENT EXPOSURES

BACKGROUND OF THE INVENTION

The present invention relates to electronic cameras (commonly called as digital still camera) in which a plurality of image pickup signals of different exposure amount read out from a single image pickup device are synthesized to obtain an image having a wide dynamic range.

Although solid-state image pickup devices such as CCD image pickup device are used in such image pickup apparatus as TV camera, video camera, electronic camera, etc., there is a problem that the dynamic range of a solid-state image pickup device is much narrower than that of a silver salt photographic film.

To eliminate this problem, there have been proposed techniques in which an image having an increased dynamic range is obtained by synthesizing two image pickup signals of different exposure amount read out from a single image pickup device. For example, Japanese patent application laid open No.4-207581 discloses those constructed as follows.

In particular, one of those disclosed therein comprises an image pickup device including a light receiving section having a plurality of light receiving elements for photoelectric conversion of optical information and a means for transferring signals from the light receiving section. Immediately after performing a first exposure at the light receiving section and transmitting signals of the first exposure to the transfer means, a second exposure having a longer exposure time than the first exposure is started. After outputting signals of the first exposure from the image pickup device, signals of the second exposure are transmitted to the transfer means to output signals of the second exposure from the image pickup device. The second exposure is thereby performed in the period during which signals of the first exposure are outputted from the image pickup device so as to make smaller a temporal difference in picture taking caused by such plurality of times of exposure. In this aspect, a disclosure is also made with respect to one in which the first exposure time is controlled by transmitting of signals due to the exposure from the light receiving section to the transfer means, i.e., by an electronic shutter function, while the second exposure time is controlled by a means for shutting off light to control an exposure time of the image pickup device. The second exposure time can thus be controlled independently from the transferring operation of the first exposure signals.

Further, one as shown in FIG. 1 is disclosed in Japanese patent application laid open No.6-141229 as a construction for synthesizing two image pickup signals that are different in exposure amount to synthesize an image having a wide dynamic range. In particular, signals with a shorter charge accumulating period CS1 read out from CCD 501 are recorded at memory 502, and the recorded signals are read out from the memory 502 at substantially the same timing as readout from CCD 501 of signals with a longer charge accumulating period CL1. The signals read out from the memory 502 are multiplied by CL1/CS1 for example "4" using a multiplier 503. By this multiplication using such factor, signal levels of those signals differing from each other in charge accumulating period with respect to the same object are theoretically brought to the same level.

Next, a level weighting means H 505 assigns a weight corresponding to signal level to the signal of charge accumulating period CS1 from the multiplier 503. A weight is assigned also to the signal of charge accumulating period CL1 at a level weighting means L 504. The characteristics of the respective weights are shown in FIG. 2 where abscissa represents an input signal level and ordinate represents a weighting factor to be assigned to the signals. The level weight L is a weight of 1 for input levels up to 80%, is linearly lowered in weight value for 80% to 100% and puts the weighting factor to 0 at the input level of 100%. The level weight H, on the other hand, is a weight of 0 for levels up to 80%, is linearly increased in weight value for 80% to 100% and puts the weighting factor to 1 at the input level of 100%. The weighting factor is always 1 for input levels of 100% and above. The image signals differing from each other in dynamic range are weighted thus and are synthesized as added together at an adder 506 to form a single piece of image. The portions in good conditions (with favorable S/N and without saturation) are extracted through this weighting process to synthesize an image having a wide dynamic range. Since the synthesized image is processed at a rate about twice the normal when signals are read out from CCD 501, the scanning rate of signals is converted at a rate converter 507 to ½ so that it corresponds to a standard TV signal. Further, while the signal level of the synthesized image at its maximum is 400%, the level is compressed to 100% at a level compression means 508. It should be noted that numeral 509 in FIG. 1 denotes a timing control section.

In this manner, a difference in signal level due to difference in charge accumulating period is corrected with respect to the two signals that are different in charge accumulating period. A larger weight is assigned to those portions where signals are not saturated while an adequate S/N is kept to make a selection from these image signals and at the same time to smoothly synthesize the two image signals. The signal obtained as having a wide dynamic range and an increased signal amplitude is then outputted after compressed to a standard signal level. An image having an increased dynamic range is thereby synthesized from the two image signals having been controlled with respect to their charge accumulating periods at CCD of which dynamic range is narrow.

Further, Japanese patent application laid open No.62-108678 discloses a technique in which, when an image having a wide dynamic range is to be obtained by synthesizing two image pickup signals that are different in exposure amount, one of the image pickup signals is picked up by using only natural light while the other image pickup signal is generated by a picture taking process using a strobe light. These image pickup signals are compared with each other and the portions of greater signal are outputted to obtain a synthesized image.

Furthermore, a disclosure i s made in Japanese Patent Publication No.2659570 with respect to an electronic still camera in which, at the same time of causing strobe light to emit for a plurality of times, a plurality of times of readout of charge are effected within a time period for taking one frame of picture so that amount of light to be received is adjusted by control of an emission amount of strobe light or an electronic shutter operation of solid-state image pickup device so as to increase dynamic range without a saturation in output of the solid-state image pickup device even in high luminance regions.

Referring now to the above Japanese patent application laid open No.4-207581, it discloses a technique where, of two image pickup signals that are different in exposure amount, an image of smaller exposure amount is picked up first in time by using an electronic shutter function of the image pickup device and, then, an image of greater exposure amount is picked up while controlling the charge accumulating time using a means for shutting off light (mechanical shutter). If, however, a means for shutting off light is employed in an electronic camera, such means for shutting off light is normally kept in its opened state. A charge accumulating time is controlled by a transition from the opened state to its closed state. In this case, therefore, the charge accumulating time differs from one position to another on the light receiving surface of the image pickup device. A shading thus results. In the disclosure of the above publication, however, this point is not taken into consideration at all and a means for preventing a shading is not mentioned either. There is another problem that, in respect of control of charge accumulating period, a means for shutting off light is not very accurate when compared to an electronic shutter of the image pickup device.

Furthermore, in the techniques disclosed in the above publications, an accuracy is not taken into consideration in setting an exposure amount ratio of two image pickup signals when the two image pickup signals of different exposure amount are to be obtained. The problems in the case of using a flash emission means are not mentioned either.

In particular, if the luminance of the object of picture is at a relatively low level, picture taking is performed by using a strobe light in combination. In forming a synthesized image having a wide dynamic range through a synthesis of two image pickup signals of different exposure amount, if an attempt is made to simply synthesize the obtained two image pickup signals where one of the image pickup signals is generated by using natural light alone and the other of the image pickup signals by a strobe light in combination, it is difficult due to the intrinsically large variance of a strobe light, even with a constant exposure time, to attain a precise correspondence between the two image pickup signals in order to achieve a predetermined ratio of their exposure amounts. Further, in the case of using a strobe light, while image pickup signal having a predetermined exposure ratio in relation to the image pickup signal picked up by natural light alone can be obtained at the portions within a picture frame reached by the strobe light, image pickup signal in the portions not reached by the strobe light is of the same exposure amount as one picked up by natural light alone. The predetermined exposure ratio cannot be obtained. Furthermore, in the case of synthesizing image pickup signal by natural light and image pickup signal by a strobe light, since these are the image pickup signals different from each other in white balance, there is a problem that color balance is partially lost in the synthesis. Moreover, in the case of image pickup apparatus such as an electronic camera including an exposure setting means (AE), a white balance setting means (WB), a gain control means, a stop control means, etc., when two image pickup signals of different exposure amount are synthesized to obtain an image having a wide dynamic range, no consideration is taken as to how to achieve a correspondence between them.

Further, while the above Japanese patent application laid open No.6-141229 discloses a technique in which synthesis is smoothly performed while changing the weighting factor when two image pickup signals of different exposure amount are synthesized to synthesize an image having a wide dynamic range, the problem of false color in synthesizing a color image is not considered and no disclosure is made with respect to the problems in using a strobe.

SUMMARY OF THE INVENTION

To eliminate the above described problems of the conventional image pickup apparatus in which a plurality of image pickup signals that are different from each other in amount of exposure are synthesized to form an image having a wide dynamic range, it is a first object of the present invention to provide an electronic camera capable of correcting shading occurring in obtaining image pickup signal of a larger exposure amount by controlling charge accumulating time of image pickup device using a means for shutting off light.

In accordance with the present invention, there is provided an electronic camera including a single image pickup device having an electronic shutter function capable of desirably controlling exposure amount by controlling charge accumulating time and means for shutting off light from a light receiving surface of the image pickup device. After generating an image pickup signal of smaller exposure amount by using the electronic shutter function of the image pickup device, an image pickup signal of larger exposure amount is generated by controlling charge accumulating time of the image pickup device by the means for shutting off light, the two image pickup signals being synthesized to obtain an image having an increased wide dynamic range. Control of charge accumulating time of the image pickup device by the means for shutting off light is effected by operation from opened state to closed state of the means for shutting off light. Shading correction means is provided for correcting shading resulting from difference in charge accumulating time among the pixels of the image pickup device occurring due to the operation toward closed state of the means for shutting off light.

By providing such shading correction means, it is possible to correct shading resulting from difference in charge accumulating time among the pixels from one position to another on the light receiving surface of the image pickup device due to the operation from opened state to closed state of the means for shutting off light, so as to prevent an occurrence of false color in the synthesized image. The above first object is thereby achieved.

It is another object of the present invention to provide an electronic camera in which shading is not caused even when an image pickup signal is generated by effecting control of charge accumulating of the image pickup device by the means for shutting off light.

In accordance with the present invention, there is provided an electronic camera including a single image pickup device having an electronic shutter function capable of desirably controlling exposure amount by controlling charge accumulating time and means for shutting off light from a light receiving surface of the image pickup device. After generating an image pickup signal of smaller exposure amount by using the electronic shutter function of the image pickup device, an image pickup signal of larger exposure amount is generated by controlling charge accumulating time of the image pickup device by the means for shutting off light, the two image pickup signals being synthesized to obtain an image having an increased wide dynamic range. The means for shutting off light is constituted by a focal-plane shutter. Shutter charge of the focal-plane shutter is effected immediately after a completion of electronic shutter's operation of the image pickup device, in the state where charge accumulating operation of the image pickup device is halted. After completion of the shutter charge, charge accumulating operation of the image pickup device is started such that control of the charge accumulating time is effected by a normal focal-plane shutter operation.

By thus using a focal-plane shutter as the means for shutting off light and causing it to operate in the manner described above, no shading occurs in image pickup signal obtained by controlling charge accumulating time by means of the focal-plane shutter's operation. Accordingly, it is possible to obtain a synthesized image free from shading without providing a shading correction means even when a focal-plane shutter is used. The above object is thereby achieved.

It is still another object of the present invention to provide an electronic camera capable of accurately controlling charge accumulating time even when a charge accumulating time of image pickup device of a relatively long time period is to be controlled.

In accordance with the present invention, there is provided an electronic camera including: a single image pickup device having an electronic shutter function capable of desirably controlling exposure amount by controlling charge accumulating time; means for shutting off light from a light receiving surface of the image pickup device; means for generating from the image pickup device two image pickup signals of the same object differing from each other in exposure amount; and synthesizing means for obtaining an image having an increased wide dynamic range by performing synthesis of the two image pickup signals obtained by the means for generating image pickup signal. The means for generating image pickup signal is adapted to generate image pickup signal of larger exposure amount by controlling charge accumulating time of the image pickup device by the means for shutting off light after generating image pickup signal of smaller exposure amount by using the electronic shutter function of the image pickup device if charge accumulating time of the image pickup device for obtaining image pickup signal of larger exposure amount is set as shorter than a period required for readout of all the pixels of the image pickup device. Also, it is adapted to generate image pickup signal of larger exposure amount by using the electronic shutter function of the image pickup device instead of the means for shutting off light, if charge accumulating time of the image pickup device for obtaining image pickup signal of larger exposure amount is set as longer than the time period required for readout of all the pixels of the image pickup device.

By constructing in this manner, an electronic shutter can be used in setting of charge accumulating time, if charge accumulating time of the image pickup device for generating image pickup signal of larger exposure amount is set as longer than the time period required for readout of all the pixels of the image pickup device. In such case, charge accumulating time can be accurately controlled by using the electronic shutter which is more accurate than the means for shutting off light. The above object is thereby achieved.

It is yet another object of the present invention to provide an electronic camera capable of accurately controlling exposure amounts of image pickup signals so as to attain an exposure amount ratio corresponding to a previously set exposure amount ratio between two shots of picture taking.

In accordance with the present invention, there is provided an electronic camera having a function for performing synthesis of two image pickup signals obtained by performing by a single image pickup device two shots of picture taking of different exposure amount of the same object to obtain an image having an increased wide dynamic range, further including a photometric device having a separate entity from the image pickup device and means for setting charge accumulating time of the image pickup device at the second shot of picture taking so that it corresponds to a previously set exposure amount ratio of the two shots of picture taking based on an exposure amount measured by the photometric device at the first shot of picture taking.

By thus setting charge accumulating time at the second shot of picture taking based on an exposure amount at the first shot of picture taking measured by a photometric device, it is possible to accurately control an exposure amount ratio between the two image pickup signals. The above object is thereby achieved.

It is a further object of the present invention to provide an electronic camera in which, when two image pickup signals of different exposure amount are generated by using flash emission means and are synthesized to obtain an image having a wide dynamic range, time difference in generation of the two image pickup signals is reduced so as to obtain images where difference due to the time difference in generation between the two image pickup signals is relatively small.

In accordance with the present invention, there is provided an electronic camera having a function for performing synthesis of two image pickup signals obtained by performing by a single image pickup device two shots of picture taking of different exposure amount of the same object to obtain an image having an increased wide dynamic range, further including flash emission means. The flash emission means is caused to emit at one or both of a timing in the second half of charge accumulating time of the image pickup device at the first shot of picture taking and a timing in the first half of charge accumulating time of the image pickup device at the second shot of picture taking.

By constructing in this manner, time difference of generation in generating two image pickup signals of different exposure amount by using a flash emission means can be reduced so that images be obtained as having a smaller difference due to time difference of generation between the two image pickup signals. The above object is thereby achieved.

In this aspect, it may further include a photometric device having a separate entity from the image pickup device and means for causing the flash emission means to emit at both of the two shots of picture taking so as to set charge accumulating time of the image pickup device at the second shot of picture taking based on an emission amount ratio of the two emissions measured by the photometric device. By thus setting charge accumulating time of the second shot of picture taking based on an emission amount ratio of the two emissions measured by the photometric device, it is possible to accurately control an exposure amount ratio of the two image pickup signals even when flash emission means is used.

Also, in this aspect, the image pickup device may be provided with an electronic shutter function capable of desirably controlling an exposure amount by controlling charge accumulating time. The flash emission means is caused to emit at both of the two shots of picture taking and, at a smaller emission of the two emissions of the flash emission means, timing for stopping the smaller emission may be set as the same as timing for terminating an electronic shutter operation of the image pickup device.

In general, proportion of surplus emission in a flash emission means is larger for a smaller flash emission amount. Accordingly, by setting as in the above the stop timing of smaller emission of the flash emission means as the same as the ending timing of an electronic shutter operation of the image pickup device, the smaller emission is not affected by an surplus emission so that image pickup signals are obtained as having an accurate exposure amount ratio where an influence of surplus emission in the case of using a flash emission means is reduced.

It is a further object of the present invention to provide an electronic camera in which, when two image pickup signals of different exposure amount are synthesized to obtain an image having a wide dynamic range, the two image pickup signals are obtained as having the same depth of field.

In accordance with the present invention, there is provided an electronic camera having a function by which two image pickup signals obtained by performing by a single image pickup device two shots of picture taking of different exposure amount of the same object are synthesized to obtain an image having an increased wide dynamic range, further including means for setting diaphragm stop value of lens fixed at the two shots of picture taking.

By thus performing the two shots of picture taking of different exposure amount with the diaphragm stop of lens being fixed by the lens diaphragm stop value fixing means, the two image pickup signals are obtained as having the same depth of field. The above object is thereby achieved.

In this aspect, exposure setting means may be provided such that a diaphragm stop value and/or shutter speed obtained by the exposure setting means before taking picture be used at the picture taking for obtaining the image pickup signal of larger exposure amount and, at the picture taking for obtaining the image pickup signal of smaller exposure amount, the same diaphragm stop value be used while shutter speed be set in such a manner as to correspond to a previously set exposure amount ratio of the two shots of picture taking. It is also possible to construct the exposure setting means such that an exposure value be set based on photometric output of a photometric device provided separately from the image pickup device or to construct the exposure setting means such that an exposure value be set based on image pickup signal of the image pickup device. By thus providing an exposure setting means and using a diaphragm stop value obtained by the exposure setting means as fixed at the two shots of picture taking, it is possible to obtain image pickup signals at an optimum exposure having the same depth of field.

It is a further object of the present invention to provide an electronic camera in which, when two image pickup signals of different exposure amount are generated and synthesized to form an image having a wide dynamic range, it is possible to obtain the synthesized image without producing a false color due to difference in white balance.

In accordance with the present invention, there is provided an electronic camera having a function by which two image pickup signals obtained by performing by a single image pickup device two shots of picture taking of different exposure amount of the same object are synthesized to obtain an image having an increased wide dynamic range, further including means for performing white balance correction by setting the same white balance correction value for the two image pickup signals of different exposure amount before the synthesis.

By thus providing white balance correction means to perform white balance correction by setting the same correction value for the two image pickup signals of different exposure amount before the synthesis, the synthesized image is obtained as having a wide dynamic range without producing a false color due to difference in white balance. The above object is thereby achieved.

In this aspect, white balance setting means may be provided such that white balance correction value obtained by the white balance setting means before picture taking be used in white balance correction by the white balance correction means. By thus using a white balance correction value obtained by the white balance setting means, it is possible to obtain the synthesized image even more accurately without producing a false color due to difference in white balance.

Also, in this aspect, the correction value to be used in the white balance correction means may be set based on image pickup signal before performing the synthesis. By thus setting a white balance correction value based on the image pickup signal before performing the synthesis, the synthesized image can be obtained as even more accurately corrected of white balance.

Furthermore, in this aspect, the correction value to be used in the white balance correction means may be set based on the image pickup signal of larger exposure amount of the two image pickup signals of different exposure amount before performing the synthesis. In general, while white balance correction is required to be performed for the portion to become an essential part of the object, the portion to become an essential part is more likely to be included in the image pickup signal of larger exposure amount. Accordingly, by setting white balance correction value based on the image pickup signal of larger exposure amount, a synthesized image of which white balance is corrected can be obtained efficiently.

It is a further object of the present invention to provide an electronic camera in which a synthesized image having a wide dynamic range can be efficiently obtained without producing a false color due to difference in white balance.

In accordance with the present invention, there is provided an electronic camera having a function by which two image pickup signals obtained by performing by a single image pickup device two shots of picture taking of different exposure amount of the same object are synthesized to obtain an image having an increased wide dynamic range, further including means for correcting white balance with respect to the synthesized image having a wide dynamic range.

By thus correcting white balance with respect to the synthesized image, a synthesized image having a wide dynamic range can be efficiently obtained without an occurrence of false color due to difference in white balance. The above object is thereby achieved.

In this aspect, white balance setting means may be provided such that white balance correction value obtained by the white balance setting means before picture taking be used in white-balance correction by the white balance correction means. By thus using a white balance correction value obtained by the white balance setting means, the synthesized image can be obtained efficiently and accurately without an occurrence of false color due to difference in white balance.

Also, in this aspect, the correction value to be used in the white balance correction means may be set based on the synthesized image having a wide dynamic range, or the correction value to be used in the white balance correction means may be set based on image pickup signal before performing the synthesis. By thus setting a white balance correction value, the synthesized image can be obtained as efficiently and accurately corrected with respect to white balance.

Furthermore, in this aspect, the correction value to be used in the white balance correction means may be set based on the image pickup signal of larger exposure amount of the two image pickup signals of different exposure amount before performing the synthesis. By thus setting white balance correction value based on the image pickup signal of larger exposure amount, a synthesized image having a wide dynamic range can be obtained as more efficiently corrected with respect to white balance.

It is a further object of the present invention to provide an electronic camera in which, when two image pickup signals of different exposure amount are generated and synthesized to obtain an image having a wide dynamic range, the two image pickup signals are readily generated as suitably corresponding at a high accuracy to a previously set exposure amount ratio.

In accordance with the present invention, there is provided an electronic camera having a function by which two image pickup signals obtained by performing by a single image pickup device two shots of picture taking of different exposure amount of the same object are synthesized to obtain an image having an increased wide dynamic range, further including gain control means such that gain values at the gain control means for the two image pickup signals are respectively set to values that are different from each other.

By thus setting the gain values corresponding to the respective image pickup signals by the gain control means, it is possible to readily generate the two image pickup signals suitably corresponding to an exposure amount ratio at a high accuracy. The above object is thereby achieved.

In this aspect, the gain values for the two image pickup signals are set so that the exposure amount ratio of the two image pickup signals corresponds to a previously set exposure amount ratio. By constructing in this manner, even when shutter speeds cannot accurately correspond to a previously set exposure amount ratio, the gain values can be adjusted to readily generate the two image pickup signals which accurately correspond to the exposure amount ratio.

It is a further object of the present invention to provide an electronic camera in which, when two image pickup signals of different exposure amount are synthesized to form an image having a wide dynamic range, the two image pickup signals of different exposure amount can be readily generated from an image pickup device by charge accumulating time of the same duration.

In accordance with the present invention, there is provided an electronic camera having a function by which two image pickup signals obtained by performing by a single image pickup device two shots of picture taking of different exposure amount of the same object are synthesized to obtain an image having an increased wide dynamic range, further including diaphragm control means such that the two image pickup signals of different exposure amount are generated by changing diaphragm stop value of lens by the diaphragm control means.

By constructing in this manner, two image pickup signals of different exposure amount can be readily generated by charge accumulating time of the same duration, thereby achieving the above object.

In this aspect, means for correcting peripheral attenuation of lens may be provided such that correction with respect to peripheral attenuation which occurs as a result of difference in diaphragm stop value of lens be performed for the two image pickup signals of different exposure amount generated by changing diaphragm stop value of lens by the diaphragm control means. When two image pickup signals of different exposure amount are generated by changing diaphragm stop value of lens by the diaphragm control means, a difference in peripheral attenuation occurs by different diaphragm stop values and a false color is produced in the synthesized image. However, a synthesized image without an occurrence of false color resulting from a difference in peripheral attenuation can be obtained by correcting the difference in peripheral attenuation of lens by providing the means for correcting peripheral attenuation of lens in the above described manner.

Also, in this aspect, flash emission means may be provided such that two image pickup signals of different exposure amount be generated by effecting flash emissions of the same emission amount and changing the diaphragm stop value of lens by the diaphragm stop value control means at two shots of picture taking of different exposure amount. By constructing in this manner, it is not necessary to control flash emission amount and it becomes possible to equalize an exposure amount ratio by flash emissions and an exposure amount ratio by ambient light.

It is a further object of the present invention to provide an electronic camera in which, when a plurality of color image signals of different exposure amount are synthesized to form a synthesized color image having a wide dynamic range, the synthesized color image can be formed without producing a false color or pseudo contour.

In accordance with the present invention, there is provided an electronic camera having color image synthesizing means for forming a color image having a wide dynamic range by synthesizing a plurality of color image signals of different exposure amount, further including weighting means for assigning weights to the plurality of color image signals corresponding to their respective signal level and means for adding the plurality of weighted color image signals such that the weighting means sets the same weighting factor respectively for each color signal in the plurality of color image signals.

By thus effecting weighted addition by respectively setting the same weighting factor to each color signal of the plurality of color image signals, a synthesized color image having a wide dynamic range can be formed without producing a false color or pseudo contour. The above object is thereby achieved.

It is a further object of the present invention to provide an electronic camera in which, even when flash emission is used, image pickup signals can be readily generated as having a predetermined exposure amount ratio in every part in a frame of picture and a synthesized image having a wide dynamic range can be obtained as preserving a uniform white balance in every part in the frame of picture.

In accordance with the present invention, there is provided an electronic camera including: optical means for forming an optical image of the object of picture taking; image pickup means for generating image pickup signals by taking picture and effecting photoelectric conversion of an image of the object formed at the optical means; flash emission means for illuminating the object; exposure condition designating means for designating exposure conditions at the image pickup means; image pickup signal synthesizing means for synthesizing two image pickup signals from two separate shots of picture taking at the image pickup means by exposure conditions designated by the exposure condition designating means; flash emission control means for controlling emission of the flash emission means in connection with the exposure conditions for each shot at the time of the two shots of picture taking; and control means for controlling operation of each of the means in the above.

By thus using flash emission for both of the two shots of picture taking, it is possible to equalize an exposure amount ratio by normal light and an emission amount ratio by flash emission in every part in a frame of picture and it is also readily possible to make uniform white balance in the synthesized image. The above object is thereby achieved.

In one aspect of the present invention, of the above electronic camera for generating a synthesized image having a wide dynamic range by using flash emission in combination, the exposure condition designating means includes one or both of electronic shutter means for desirably controlling exposure amount by controlling photoelectric charge accumulation of the image pickup means and light shut off means for shutting off light from a light receiving surface of the image pickup means such that the control means controls one or both of the electronic shutter means and the light shut off means, and the flash emission means to make an emission amount ratio by light from the flash emission means as the same as an exposure amount ratio by normal light excluding the light from the flash emission means at the two shots of picture taking.

By constructing in this manner, exposure amount ratios in the regions dominated by exposure by normal light and in the regions dominated by exposure by flash emission of the flash emission means can be equalized at the two shots of picture taking using flash emission, thereby a synthesized image is obtained as having an improved image quality.

In this aspect, the exposure amount ratio by normal light of the two shots of picture taking is set by ratio of photoelectric charge accumulating time of the two shots at the image pickup means. By constructing in this manner, ratio of exposure amount by normal light can readily be set in the case where ratio of emission amount by normal light and ratio of emission amount by light from the flash emission means are to be equally set between the two shots of picture taking.

In another aspect of the present invention, of the above electronic camera for generating a synthesized image having a wide dynamic range by using flash emission in combination, the flash emission means includes single charge storage means for accumulating emission energy of the flash emission means such that the total of emission amounts at the two shots of picture taking of the flash emission means is set equal to or lower than the total emission energy of the single charge storage means. It is thereby possible to effectively use charge of the single charge storage means when light by the flash emission means is used at the two shots of picture taking.

In still another aspect of the present invention, of the above electronic camera for generating a synthesized image having a wide dynamic range by using flash emission in combination, the flash emission means includes a plurality of charge storage means differing from each other in capacitance value for accumulating emission energy of the flash emission means such that a full emission of the flash emission means is caused at each shot of the two shots of picture taking by selectively using the plurality of charge storage means so as to make a difference in the total capacitance values to be respectively used. By thus causing a full emission of the flash emission means at the two shots of picture taking, image pickup signals at an accurate emission amount ratio can be obtained without requiring an emission amount control (dimming control).

In yet another aspect of the present invention, of the above electronic camera for generating a synthesized image having a wide dynamic range by using flash emission in combination, the flash emission means includes a plurality of charge storage means for accumulating emission energy of the flash emission means such that one picture taking is performed by a smaller emission based on a full emission using one single or a plurality of charge storage means and the other picture taking is performed by a larger emission based on an emission under dimming control using the other single or plurality of charge storage means. By constructing in this manner, the smaller emission can be caused to emit accurately by a full emission without requiring dimming control and the larger emission is caused to emit under dimming control so as to be able to desirably set an emission amount ratio.

In a further aspect of the present invention, of the above electronic camera for generating a synthesized image having a wide dynamic range by using flash emission in combination, the flash emission means includes a plurality of charge storage means for accumulating emission energy of the flash emission means such that one picture taking is performed by a smaller emission based on an emission under dimming control using one single or plurality of charge storage means and the other picture taking is performed by a larger emission based on a full emission using the other single or plurality of charge storage means. Thereby, the smaller emission is caused to emit under dimming control so as to be able to desirably set an emission amount ratio and the larger emission can be caused to emit accurately by a full emission without requiring dimming control.

In a further aspect of the present invention, of the above electronic camera for generating a synthesized image having a wide dynamic range by using flash emission in combination, the flash emission means includes at least one charge storage means for accumulating emission energy of the flash emission means such that the two shots of picture taking are performed as illuminated by a smaller emission and a larger emission each based on an emission under dimming control. By thus using an emission under dimming control for both of the two shots of picture taking, due to the fact that full emission is not used, it is not necessarily required to provide a separate individual emission means for each and the value of emission amount ratio can be set more freely.

In this aspect, the dimming control may be effected by control of emission time of the flash emission means. By thus effecting dimming control, a setting of emission amount can be accurately performed without requiring a photometry means.

Also, in this aspect, a photometry means may be provided such that the dimming control is effected based on detection of a predetermined emission amount by direct photometry of the photometry means. In the case where dimming control is effected in this manner, an actual emission amount can be measured so that control of light be effected to achieve a required emission amount in accordance with a reflectance of the object.

Furthermore, in this aspect, the dimming control may be effected based on measurement and detection of a predetermined voltage at the charge storage means. By constructing in this manner, dimming control can be effected without using a photometry means and voltage measuring means at the charge storage means for dimming control can be used in common with the voltage measuring means of charging circuit of the charge storage means.

Moreover, in this aspect, when dimming is to be effected of the flash emission means at the second shot of picture taking, an emission amount of light from the flash emission means at the first shot of picture taking is measured and an emission amount under dimming control of the flash emission means at the second shot is set based on the measured emission amount so as to correspond to a previously set emission amount ratio of the flash emission means between the two shots of picture taking. By constructing in this manner, since variance in the first emission amount of the flash emission means is actually measured and such variance can be corrected and absorbed at the setting of the controlled second emission amount, accuracy of the emission amount ratio can be improved.

Further, in the case where, as in the above, variance in the first emission amount is actually measured and such variance is corrected at the setting of the controlled second emission amount, a photometry means is provided so that the emission amount of the flash emission means at the first shot of picture taking is measured by direct photometry of the photometry means. By constructing in this manner, the first actual emission of the flash emission means can be measured so that a required emission amount in accordance with reflectance of the object be obtained to accurately set the second emission amount.

Furthermore, in the case where, as in the above, variance in the first emission amount is actually measured and such variance is corrected at the setting of the controlled second emission amount, the emission amount of the flash emission means at the first shot of picture taking is obtained by a voltage measurement at the charge storage means. By constructing in this manner, the first emission amount of the flash emission means can be measured without using a photometry means and voltage measuring means at the charge storage means for the measurement of emission amount can be used in common with the voltage measuring means of charging circuit of the charge storage means.

In a further aspect of the present invention, of the above electronic camera for generating a synthesized image having a wide dynamic range by using flash emission in combination, an emission amount of the flash emission means is measured to obtain an emission amount ratio based on such emission amounts and the exposure amount ratio by normal light is set as the same as such emission amount ratio. By constructing in this manner, variance in the emission amount of the flash emission means can be absorbed to obtain an accurate emission amount ratio and, by setting an exposure amount ratio equal to such emission amount ratio, a synthesized image can be obtained as having high image quality where the emission amount ratio and the exposure amount ratio are accurately matched.

In this aspect, an emission amount ratio may be obtained by measuring an emission amount of the flash emission means at a first shot of picture taking and by computing a second emission amount by calculation based on the first emission amount. Thereby, an emission amount ratio can be obtained only by the measurement of the first emission amount so that an exposure amount ratio be determined before the second emission.

Also, in this aspect, an emission amount ratio may be obtained by measuring emission amounts of the flash emission means at the first and second shots of picture taking. By constructing in this manner, a more accurate emission amount ratio can be obtained based on a result of actual emissions.

Furthermore, in this aspect, a photometry means may be provided so as to measure an emission amount of the flash emission means based on direct photometry by the photometry means. By constructing in this manner, an actual emission by the flash emission means can be readily measured and an emission amount ratio can be accurately obtained by acquiring a required emission amount in accordance with the reflectance of the object.

Moreover, in this aspect, an emission amount of the flash emission means may be obtained by a voltage measurement at the charge storage means. By constructing in this manner, an emission amount of the flash emission means can be measured without using a photometry means and voltage measuring means at the charge storage means for the measurement of emission amount can be used in common with the voltage measuring means of charging circuit of the charge storage means.

In accordance with the present invention, of the above electronic camera for generating a synthesized image having a wide dynamic range by using flash emission in combination, the flash emission means comprises one xenon emission tube and one charge storage means and is caused to emit at the two shots of picture taking by using the one xenon emission tube and the one charge storage means. By constructing in this manner, the flash emission means can be constructed as having a small circuitry size.

In accordance with the present invention, of the above electronic camera for generating a synthesized image having a wide dynamic range by using flash emission in combination, the flash emission means comprises one xenon emission tube, a plurality of charge storage means and charge storage means switching means and is caused to emit at the two shots of picture taking by using the one xenon emission tube and at least one of the charge storage means switched and selected by the charge storage means switching means. In the case of such construction, since a plurality of units of charge storage means are provided, it is possible to respectively control a smaller emission and a larger emission by using charge storage means provided exclusively for each. Each emission can be performed independently so that an accurate emission control be effected without reciprocally affected by each other.

In accordance with the present invention, of the above electronic camera for generating a synthesized image having a wide dynamic range by using flash emission in combination, the flash emission means comprises a plurality of xenon emission tubes, one charge storage means and xenon emission tube switching means and is caused to emit at the two shots of picture taking by using at least one xenon emission tube switched and selected by the xenon emission tube switching means and the one charge storage means. By constructing in this manner, since a plurality of units of the xenon emission tube are provided, no reciprocal effect occurs of consecutive emission at the two shots of picture taking and, therefore, the emissions can be effected respectively at a high accuracy irrespective of interval between emissions.

In accordance with the present invention, of the above electronic camera for generating a synthesized image having a wide dynamic range by using flash emission in combination, the flash emission means comprises a plurality of xenon emission tubes, a plurality of charge storage means, xenon emission tube switching means and charge storage means switching means and is caused to emit at the two shots of picture taking by using at least one xenon emission tube switched and selected by the xenon emission tube switching means and at least one charge storage means switched and selected by the charge storage means switching means. By constructing in this manner, since a plurality of units of charge storage means are provided, it is possible to respectively control a smaller emission and a larger emission by using charge storage means provided exclusively for each and the emissions are not reciprocally affected because both can be performed independently. Also, since a plurality of units of the xenon emission tube are provided, no reciprocal effect occurs of two consecutive emissions and the emissions can be effected respectively at a high accuracy irrespective of interval between emissions.

In this aspect, the charge storage means may be constituted by one main capacitor. By constructing in this manner, circuitry size can be reduced.

Also, in this aspect, the charge storage means may be constituted by a plurality of main capacitors connected in parallel. By constructing in this manner, capacitance of a single main capacitor can be reduced so that its production is easier. Also, for example, by making capacitance of each main capacitor as the same as that of others to equalize ratio of the number of capacitors to be used in a smaller emission to the number of capacitors to be used in a larger emission and ratio of their emission amounts (exposure amount ratio), a required emission amount ratio can be controlled in an emission time of the same duration so that control is simpler.

In a further aspect of the present invention, of the above electronic camera for generating a synthesized image having a wide dynamic range by using flash emission in combination, the respective emissions of the flash emission means at the two shots of picture taking are each effected as a single emission. By thus effecting the emissions at the two shots of picture taking respectively by a single emission, control of emission is easier and variance in emission amounts can be reduced.

In a further aspect of the present invention, of the above electronic camera for generating a synthesized image having a wide dynamic range by using flash emission in combination, the respective emissions of the flash emission means at the two shots of picture taking are effected either as one unit emission and a collection of a plurality of times of unit emission or each as a collection of a plurality of times of unit emission. In such construction, since ratio of emitting units corresponds to a required, desirable emission amount ratio (exposure amount ratio) by setting an emission amount per unit emission to a certain fixed value, an advantage is achieved that the emission amount ratio can be controlled by the number of emitting units. Also, emission amount measuring means may additionally be provided to measure an emission amount of each unit emission of the collection of a plurality of unit emissions so that an accurate emission amount ratio be obtained by adjusting and controlling a total emission amount.

In a further aspect of the present invention, of the above electronic camera for generating a synthesized image having a wide dynamic range by using flash emission in combination, the respective emissions of the flash emission means at the two shots of picture taking are effected as a smaller emission and a larger emission in that order. By thus effecting the smaller emission first, control of the emission amount of the larger emission is easier, since the voltage drop at the main capacitor of the charge storage means at start of the larger emission is relatively small. As a result, accuracy in the emission amount ratio can be improved. Also, in the case where the two emissions are consecutively effected by the same flash emission means, some extent of reciprocal effect occurs between the emissions. Since such effect produces a larger effect in the emission with a greater absolute value, the effect can be mitigated to an extent possible by effecting the smaller emission first.

In a further aspect of the present invention, of the above electronic camera for generating a synthesized image having a wide dynamic range by using flash emission in combination, range finding means is provided such that an emission of the flash emission means is controlled to an optimum emission amount corresponding to a distance information obtained by the range finding means. By thus using a distance information, an emission amount can be set more accurately.

In this aspect, the emission to be controlled correspondingly to the distance information is a smaller emission. While variance in emission of the smaller emission is hard to be controlled by a real time emission control such as based on direct photometry of a photometric device or voltage measurement at the charge storage means, it can be caused to emit relatively accurately by effecting a unitary emission by setting an absolute value of emission amount based on a distance information.

In a further aspect of the present invention, of the above electronic camera for generating a synthesized image having a wide dynamic range by using flash emission in combination, pre-photometry means is provided such that an emission of the flash emission means is controlled by using a pre-photometry information obtained by the pre-photometry means. By thus using a pre-photometry information where an actual luminance of the object is measured, an absolute value of emission amount of a quantity of light corresponding to the luminance of the object can be obtained so that an absolute value of emission amount can be set at a high accuracy without using a distance information.

In a further aspect of the present invention, of the above electronic camera for generating a synthesized image having a wide dynamic range by using flash emission in combination, pre-photometry means is provided such that an emission of the flash emission means is controlled by using a pre-photometry information obtained at the pre-photometry means by causing a pre-emission of the flash emission means.

Since an emission amount is thus set based on a pre-photometry information which involves an additional actual emission of the flash emission means, a more precise absolute value of the emission amount can be obtained.

In this aspect, the pre-photometry means may be formed by an external photometry means. By constructing in this manner, an absolute value of emission amount of a quantity of light corresponding to the luminance of an object can be obtained by using a photometry information of the actual object, and the external photometry means of the pre-photometry means can be used in common as the photometry means for emission of the flash emission means.

Also, in this aspect, the pre-photometry means may be used in common as the image pickup means. By constructing in this manner, a separate, external photometry means is not required and an absolute value of emission amount of a quantity of light corresponding to the luminance of an object can be obtained by using a photometry information of the actual object.

BRIEF DESCRIPTION OF THE DRAWING

FIG. 24 is a block diagram showing a fundamental construction of strobe mechanism in the electronic camera shown in FIG. 3.

DESCRIPTION OF THE PREFERRED EMBODIMENTS

Figure 3:
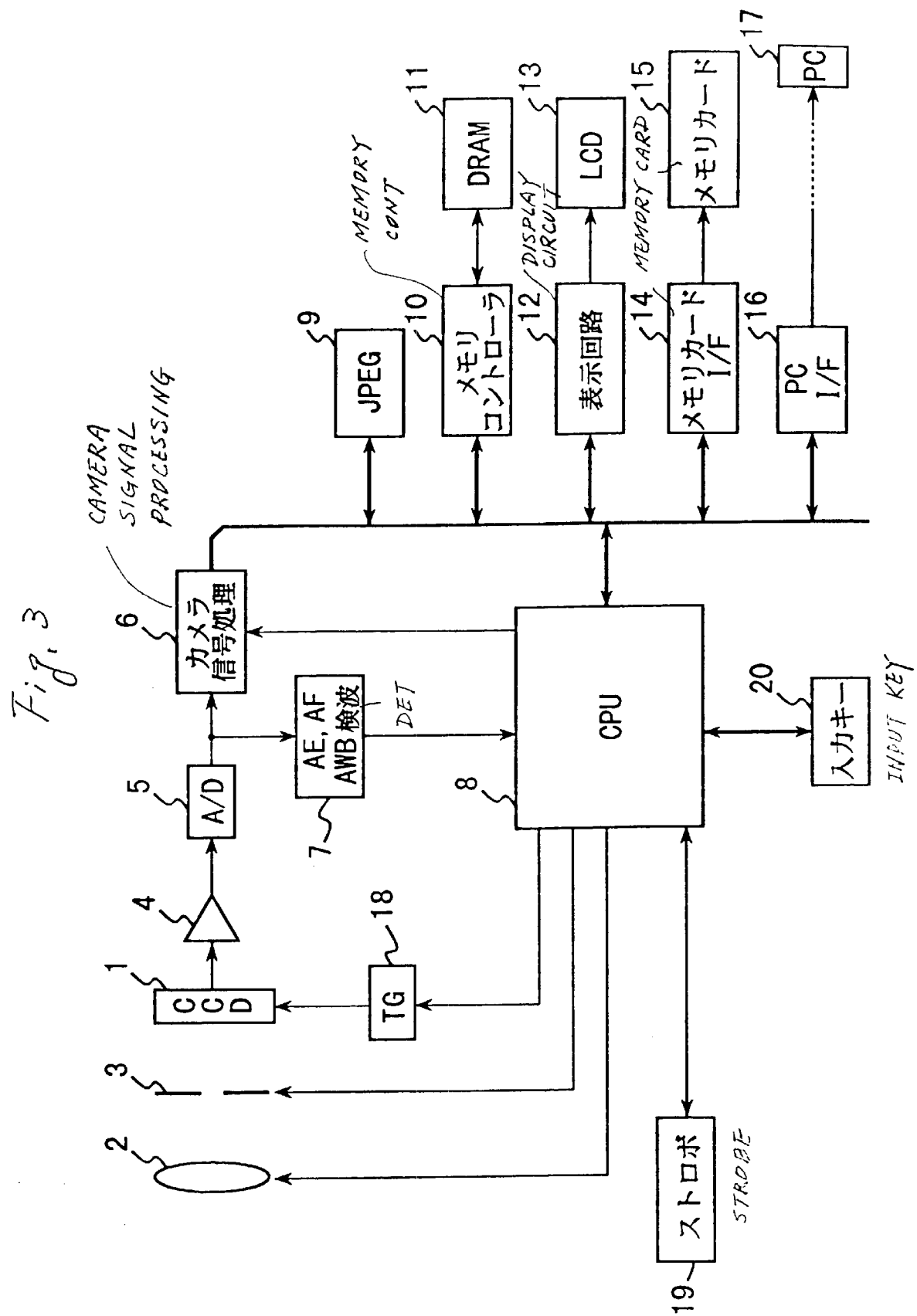
FIG. 3 is a block diagram of fundamental construction as a whole of an electronic camera to which the present invention is applied.

Some embodiments of the present invention will now be described. First, a description will be given below by way of a block diagram shown in FIG. 3 with respect to a fundamental construction as a whole of an electronic camera to which the present invention is applied. Referring to FIG. 3, denoted by numeral 1 is a single-plate color CCD image pickup device for photoelectrically converting an optical signal into an electrical signal. It includes an electronic shutter function. Light from an object is inputted to the CCD image pickup device 1 through lens 2 and stop/shutter mechanism 3. The output of CCD image pickup device 1 is amplified at an amplifier 4 after removed of noise for example at a correlation double sampling circuit. An analog-to-digital converter 5 converts the output of the amplifier 4 outputted as analog data into digital data. A camera signal processing circuit 6 processes signals from the CCD image pickup device 1 as a video data. What is denoted by numeral 7 including AF detector circuit for extracting AF information to control focus, AE detector circuit for extracting AE information to control exposure and AWB detector circuit for extracting AWB information to set white balance, uses image pickup signals, etc., from CCD image pickup device 1 prior to the primary picture taking. The output signals from the AF, AE and AWB detector circuits 7 provide through CPU 8 an AF information to lens 2, an AE information to stop/shutter mechanism 3 and an AWB information to the camera signal processing circuit 6.

Numeral 9 denotes a compression circuit (JPEG) for compressing the amount of data. The image data compressed at the compression circuit 9 is recorded at memory card 15 through memory card I/F 14. Memory controller 10 and DRAM 11 are used as working memory when performing color processing, etc., of video data. A display circuit 12 and LCD display unit 13 are used for example to confirm the picture taking conditions by reading out and displaying data recorded at the memory card 15. Denoted by numeral 16 is a personal computer I/F for transferring data recorded on the memory card 15 to a personal computer 17. It should be noted that, in FIG. 3, numeral 18 denotes a timing generator which generates timing pulse for driving the CCD image pickup device 1. It drives the CCD image pickup device 1 according to control of CPU 8. Numeral 19 denotes a strobe mechanism which is controlled by AE information through CPU 8. Numeral 20 denotes input keys of the CPU by which setting of various types of picture taking mode, driving of trigger switch, etc., can be performed.

Operation of an electronic camera having the above construction is summarized as follows. Image pickup signals generated by means of two times of picture taking under different exposure conditions by using the CCD image pickup device 1 are respectively converted into digital signal at the analog-to-digital converter 5. After subjected to predetermined signal processing at the camera signal processing circuit 6, they are temporarily stored as image data to DRAM 11. In accordance with control by CPU 8, of the above two image data, image data for high luminance regions of the object are then selected from the image data of smaller exposure amount and image data for low luminance regions of the object are selected from the image data of larger exposure amount. By performing a predetermined synthetic operation processing using the selected two image data, it is possible to obtain a single synthesized image data which has a wide dynamic range as a whole. The synthesized image data is subjected to compression at the compression circuit 9 and is recorded at the memory card 15.

Figure 4:
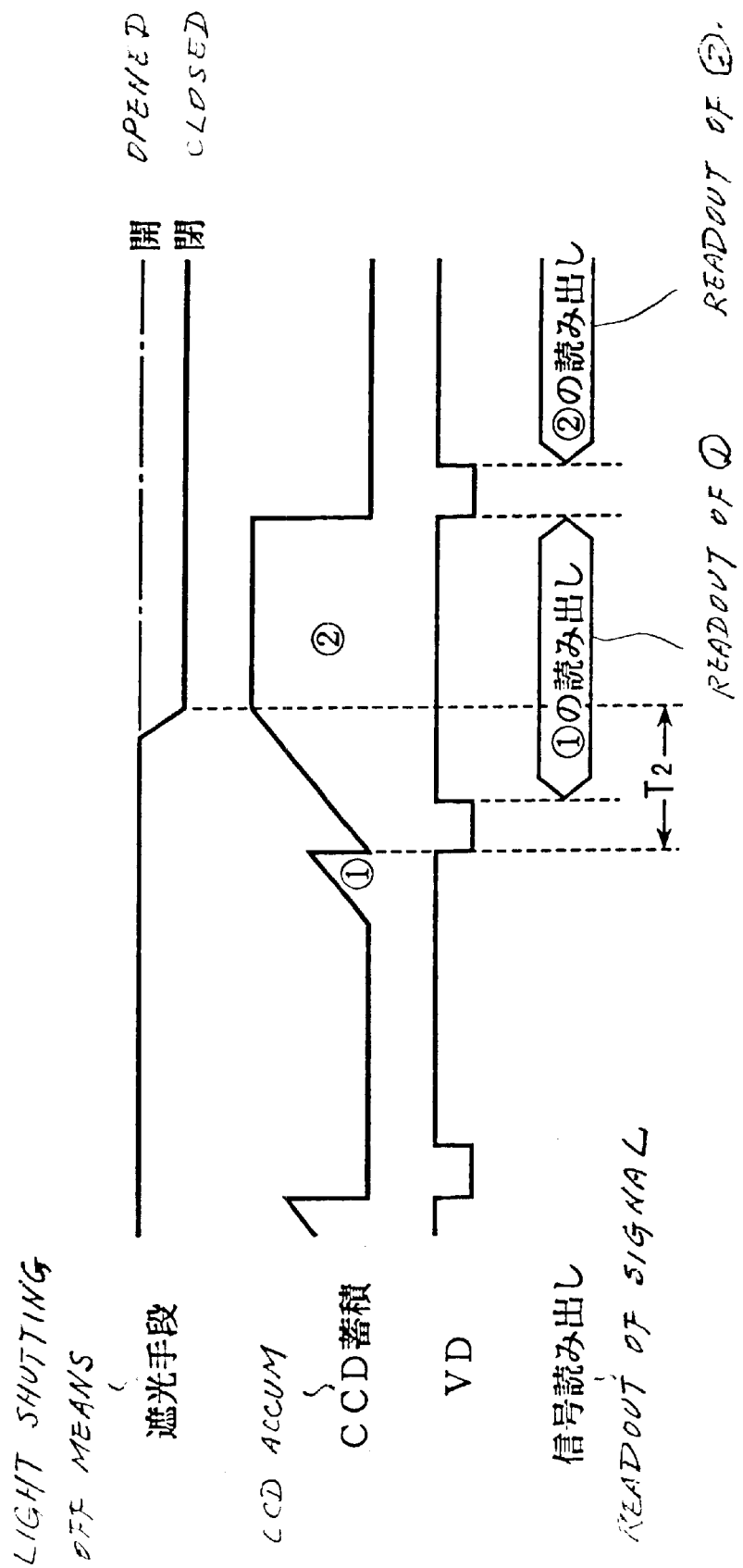
FIG. 4 is a timing chart for explaining the conventional manner for generating two image pickup signals of different exposure amount using an electronic shutter function and a means for shutting off light.

A description will now be given with respect to a first embodiment according to the present invention of technique for obtaining an increased wide dynamic range by reading out and synthesizing two image pickup signals of different exposure amount in an electronic camera which is constructed as the above. In the above described conventional example as disclosed in Japanese patent application laid open No.4-207581, as shown in FIG. 4, an electronic shutter function of CCD image pickup device is used to perform a first shot of picture taking to obtain image pickup signal of smaller exposure amount and means for shutting off light (shutter) is used to perform a second shot of picture taking to obtain image pickup signal of larger exposure amount. Included in FIG. 4 are: first shot, ①: second shot, ②; vertical synchronizing signal, VD; and charge accumulating time for the second shot, $T_2$.

Figure 5:
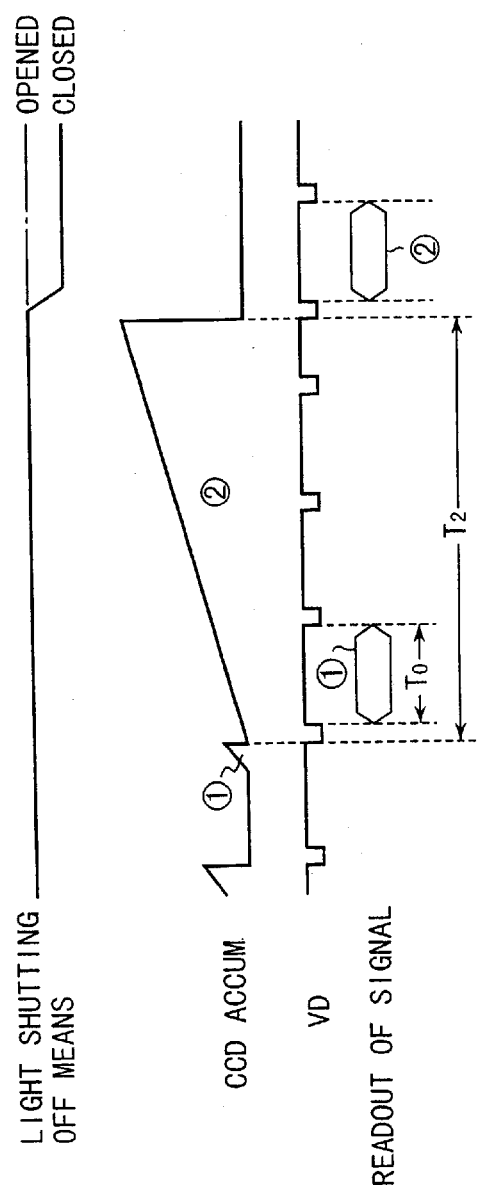
FIG. 5 is a timing chart for explaining the manner of generating two image pickup signals of different exposure amount in a first embodiment of electronic camera according to the present invention.

In the first embodiment of the present invention, as shown in FIG. 5, a first shot ① for obtaining image pickup signal of smaller exposure amount is performed by using an electronic shutter function of CCD image pickup device in a similar manner as the conventional example. On the other hand, when a charge accumulating time $T_2$ (time to be set in accordance with the conditions of the object) of CCD image pickup device for a second shot ② to obtain image pickup signal of larger exposure amount is set as longer than time $T_0$ (usually equals to the period of one vertical synchronizing signal) required for readout of all the pixels of CCD image pickup device, the image pickup signal of larger exposure amount is generated by using the electronic shutter function of CCD image pickup device.

In particular, since readout of the image pickup signal of smaller exposure amount is complete at the end of the charge accumulating time of CCD image pickup device for obtaining image pickup signal of larger exposure amount, the electronic shutter function can be used in setting of a charge accumulating time for obtaining image pickup signal of larger exposure amount. By using the electronic shutter function in this manner, it is possible to control the charge accumulating time more accurately than in the case of using means for shutting off light. It should be noted that all the operations of the above described CCD image pickup device, means for shutting off light, etc., are controlled by control signals from CPU.

Figure 6:
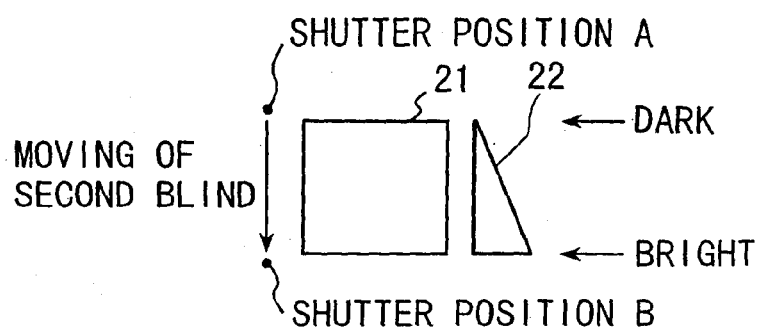
FIG. 6 illustrates the problems in the case of using a means for shutting off light in generating two image pickup signals of different exposure amount.

A second embodiment will now be described. Usually in the case where means for shutting off light is included in an electronic camera, it is used while the means for shutting off light is kept opened. If a picture is to be taken by setting a charge accumulating time, the charge accumulating time is set by closing the means for shutting off light. A start of charge accumulating time is effected by applying a shutter pulse to the CCD image pickup device in a similar manner as an electronic shutter so as to discharge unwanted charge to start photoelectric conversion. Accordingly, if a focal-plane shutter is used as the means for shutting off light, only the second blind is operated to set the charge accumulating time. As shown in FIG. 6, a difference in charge accumulating time due to the moving of the second blind occurs from one pixel to another on a light receiving surface 21 of CCD image pickup device depending on their positions (for example between the leading edge and trailing edge). As a result, an occurrence of shading 22 having a constant inclination cannot be avoided in the image pickup signals. It should be noted that, in FIG. 6, shutter position A, B respectively represents a position of the leading edge of the second blind.

In the present embodiment, in order to eliminate this, the shading is corrected by providing a shading correction means having a characteristic reciprocal to the above described inclination. This shading correction means is provided for example in a camera signal processing circuit to perform shading correction by means of signal processing.

Figure 7:
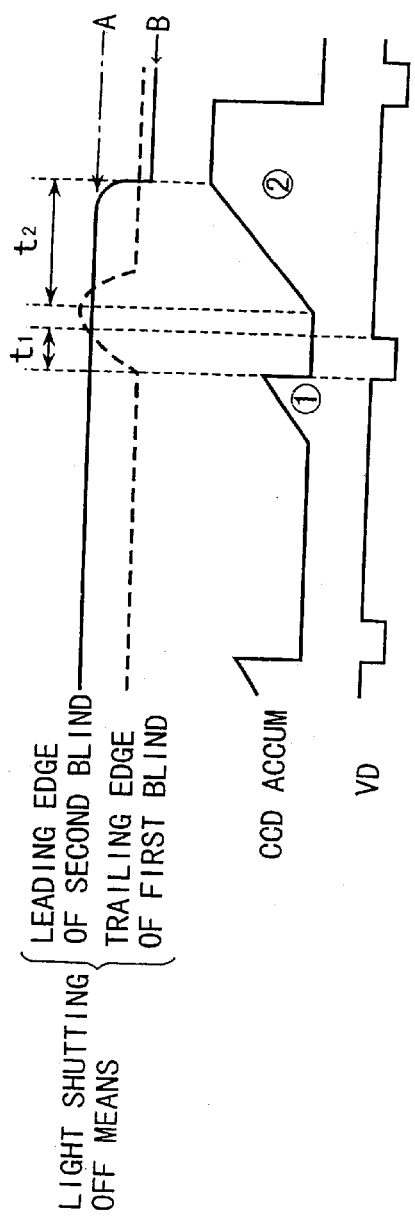
FIG. 7 is a timing chart for explaining the manner of generating two image pickup signals of different exposure amount in a third embodiment of the present invention.
Figure 8:
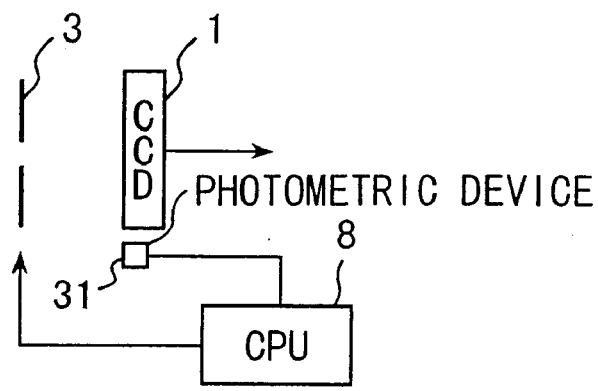

A third embodiment will now be described. This embodiment is adapted to be capable of preventing an occurrence of shading when a focal-plane shutter is used as the means for shutting off light in setting a charge accumulating time. In particular, as shown in FIG. 7, an electronic shutter function of CCD image pickup device is used first to perform a first shot ① of smaller exposure amount, so as to generate a first image pickup signal. Then, the charge accumulating operation to the CCD image pickup device is temporarily halted immediately after the completion of the above electronic shutter operation. This is performed for example by continuing a discharging operation of unwanted charge. In this charge accumulation halting period $t_1$, a shutter charge of the focal-plane shutter is performed in order to achieve a state where both the first blind and second blind of the focal-plane shutter can be used. After the completion of the shutter charge, the charge accumulating operation of CCD image pickup device is started. A normal focal-plane shutter operation is then performed where the both blinds of the focal-plane shutter are operated, thereby performing a second shot of picture taking ② with effecting control of exposure time (actual charge accumulating time) $t_2$, so as to generate a second image pickup signal. Since the second image pickup signal is obtained from a normal focal-plane shutter operation, no shading occurs and, therefore, shading correction means becomes unnecessary. It should be noted that, in FIG. 7, A, B respectively represents a position of the shutter (positions corresponding to A, B in FIG. 6).

Figure 8:
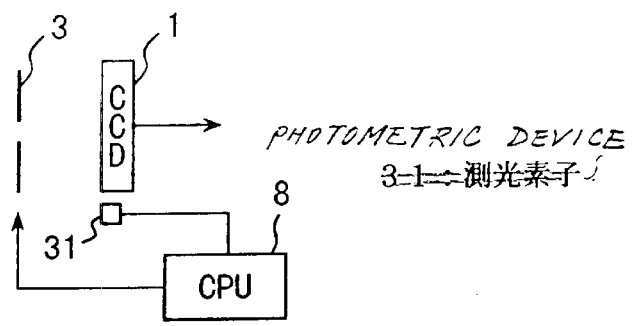
FIG. 8 is a schematic block diagram showing the construction of main portion of a fourth embodiment of the present invention.

A fourth embodiment will now be described. In this embodiment, as shown in FIG. 8, a photometric device 31 having a separated entity from CCD image pickup device 1 is disposed near the CCD image pickup device 1. The charge accumulating time of CCD image pickup device 1 in a second shot is set in such a manner as to correspond to a predetermined ratio of exposure amount between two shots of picture taking, based on an exposure amount actually measured at the above photometric device 31 at the time of the first shot.

Figure 9:
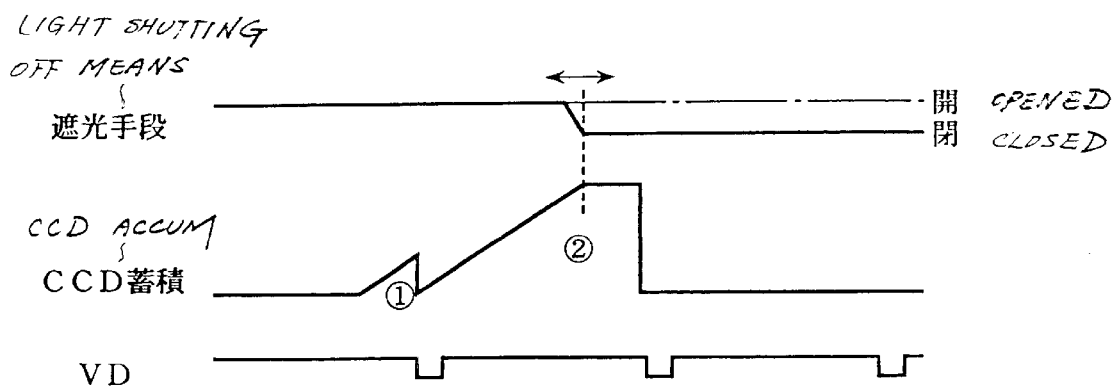
FIG. 9 is a timing chart for explaining the operation in the fourth embodiment shown in FIG. 8.

In particular, the exposure amount ratio of the two shots are previously determined for example as 1:8 or 1:16. A first shot ① is thus performed as shown in FIG. 9 by setting a charge accumulating time in such a manner as to result an exposure amount of ⅛ or 1/16 of AE value obtained before the picture taking. A first image pickup signal is thereby generated. At this time, actual exposure amount is measured by the photometric device 31. Then, based on the actually measured exposure amount, the charge accumulating time of CCD image pickup device at the time of second shot is set in such a manner as to correspond to the predetermined exposure amount ratio (for example 1:8 or 1:16) of the two shots of picture taking, and the second shot ② is performed to generate a second image pickup signal. The two image pickup signals are then synthesized to form an image having a wide dynamic range. In this case, since the charge accumulating time in the second shot ② is based on the actual exposure amount measured by a photometric device, an accurate control of the actual exposure amount ratio is possible between the two image pickup signals.

Figure 10:
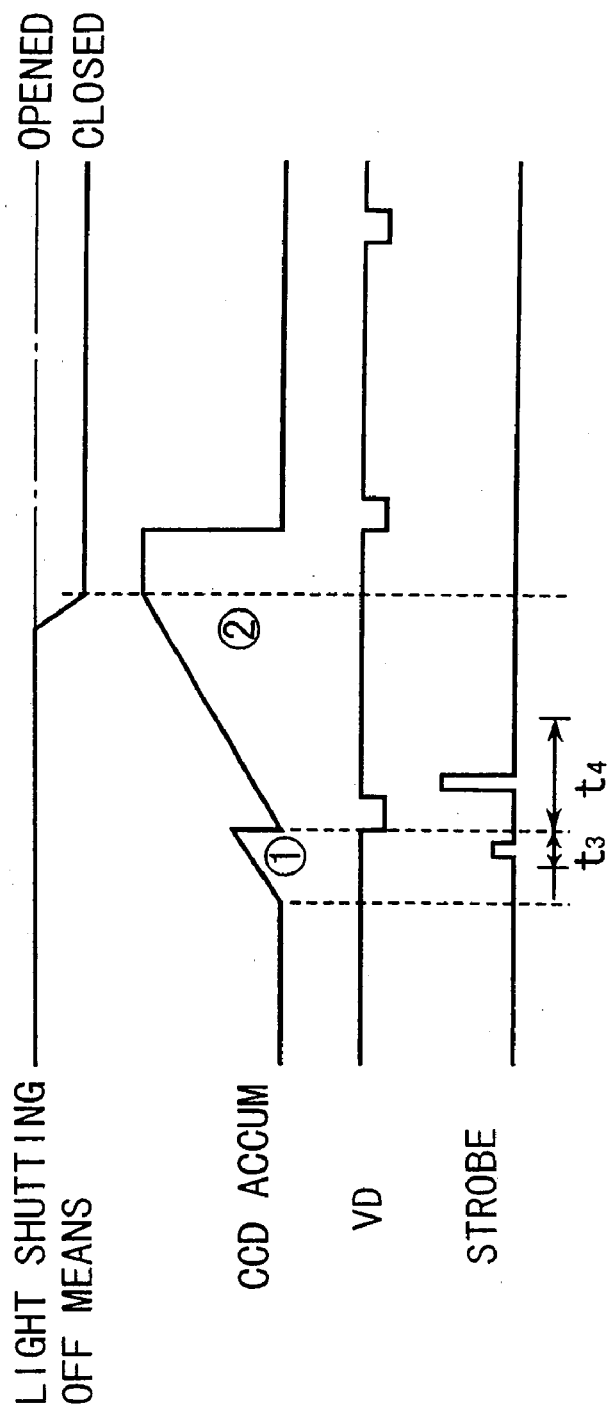
FIG. 10 is a timing chart for explaining the manner of generating two image pickup signals of different exposure amount in a fifth embodiment of the present invention.
Figure 11:
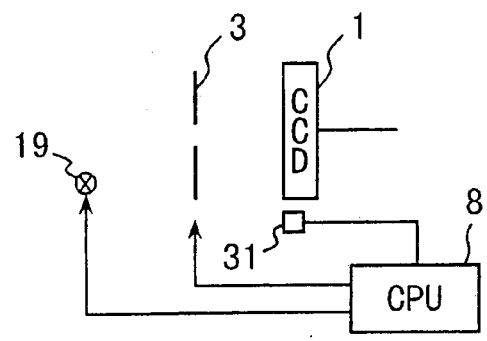
Figure 12:
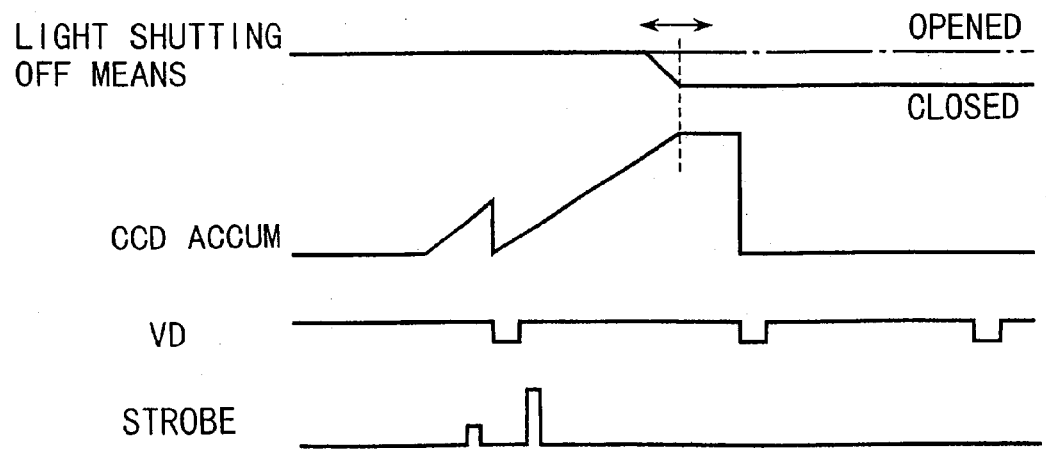
Figure 13A:
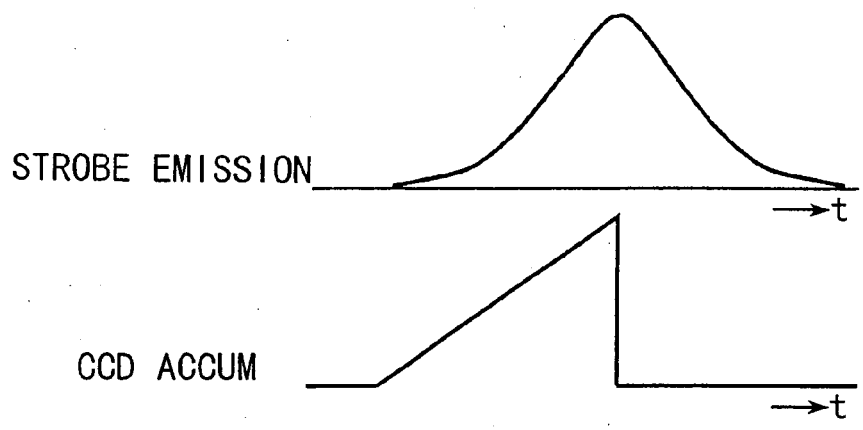
Figure 13B:
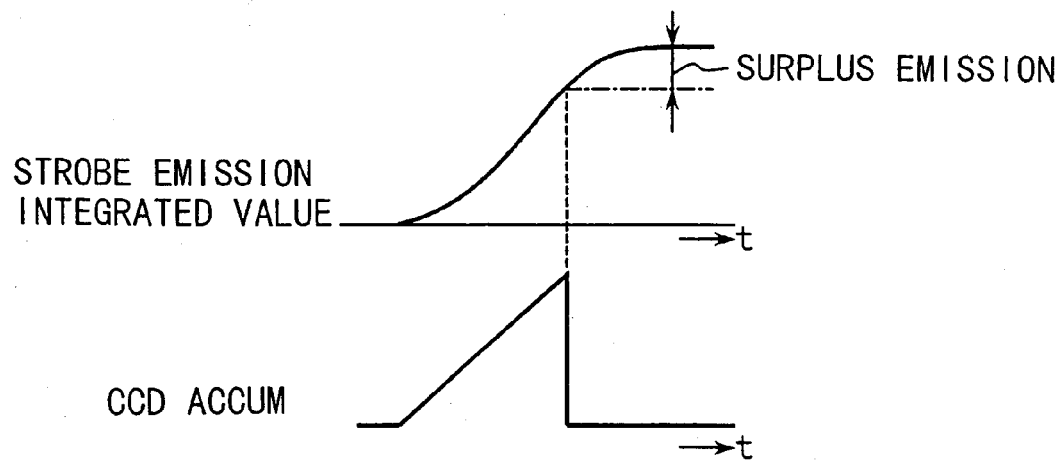
Figure 14:
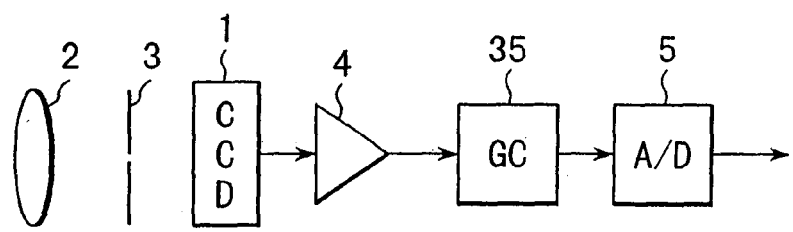
Figure 15:
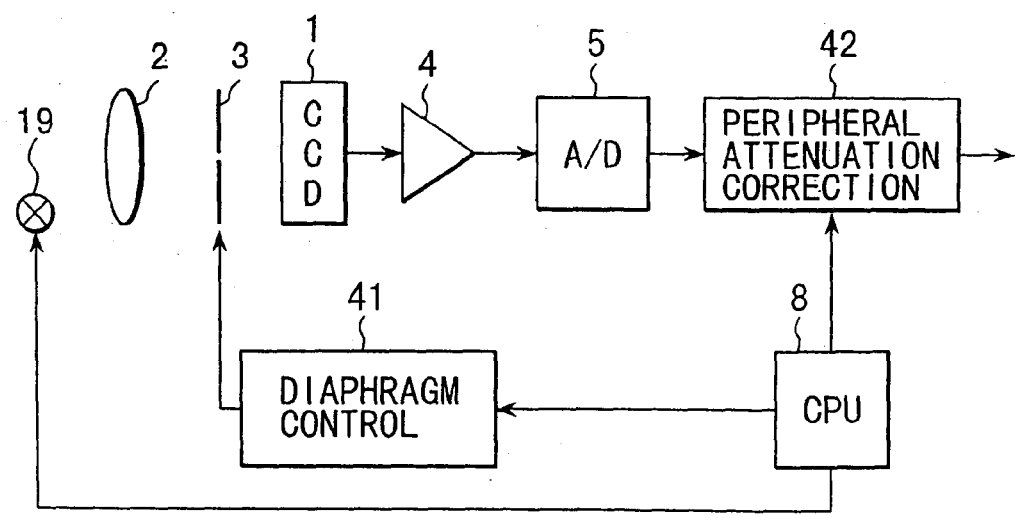
Figure 16:
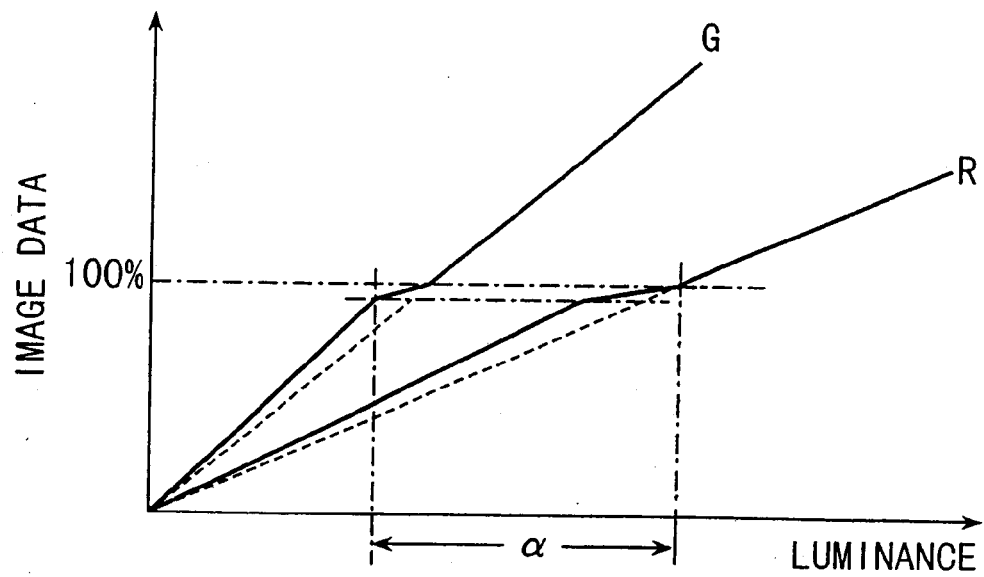
Figure 17:
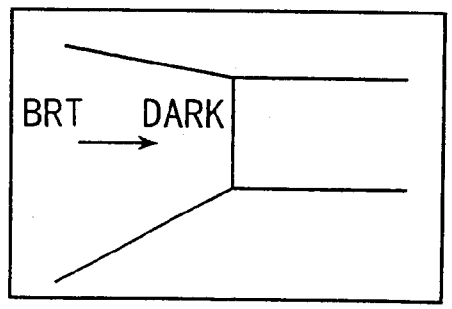
Figure 18A:
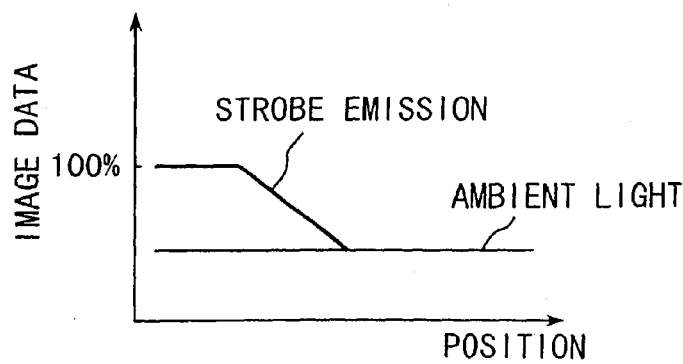
Figure 18B:
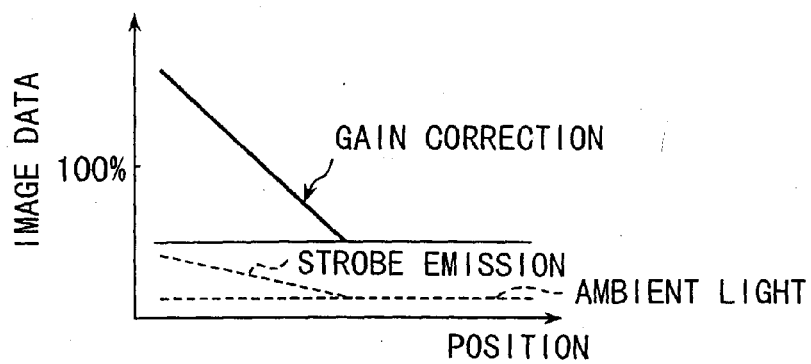
Figure 19:
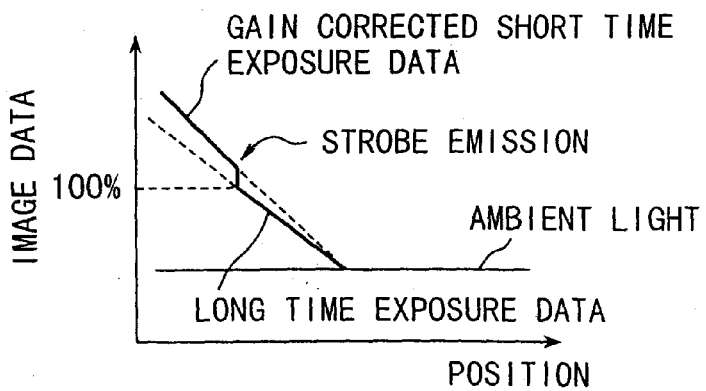
Figure 20:
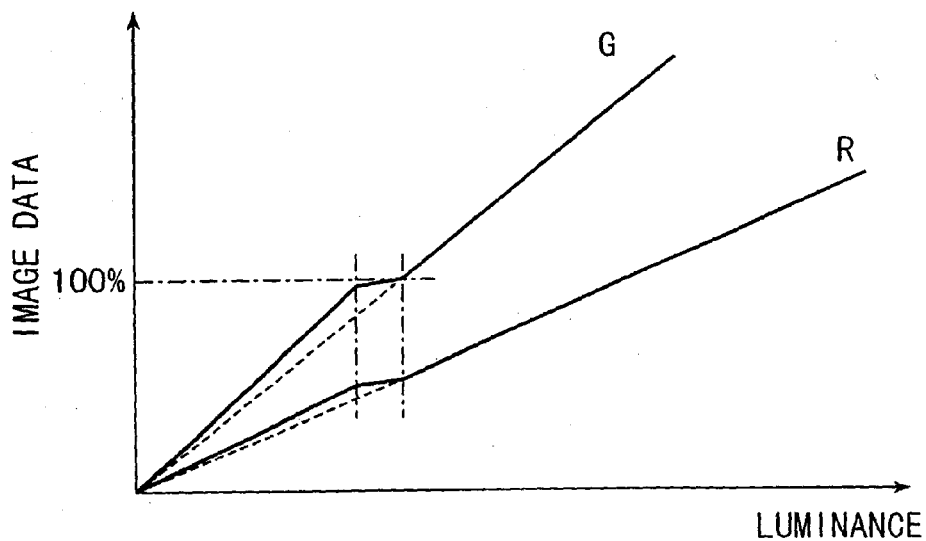
Figure 21:
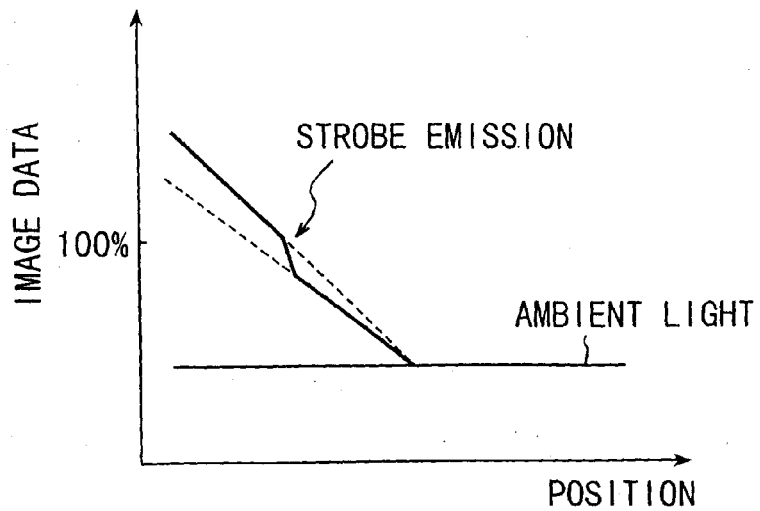
Figure 22:
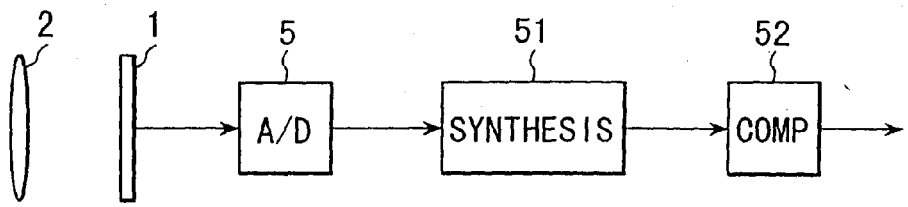
Figure 23:
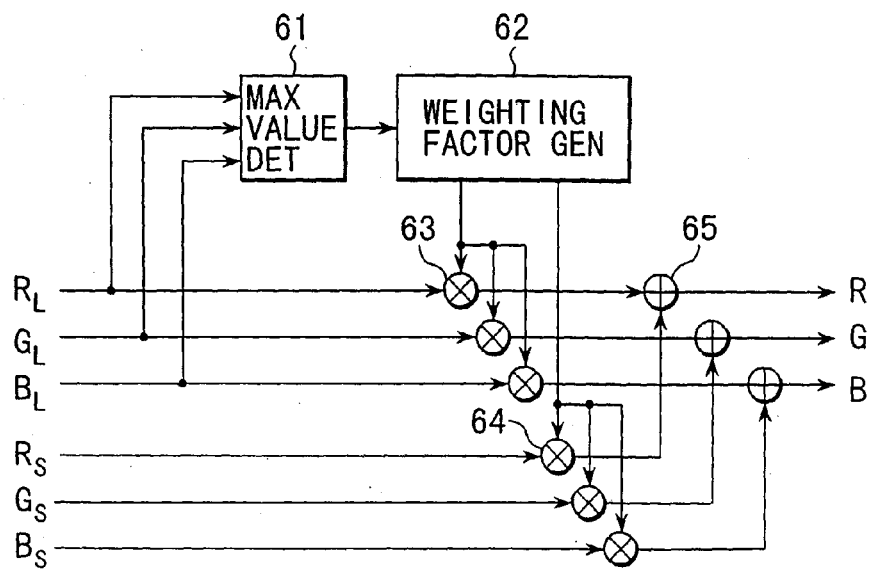
Figure 25A:
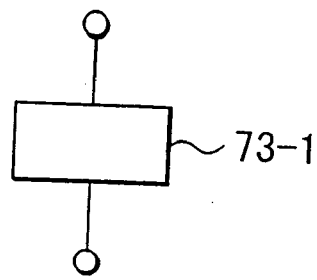
Figure 25B:
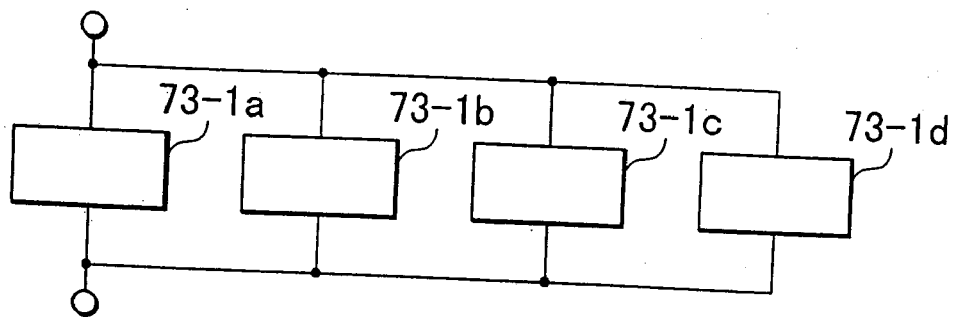
Figure 26:
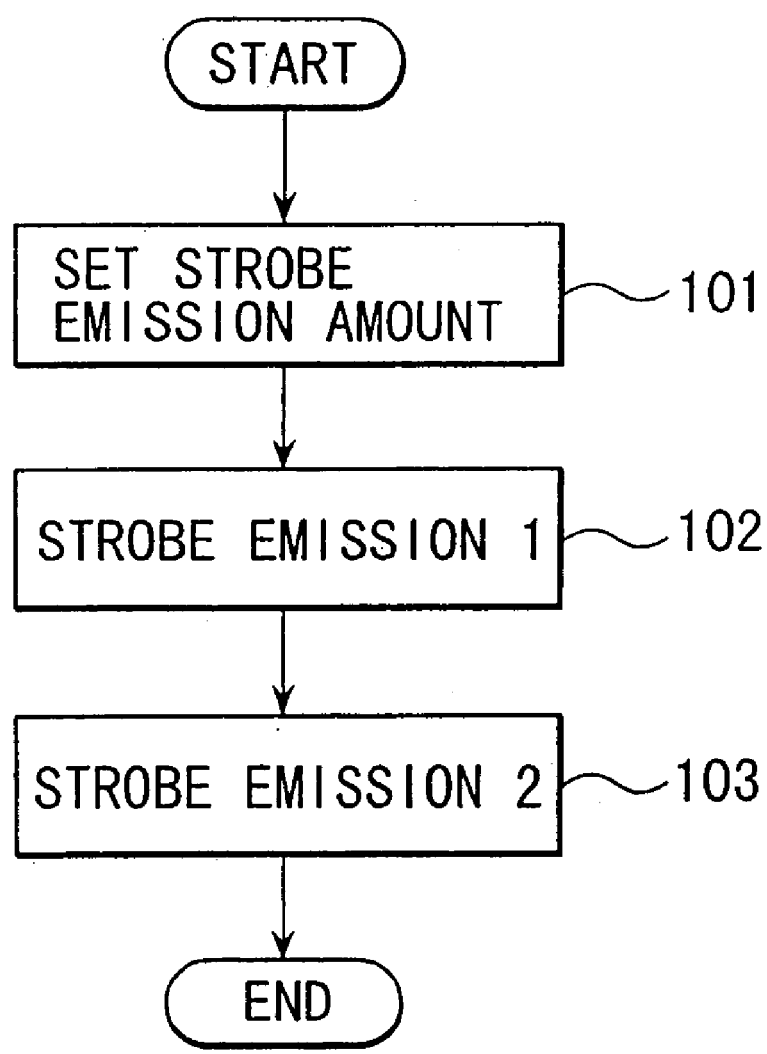

A fifth embodiment will now be described. In this embodiment, a strobe emission timing in the case of picture taking using a strobe in combination is suitably controlled so that an occurrence of false color in the synthesized image can be prevented to an extent possible. In particular, as shown in FIG. 10, a strobe is caused to emit at one or both of timing at $t_3$ in the second half of the charge accumulating time in the first shot ① or timing at $t_4$ in the first half of the charge accumulating time of the second shot ②.

Thereby, although an occurrence of time difference between the two shots of picture taking is unavoidable, it is controlled to a minimum and an occurrence of false color in the synthesized image is reduced to an extent possible. In addition, by reducing the time difference, the influence of shaking can also be mitigated.

A sixth embodiment will now be described. In this embodiment, too, a strobe emission is used to generate two image pickup signals of different exposure amount. However, since actual emission amount of a strobe varies, an emission amount ratio is actually measured by using a photometric device so that an exposure amount ratio is set correspondingly to such emission amount ratio.

Figure 11:
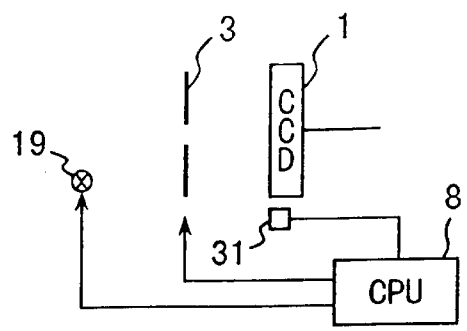
FIG. 11 is a schematic block diagram showing the construction of main portion of a sixth embodiment of the present invention.
Figure 12:
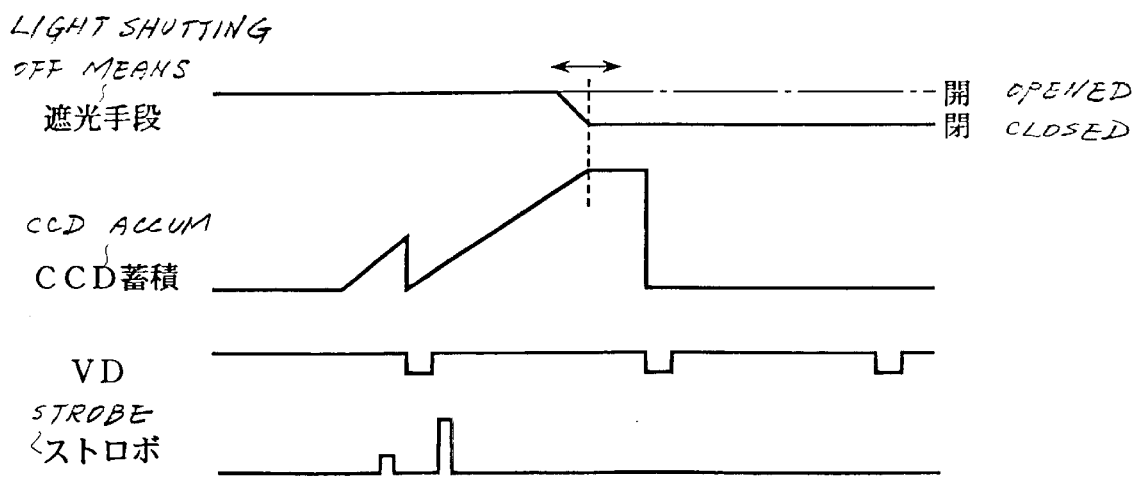
FIG. 12 is a timing chart for explaining the operation of the sixth embodiment shown in FIG. 11.

In particular, as shown in FIG. 11, a photometric device 31 is disposed near the CCD image pickup device 1 and an emission is effected in both of the two shots of picture taking by a strobe mechanism 19. These two strobe emission amounts are set to a predetermined exposure amount ratio, for example, 1:8 or 1:16. As shown in FIG. 12, an emission is effected at a timing in the second half of the first shot and at a timing in the first half of the second shot. Since, however, a variance occurs in the actual strobe emission, the ratio of the strobe emission amounts is measured by the above described photometric device 31 and the charge accumulating time at the second shot of picture taking is set in such a manner as to correspond to the actually measured emission amount ratio. In the case where two image pickup signals of different exposure amount are generated by using a strobe emission, too, an accurate control of the exposure amount ratio can be achieved correspondingly to the strobe emission amount ratio even with a variance occurring in strobe emission. It should be noted that, in this case, synthesis of the two image pickup signals is performed based on the exposure amount ratio corresponding to the actually measured emission amount ratio.

Figure 13A:
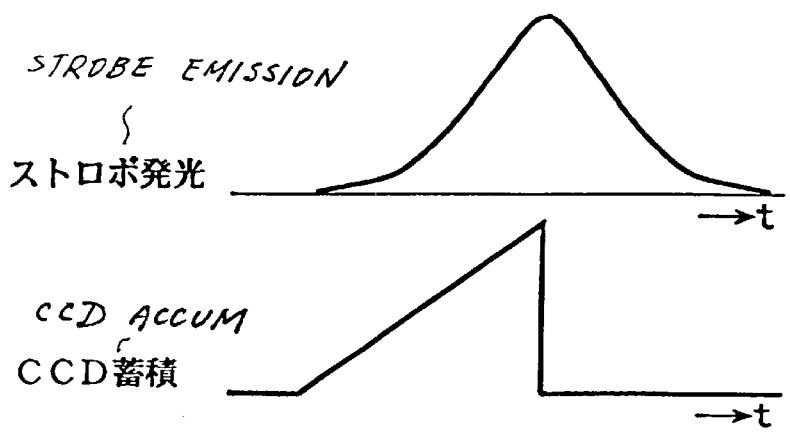
FIGS. 13A and 13B illustrate the manner of a surplus emission of strobe.
Figure 13B:
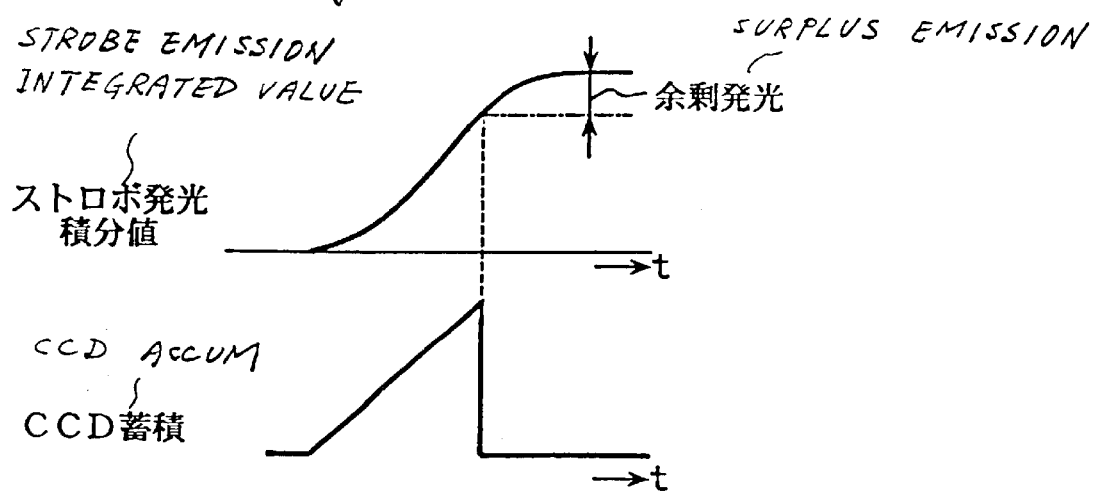

A seventh embodiment will now be described. Generally, a strobe emission accompanies a surplus emission. In particular, as shown in FIG. 13A, a strobe emission accompanies a surplus emission even after the stopping of the emission, resulting in a mountain like curve. When represented in integrated values, this results in a curve leading to a saturation as shown in FIG. 13B. An error in emission amount due to such surplus emission is larger in its proportion as the emission amount is smaller. Thus, in the present embodiment, at the first smaller emission of the two emissions, an emission stop timing (timing of an emission stop signal) and completion timing of the electronic shutter operation of CCD image pickup device are brought to the same point in time so that an influence of such surplus emission be eliminated in setting an exposure amount ratio.

An eighth embodiment will now be described. In this embodiment, when generating two image pickup signals of different exposure amount, a diaphragm stop value of lens at the two shots of picture taking is fixed, thereby the image pickup signals are obtained as having an equal depth of field. It is thereby possible to prevent a false color resulting from a synthesis of an image in focus and an image out of focus.

The diaphragm stop value to be used here is the diaphragm stop value at an optimum diaphragm stop value and shutter speed obtained by the exposure setting means prior to the picture taking. Then, the above optimum diaphragm stop value and shutter speed are used at a shot for taking image pickup signal of larger exposure amount. At the time of shot for taking image pickup signal of smaller exposure amount, the same diaphragm stop value as the above is used while the shutter speed is set in accordance with a predetermined exposure amount ratio.

Further, photometry in obtaining the optimum diaphragm stop value and shutter speed at the exposure setting means may be performed either by using CCD image pickup device, or by using an external photometric device provided separately from the CCD image pickup device.

A ninth embodiment will now be described. In this embodiment, when two image pickup signals of different exposure amount are generated and synthesized, there is provided means for performing a white balance correction by using the same white balance correction value with respect to the two image pickup signals before such synthesis. Thereby, an occurrence of false color in the synthesized image is prevented.

Here, the correction value to be used in the above white balance correction is the white balance correction value obtained by white balance setting means before the picture taking, and the white balance correction is performed on the two image pickup signals before the synthesis. It is also possible to set a white balance correction value based on the two actually obtained image pickup signals.

Further, in general, it is necessary that a white balance be set for the portion of the main object of an image. The portion to become the main object of an image is more likely to be included in the image pickup signal of larger exposure amount. Accordingly, a white balance correction value can be efficiently determined and the synthesis can be performed with an optimized white balance of the main object by obtaining a white balance correction value based on the larger-exposure image pickup signal of the two image pickup signals.

A tenth embodiment will now be described. In this embodiment, instead of performing white balance correction respectively for the two image pickup signals of different exposure amount before synthesis, white balance correction means is constructed to perform white balance correction with respect to an image after the synthesis. It is thereby possible to efficiently perform a white balance correction. The white balance correction value to be used in this case, too, may either be a white balance correction value obtained by white balance setting means before the picture taking or be one obtained based on an already synthesized image. It can also be one set based on the two image pickup signals before performing the synthesis. Also, in this case, the white balance correction value can be set based on the image pickup signal of larger exposure amount of the two image pickup signals before performing the synthesis.

An eleventh embodiment will now be described. Normally, two image pickup signals of different exposure amount are fixed of gain when subjected to synthesis. In an electronic camera performing such synthesis, generation of two image pickup signals by taking picture at an exposure amount ratio of 1:8, for example, requires a shutter speed ratio of $1/4:1/32$. A shutter mechanism, however, is normally provided with the shutter speeds of $1/4$, $1/8$, $1/15$, $1/30$, $1/60$, $1/125$, $1/250$, $1/500$, etc. Image pickup signals at an accurate exposure amount ratio cannot be generated, if an attempt for correspondence is made by using shutter speeds of $1/4:1/30$.

Figure 14:
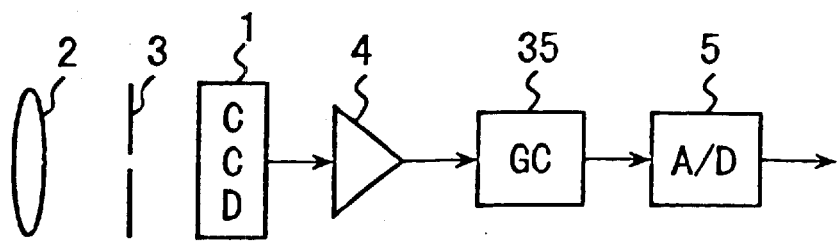
FIG. 14 is a schematic block diagram showing the construction of main portion of an eleventh embodiment of the present invention.

In the present embodiment, thus, gain control means 35 is provided as shown in FIG. 14 at a stage succeeding the amplifier 4 so that different gain values can be respectively set for the two image pickup signals of different exposure amount. Here, in this aspect, the gain values for two image pickup signals are set so that the exposure amount ratio of two image pickup signals corresponds to a predetermined exposure amount ratio (image synthesizing ratio). Even when shutter speed cannot be accurately adapted to an exposure amount ratio, an image pickup signal equivalent to the case of picture taking at a shutter speed of $1/32$, for example in the above exemplary case, can be obtained by changing the gain value of image pickup signal taken at the shutter speed of $1/30$. It is thereby possible to generate two image pickup signals which are accurately set to an exposure amount ratio.

A twelfth embodiment will now be described. In this embodiment, when two image pickup signals of different exposure amount are generated, the diaphragm stop value of lens is changed while fixing the charge accumulating time to generate the image pickup signals of different exposure amount. Image pickup signals at a predetermined exposure ratio can thus be obtained without precisely controlling the charge accumulating time.

Figure 15:
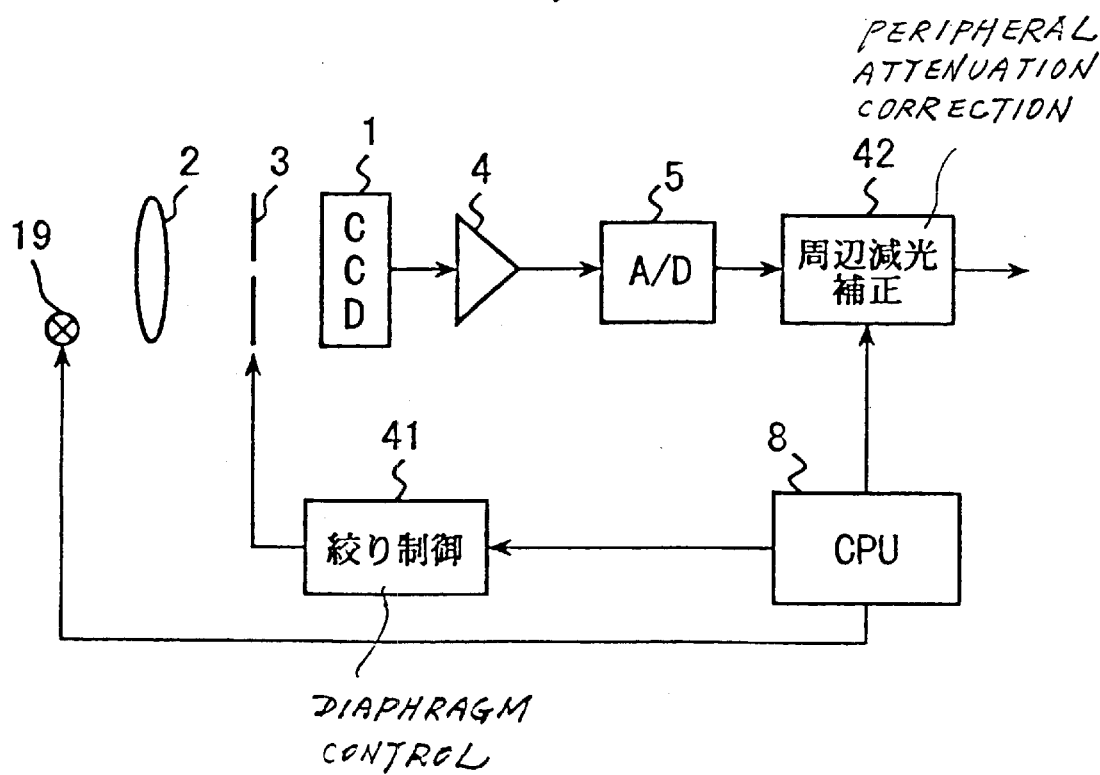
FIG. 15 is a schematic block diagram showing the construction of certain portions of a twelfth embodiment of the present invention.

In this aspect, degree of peripheral attenuation (phenomenon of lowered illuminance in proportion to the fourth power of cosine of angle of view) is changed due to the change in diaphragm stop value of lens. To remove such peripheral attenuation, a peripheral attenuation correction circuit 42 is provided as shown in FIG. 15 to correct the peripheral attenuation in accordance with the diaphragm control by a diaphragm control circuit 41. It is thereby possible to correct the peripheral attenuation occurring due to a change in the diaphragm stop value of lens.

Further, as shown in FIG. 15, in the case where a strobe emission is used to generate two image pickup signals of different exposure amount, two emissions equal to each other in emission amount are effected and the diaphragm stop value of lens is changed so as to generate image pickup signals of different exposure amount. The emission amount ratio of strobes and the exposure amount ratio of ambient light can thus be made equal to each other without requiring a precise control of strobe's emission amount.

A thirteenth embodiment will now be described. This embodiment relates to image synthesizing technique in forming a synthesized image having a wide dynamic range by synthesizing two image pickup signals of different exposure amount.

As has been described above, in fundamental of the image synthesizing technique disclosed in Japanese patent application laid open No.6-141229, a saturated portion in the image pickup signal of larger exposure amount is replaced by the image pickup signal of smaller exposure amount. In such replacing operation, a gain correction according to exposure amount ratio is performed to obtain a synthesized image which is linear and possesses a wide dynamic range. An inclined weighting factor is assigned at the time of the synthesis to effect a smooth switching in an overlapping manner.

Figure 16:
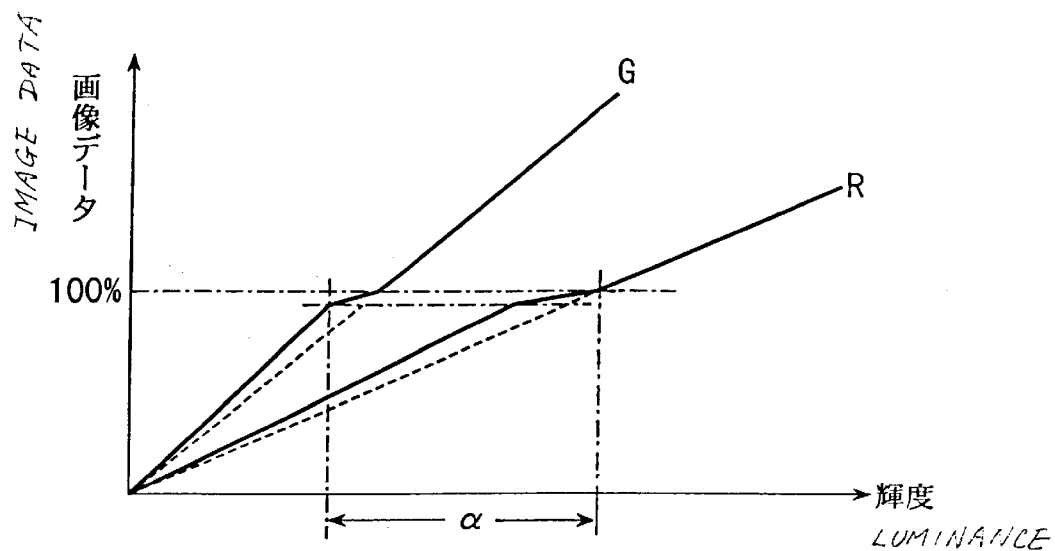
FIG. 16 illustrates the problems in the case where a synthesized image having a wide dynamic range is generated by synthesizing color image signals of different exposure amount using the conventional image synthesizing technique.

However, if this technique is simply applied to color image signals, there occurs a problem as follows. In particular, supposing R, G signals differing in output level with respect to luminance as shown in FIG. 16, synthesized by weighting factors such as of the above with a determined level of 100%, it is in actuality often impossible to obtain a linear synthesizing output due to variance in device, even when the synthesis is performed in accordance with an exposure amount ratio. It should be noted that, in FIG. 16, solid lines represent the synthesizing image data of G, R signals, the illustrated case indicating that actual level of the image data of smaller exposure amount is lower than that by the exposure amount ratio. In such case, since ratio between G signal and R signal is changed in the range α where the linear characteristic is not preserved, the color is not correctly reproduced and appears as a false color. In the disclosure in the above publication, this point is not taken into consideration at all.

By contrast, Japanese patent application laid open No.7-131708 discloses a synthesizing technique in which one obtained from actual image data is used as the synthesizing ratio in actual synthesis between image pickup signal of larger exposure amount and image pickup signal of smaller exposure amount. By applying this synthesizing technique, the problem in the technique disclosed in the above Japanese patent application laid open No.6-141229 is fundamentally eliminated.

Figure 17:
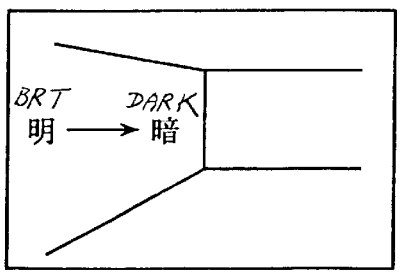
FIG. 17 illustrates the manner of occurrence of gradation when a strobe light is emitted against a wall surface.

However, if strobe emission is applied to the synthesizing technique disclosed in Japanese patent application laid open No.7-131708, there occurs a problem as follows. In particular, a mode is supposed here as the scene of picture taking using a strobe emission that, when there is a wall on the left side within a room as shown in FIG. 17, a strobe is emitted against the wall, whereby a gradation of luminance occurs such that the near side is brighter and it gets darker toward the far side with respect to the strobe light. In this mode, a fixed level of ambient light is assumed. When picture is taken by a longer exposure time (larger exposure amount) with emitting a strobe, the manner of level of image data with respect to positions is represented as diagrammatically in FIG. 18A. On the other hand, when picture is taken by a shorter exposure time (smaller exposure amount) by changing exposure amount and strobe emission amount (for example 1:4), an image data results as indicated by the dotted line in FIG. 18B. The solid line represents what is derived from gain correction (for example 4 times) of such image data.

Figure 18A:
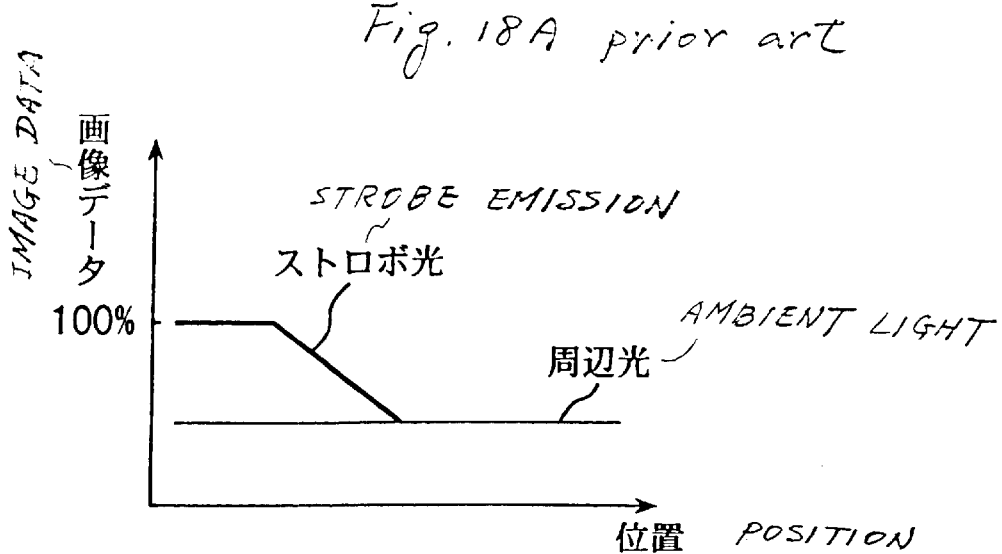
FIGS. 18A and 18B show changes in level of image data with respect to position and a manner of correcting gain thereof in the case where a strobe light is emitted by changing emission amount in the manner as shown in FIG. 17.
Figure 18B:
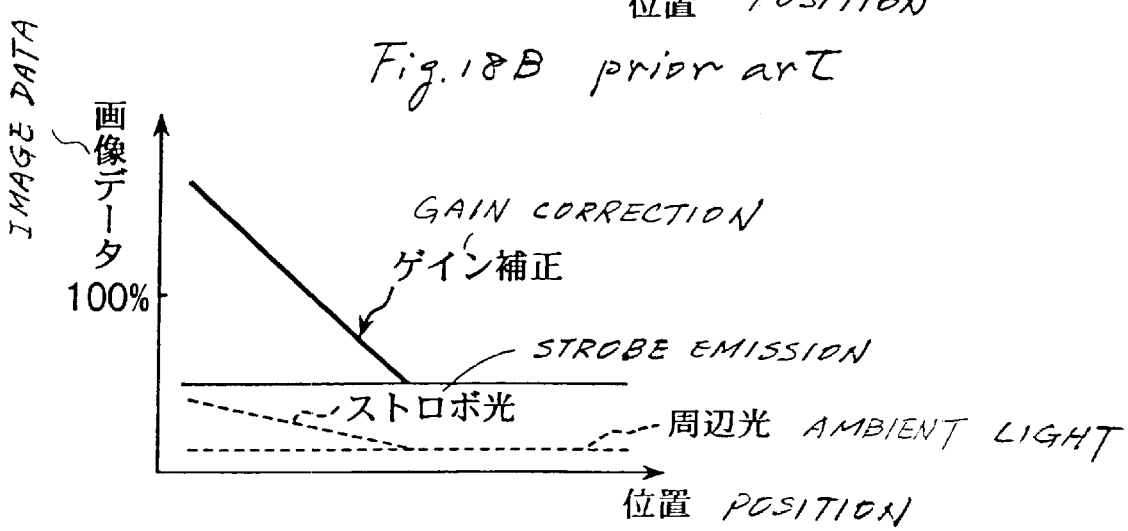
Figure 19:
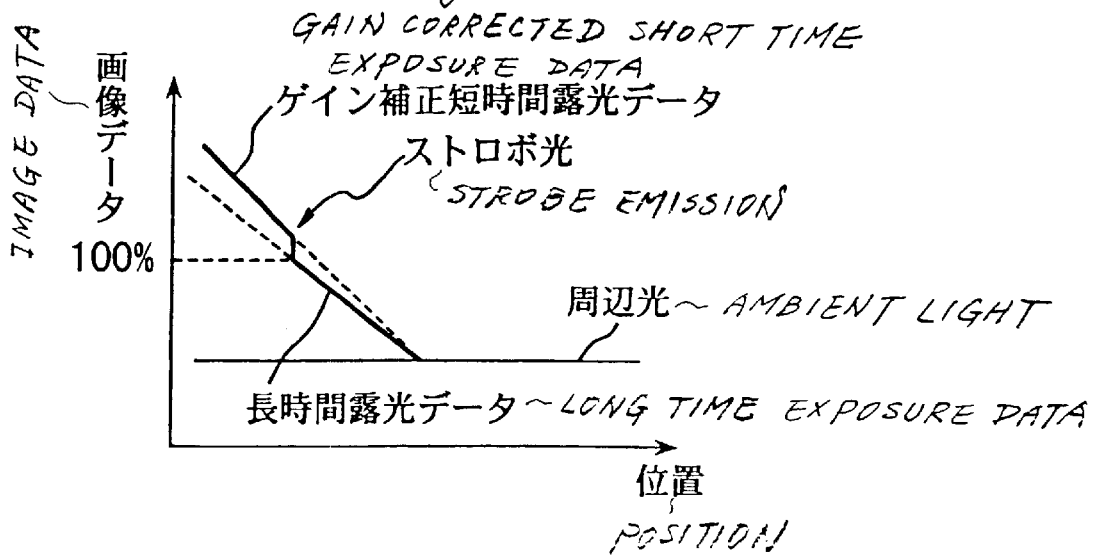
FIG. 19 illustrates the problems in the case where a synthesized image is generated by synthesizing image data shown in FIGS. 18A and 18B.

The ambient light level thus corrected of gain results in the same level of ambient light as in the longer exposure time shown in FIG. 18A. In actuality, however, it is hard to make a strobe light emit at an accurate ratio (for example 1:4) and a variance results. The example shown in this figure is of the case where the strobe emission amount in the shorter exposure time is beyond what is suitable. When image pickup signal of longer exposure time and image pickup signal of shorter exposure time such as shown in FIGS. 18A and 18B are synthesized, the portion depending on the ambient light alone is correctly synthesized as shown in FIG. 19. However, in the portion where a gradation occurs of the strobe light, an abrupt difference in luminance as shown results in the synthesized image due to the variance in the emission amount ratio. A pseudo contour occurs at the portion of such abrupt difference, resulting in a problem that even the case of smoothly changing luminance such as a wall is synthesized as if there is a contour.

The present embodiment is thus made to eliminate such problem. When a saturation of color signal occurs in one of R, G, B, color signals in the image pickup signal of longer exposure time (larger exposure amount), i.e., when it is to be replaced by signal of shorter exposure time (smaller exposure amount), a similar substitution is performed at the same time with respect to all the color signals. In performing such substitution, the color signals are added with assigning the same weighting factor to all of them to effect the substitution.

Figure 1:
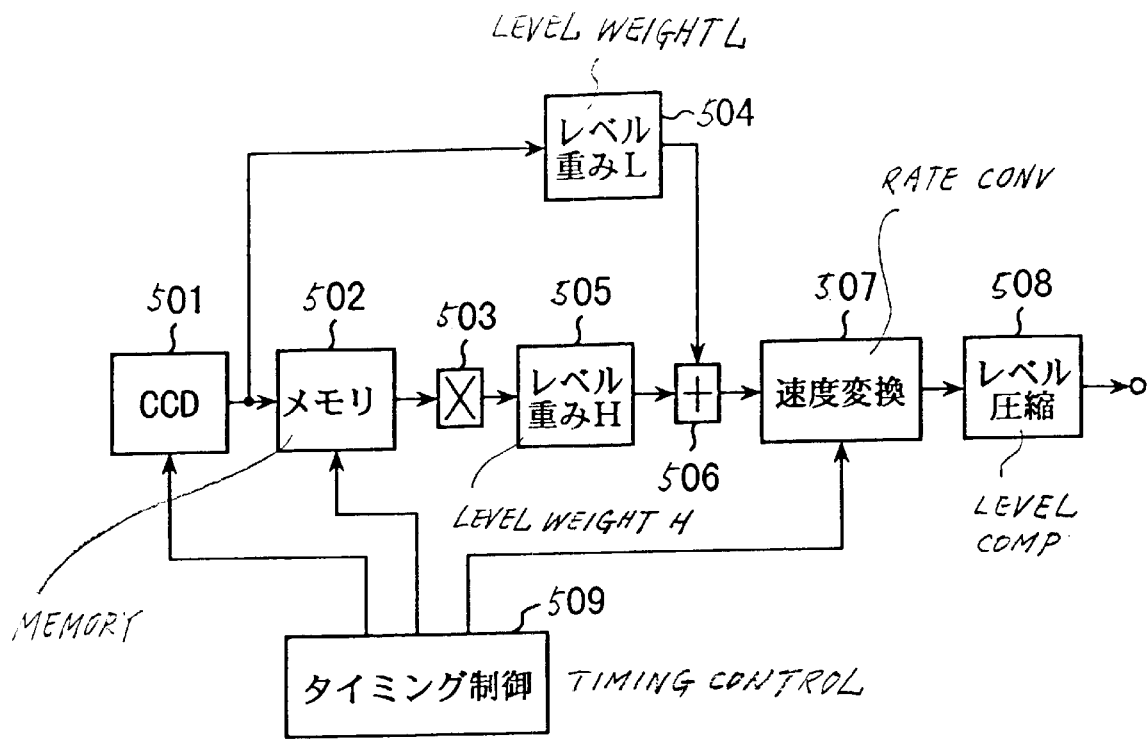
FIG. 1 is a block diagram of circuit of conventional synthesizing means for forming an image having a wide dynamic range by synthesizing two image pickup signals of different exposure amount.
Figure 2:
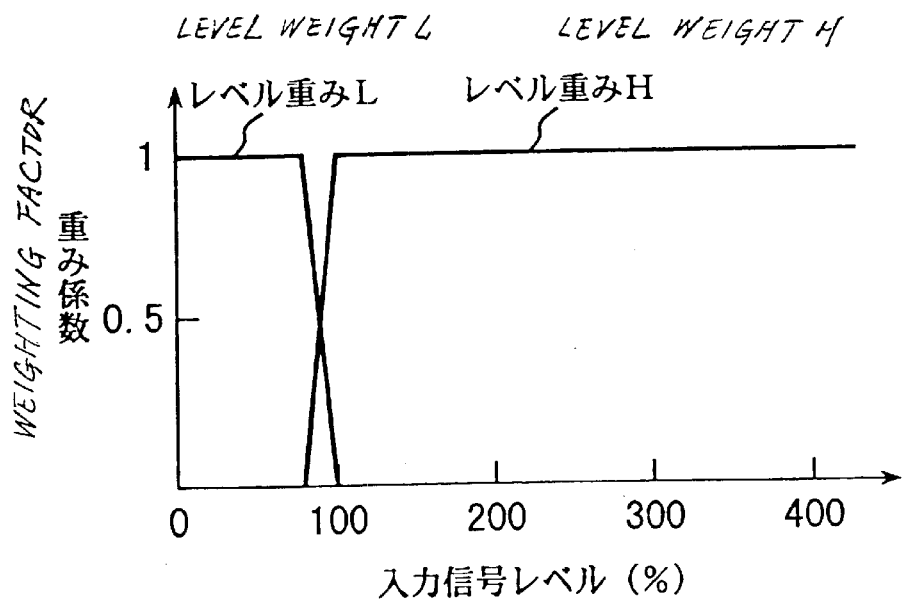
FIG. 2 shows characteristics of weighting factors for input levels in the synthesizing means shown in FIG. 1.
Figure 20:
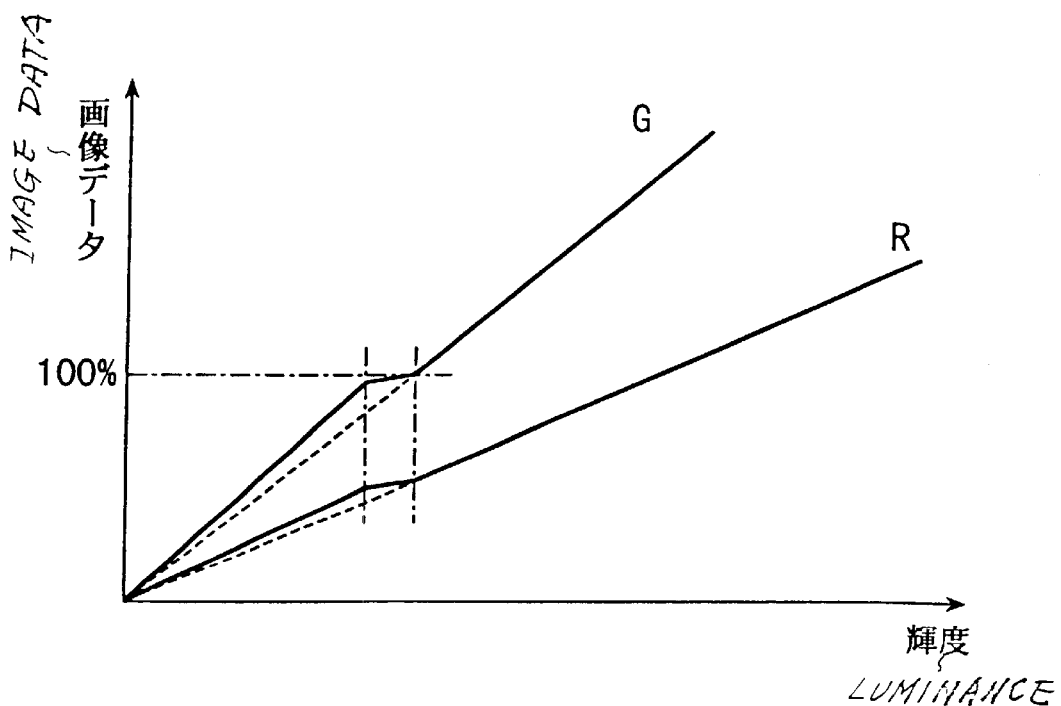
FIG. 20 shows the manner of respective synthesized color signals of a synthesized color image in a thirteenth embodiment of the present invention.
Figure 21:
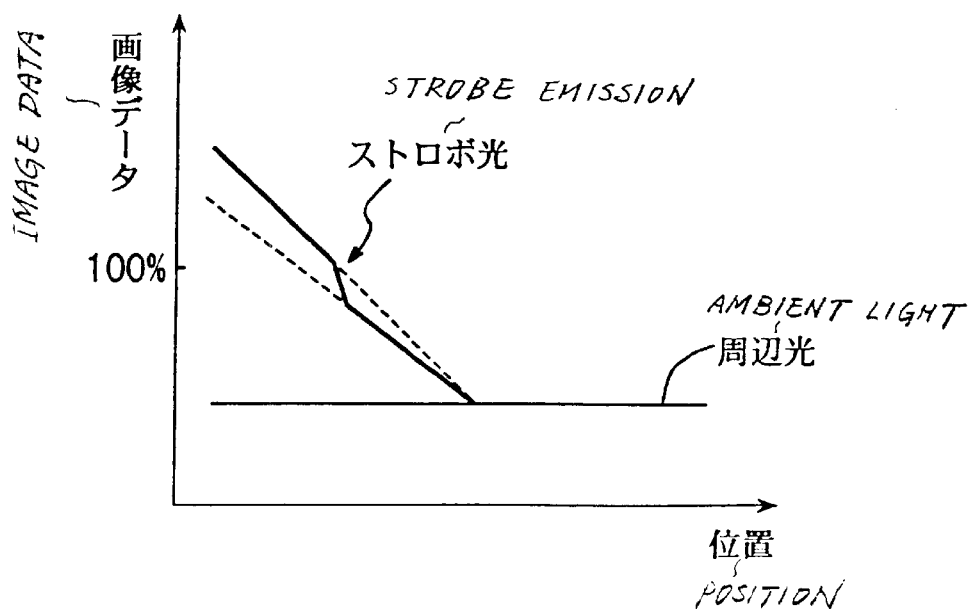
FIG. 21 shows a color synthesized image signal in the case of synthesis of the thirteenth embodiment by emitting a strobe into a space surrounded by wall surfaces in the manner shown in FIG. 17.

In particular, as shown in FIG. 20, if G signal of longer exposure time for example reaches its saturation level of 100%, it is replaced by a signal of shorter exposure time which is corrected of gain by the weighted addition. At the same time, R signal, too, is switched to signal of shorter exposure time which is corrected of gain by using the same weighting factor. In this aspect, since such switching is performed by using the same weighting factor for all the color signals even though there may be a small error, the problem of occurrence of a false color at the point of such switching is eliminated. Synthesis is then smoothly effected by changing the weighting factor in such a manner as to have an overlap at the portion of switching similarly to the weighting factor (see FIG. 2) disclosed in the previously demonstrated Japanese patent application laid open No.6-141229, so as to replace the signal of longer exposure time by the signal of shorter exposure time. The change in luminance thus occurs gradually even in the synthesized signal as shown in FIG. 21, and an occurrence of pseudo contour can be prevented even when a strobe emission is used.

Figure 22:
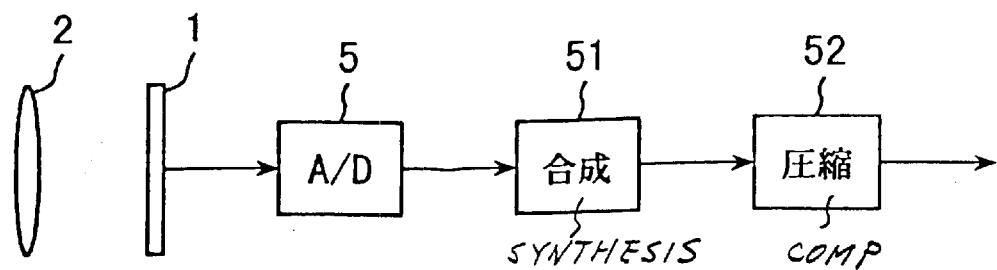
FIG. 22 is a schematic block diagram showing the construction for achieving a synthesis by the thirteenth embodiment of the present invention.
Figure 23:
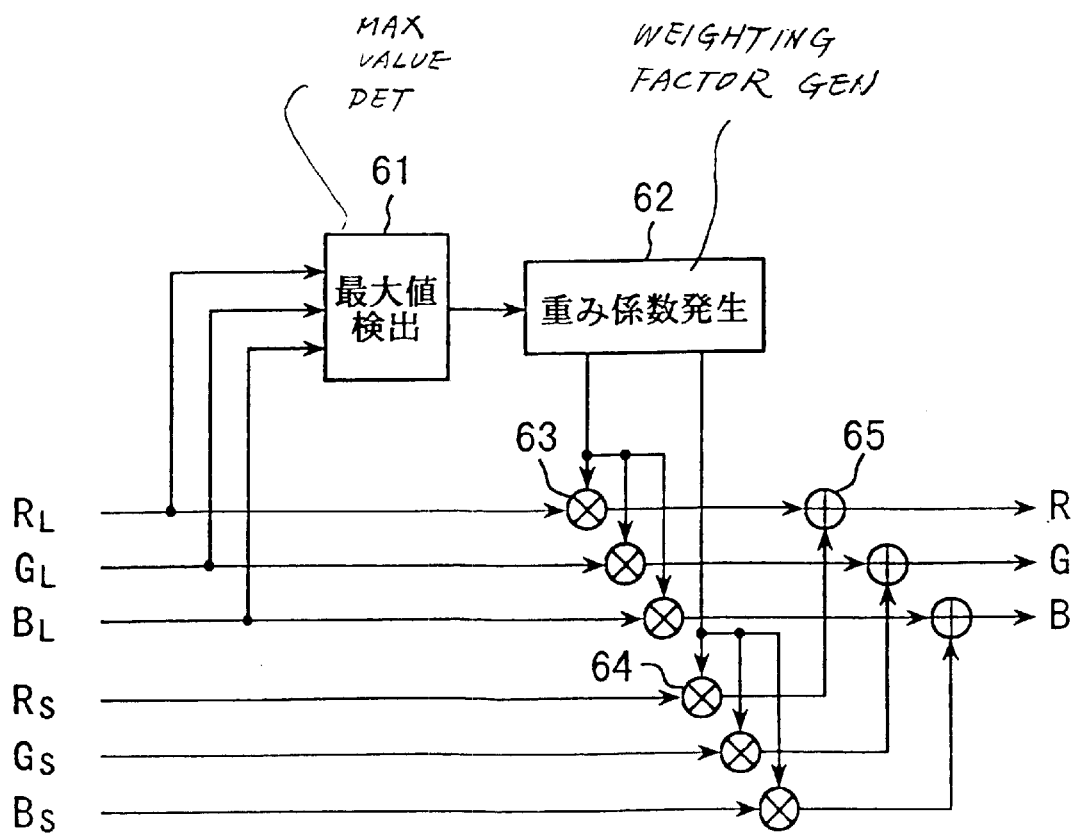
FIG. 23 is a block diagram of circuit showing an example of construction of the synthesizing circuit in FIG. 22.

As a synthesizing circuit to be actually used here, one suffices to have the construction as shown in FIG. 22 in which image pickup signals from CCD image pickup device 1 are subjected to analog-to-digital conversion at an A/D converter 5, synthesizing process at a synthesizing circuit 51 and compression at a compression circuit 52, so as to effect an operation corresponding to the dynamic range of an output system. Here, for example as shown in FIG. 23, the synthesizing circuit comprises: a maximum output detection circuit 61 for outputting the highest (luminance) one out of color signals $R_L$, $G_L$, $B_L$, in color image pickup signal of the longer exposure time; a weighting factor generation circuit 62 for generating weighting factor correspondingly to the luminance of the color signal possessing the highest value outputted through the maximum value detection circuit 61; multipliers 63 and 64 for respectively multiplying color signals $R_L$, $G_L$, $B_L$, of the color image pickup signal of the longer exposure time and color signals $R_S$, $G_S$, $B_S$, of the color image pickup signal of the shorter exposure time respectively by the same weighting factors set at the weighting factor generation circuit 62; and an adder 65 for adding, with respect to each color signal, the respective color signals multiplied by the weighting factors. It should be noted that color signals $R_S$, $G_S$, $B_S$ are the signals corrected of gain with respect to the difference in signal level due to the difference in charge accumulating time, by a factor obtained from the ratio of charge accumulating time or from actual image data.

In the synthesizing circuit constructed as the above, one having the highest value among the color signals. $R_L$, $G_L$, $B_L$, of color image pickup signal of longer exposure time is detected at and outputted from the maximum value detection circuit 61. In accordance with the luminance value of thus detected and outputted color signal having the highest value, weighting factors for the respective color signals of longer exposure time and shorter exposure time are generated at the weighting factor generation circuit 62. Color signals $R_L$, $G_L$, $B_L$, of image pickup signal of the longer exposure time and color signals $R_S$, $G_S$, $B_S$, of image pickup signal of shorter exposure time are respectively multiplied by the same weighting factors at the multipliers 63 and 64. Then, each weighted color signal is respectively added at the adder 65 to generate R, G, B synthesized signals having a wide dynamic range. While this embodiment has been described by using RGB signal as the color signal, its scope is not limited to this and it may also be applied in a similar manner to other color signals such as of a complementary color system.

Embodiments have been described herein of the case where a synthetic image having a wide dynamic range is formed by taking picture by jointly using a strobe light in the above fifth embodiment (see FIG. 10), sixth embodiment (see FIGS. 11 and 12), seventh embodiment (see FIGS. 13A and 13B), twelfth embodiment (see FIG. 15), and thirteenth embodiment (see FIGS. 20 to 23). A detailed description will now be given collectively with respect to such case where a synthesized image is generated by taking picture by jointly using a strobe light, and some other embodiments related thereto will also be described below.

First, a description will be given by way of FIG. 24 with respect to a fundamental construction of the strobe mechanism 19 in the block diagram of an entire electronic camera shown in FIG. 3. FIG. 24 includes: a xenon emission tube 71; an emission control circuit 72 for supplying emission energy to the xenon emission tube 71; and charge storage means 73 for accumulating the emission energy of the xenon emission tube. The charge storage means 73 is charged from a power supply 75 through a charging circuit 74. Such charging of the charge storage means 73 through the charging circuit 74 is controlled by a control signal from CPU 8 which monitors the charging voltage of a main capacitor of the charge storage means 73 in order to control the charging voltage to a constant voltage so that a charging operation is complete upon an attainment of the constant voltage. On the other hand, operations to start an emission and stop an emission of the xenon emission tube 71 are performed by outputting control signal to the emission control circuit 72 through CPU 8 by means of operation of an external input key.

Figure 25A:
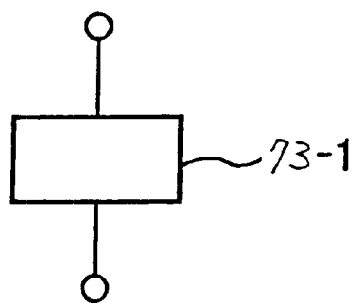
FIGS. 25A and 25B are each a block diagram showing an example of construction of charge storage means in the strobe mechanism shown in FIG. 24.
Figure 25B:
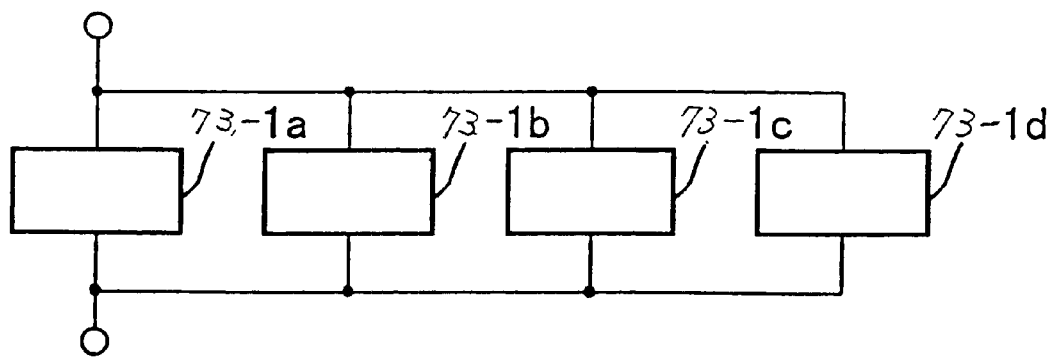

Not only one constructed as having a single main capacitor 73-1 as shown in FIG. 25A but also one constructed as connecting in parallel a plurality of main capacitors 73-1$a$, 73-1$b$, 73-1$c$, 73-1$d$, etc., as shown in FIG. 25B can be used as the above charge storage means 73. It should noted that capacitance of each of the main capacitors may either be the same as that of another or be different from that of another. Those constructed as shown in FIGS. 25A, 25B are selectively used, unless otherwise specified, as the charge storage means in the embodiments to be described in the following.

Figure 26:
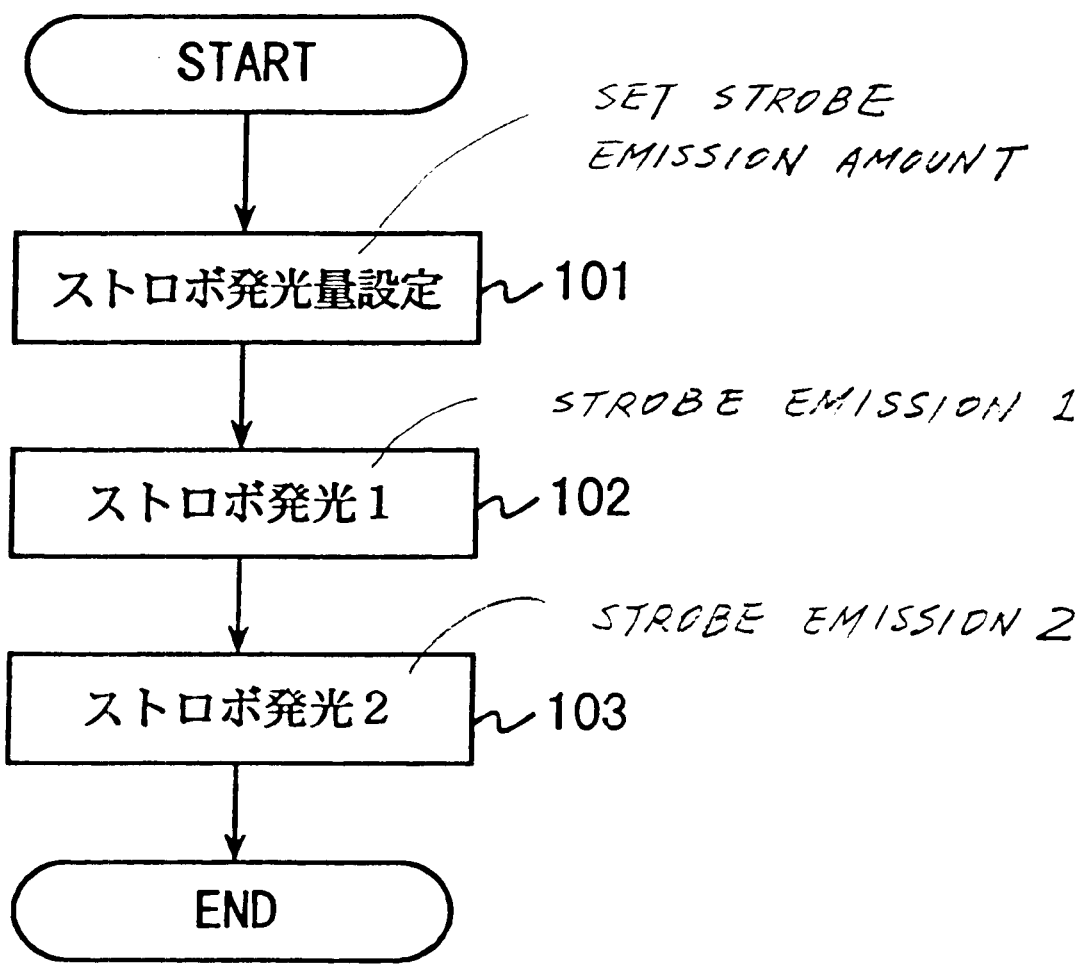
FIG. 26 is a flowchart for explaining operation of a fourteenth embodiment of the present invention.

A basic embodiment of the case of using a strobe light in combination is defined as a fourteenth embodiment and its operation will be described below by way of a flowchart shown in FIG. 26. In this embodiment, a basic strobe mechanism as shown in FIG. 24 is used. First, emission amount is set of two emissions in the two shots of picture taking by one unit of the charge storage means (step 101), so as to effect an emission respectively at the two shots of picture taking. In this aspect, it is possible either to accurately set the emission amount in numerical value for both of the two emissions so as to bring their total within an emission amount corresponding to the one unit of charge storage means, or to simply provide a constraint so that the total of two emission amounts fall into the range corresponding to the capacitance value of the one unit of charge storage means. After such setting, a strobe emission in a first shot (step 102) and a strobe emission in a second shot (step 103) are effected to generate two image pickup signals.

It should be noted that the setting of two emission amounts in the above two shots of picture taking can also be set such that two emission amounts of xenon tube are set by using AE information outputted through an AE detector circuit by means of image pickup signal obtained from CCD image pickup device before the actual taking of picture, i.e., pre-photometry information. By thus using the pre-photometry information corresponding to the brightness of the object to be actually photographed, it is possible to set an emission amount to a quantity of light corresponding to the brightness of the object. Further, it is also possible to provide an external photometric device to use an integral information from the external photometric device instead of image pickup signal as AE information (pre-photometry information) for performing control as to whether or not to effect a strobe emission and control on the quantity of light of the strobe emission. It is furthermore possible to cause a pre-emission at the strobe mechanism 19 before the primary picture taking so as to take an information of the object obtained at that time from the CCD image pickup device or external photometric device as a pre-photometry information. Setting of the emission amount can also be performed by using this pre-photometry information. Since, thereby, setting of the emission amount can be performed based on the pre-photometry information which accompanies an actual emission of the strobe mechanism, an emission amount can be set at a higher accuracy.

By causing two emissions by setting emission amount in this manner, an accumulated charge of one charge storage means is effectively used in the two shots of picture taking so as to cause the two emissions. Effecting of the above two emissions is either of the case where the respective amounts of the two emissions are made equal to each other by setting an emission amount ratio of 1:1, or of the case where the respective amounts of the two emissions are set differently from each other by setting an emission amount ratio of 1:N (N being an optional real number). In the case where the emission amount ratio is set to 1:N, the first and/or second emission may be divided into a plurality of times of emission so as to obtain the emission amount ratio of 1:N. If each emission is performed as a collection of a plurality of times of unit emission, any required emission amount ratio is achieved by the ratio of number of unit emissions by determining a constant emission amount for each unit emission. Control of the emission amount ratio becomes easier.

Also, an accurate emission amount ratio can be obtained by additionally providing emission amount measuring means to measure the emission amount at each unit emission in the collection of a plurality of unit emissions so as to adjust and control a total emission amount.

Similarly, of main capacitors of electric charge storage means, if the ratio between the numbers of main capacitors to be used respectively in the first time and in the second time is made equal to the emission amount ratio (exposure amount ratio) by setting the capacity of each capacitor to the same value, control becomes simpler because a required emission amount ratio can be controlled in the same emission time. While a description has been made in the above by regarding a main capacitor as one unit, a similar advantage can be achieved by treating as one unit, instead of a main capacitor, a charge storage means which is a collection of a number of main capacitors.

Now, when two shots of picture taking are performed by changing the emission amount of strobe emission, a difference in the exposure amount ratio of the taken images obtained by the two shots of picture taking occurs between the portion without receiving any strobe light, i.e., exposed only by normal light, and the portion impinged upon and exposed by strobe light, within the photographed image obtained by the picture taking using strobe emission. This results in a problem of degraded image quality of the synthesized image.

A fifteenth embodiment to be described below is thus made to eliminate this problem. In the fifteenth embodiment, the exposure amount ratio of the two shots of the portion taken only by normal light is made equal to the emission amount ratio of the strobe light of the two shots.

In particular, an exposure amount ratio of the two shots of picture taking in the region not reached by strobe light and dominated by exposure by normal light is made as the same as the emission amount ratio (exposure amount ratio) of the two shots of picture taking in the region where exposure by strobe light is dominant. It is thereby possible to obtain a synthesized image of an improved image quality.

In performing two shots of picture taking by setting the exposure amount ratio of normal light as the same as the emission amount ratio of strobe light, the ratio of amount of exposure by normal light between the two shots is set by ratio between the two shots of photoelectric charge accumulating time of the image pickup device. The ratio of exposure amount by normal light can thus be readily set.

On the other hand, the emission amount ratio of strobe light between the two shots is set by changing time duration of emission of strobe light. In particular, since relation between emission amount of strobe and its emission time duration is experimentally known in advance, a table indicating such relation can be internally provided so that it be used to readily set the emission amount ratio by setting emission time. It is also possible to set an emission amount ratio such that an actual emission amount or voltage value of charge storage means is measured and an emission is controlled in such a manner as to achieve a predetermined emission amount ratio.

Further, in the case where an emission amount ratio of strobe light is set in a manner as the above by changing emission time or by determining an emission amount or voltage value of charge storage means to be actually measured, it is so set that a picture is taken by using a smaller emission at the first shot and a larger emission at the second shot. In other words, by effecting exposure of short time duration first and then exposure of long time duration, each emission can be started from the state where the charging voltage of main capacitor of the charge storage means is high. Its control is thus easier and an emission amount ratio can be controlled at a relatively high accuracy. By contrast, if a larger emission is used at the first shot, a greater difference in charging voltage value of main capacitor of the charge storage means occurs between the two emissions, making it harder to control the emission amount ratio.

Figure 27:
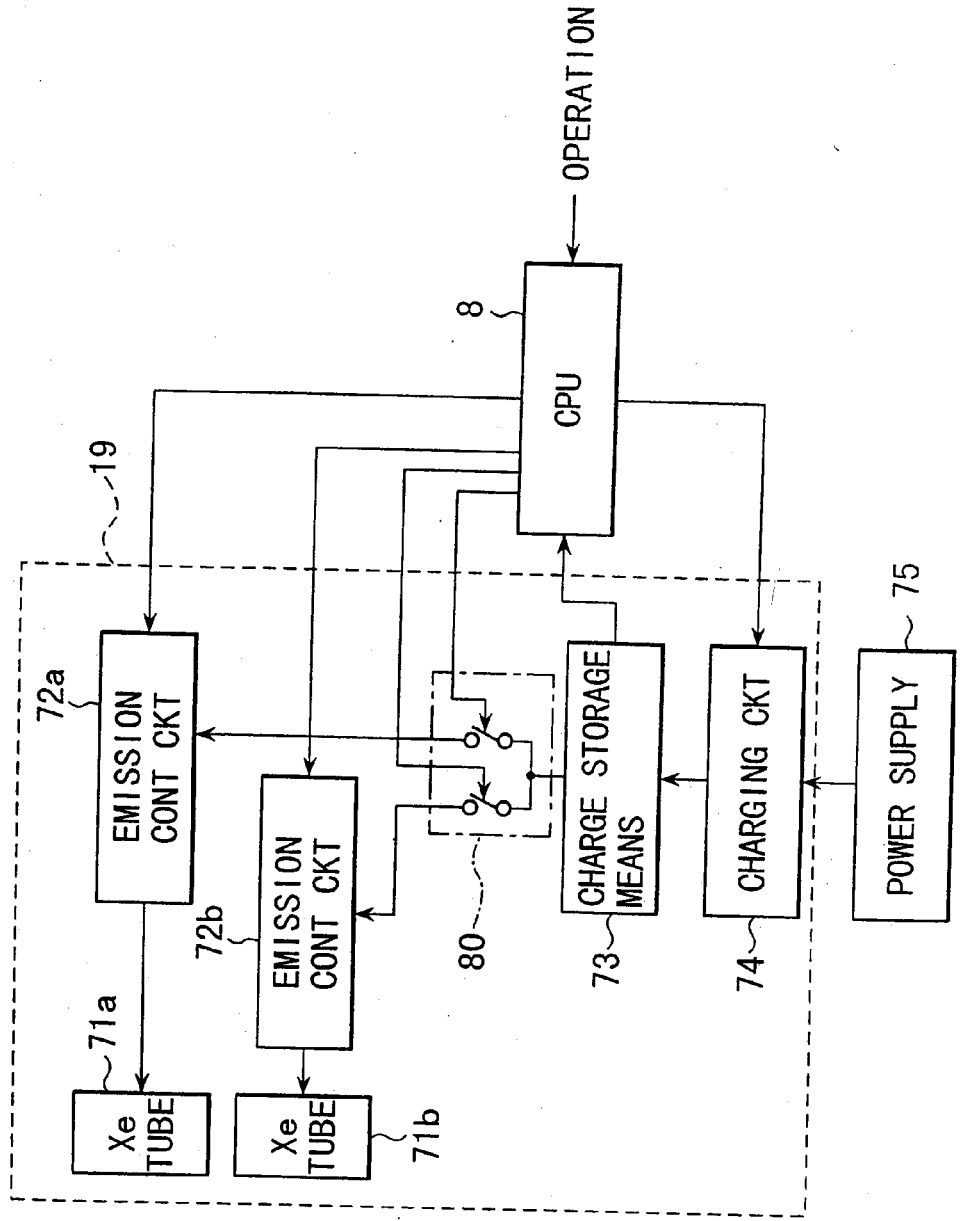
FIG. 27 is a block diagram showing an example of construction of strobe mechanism to be used in a fifteenth embodiment of the present invention.
Figure 29:
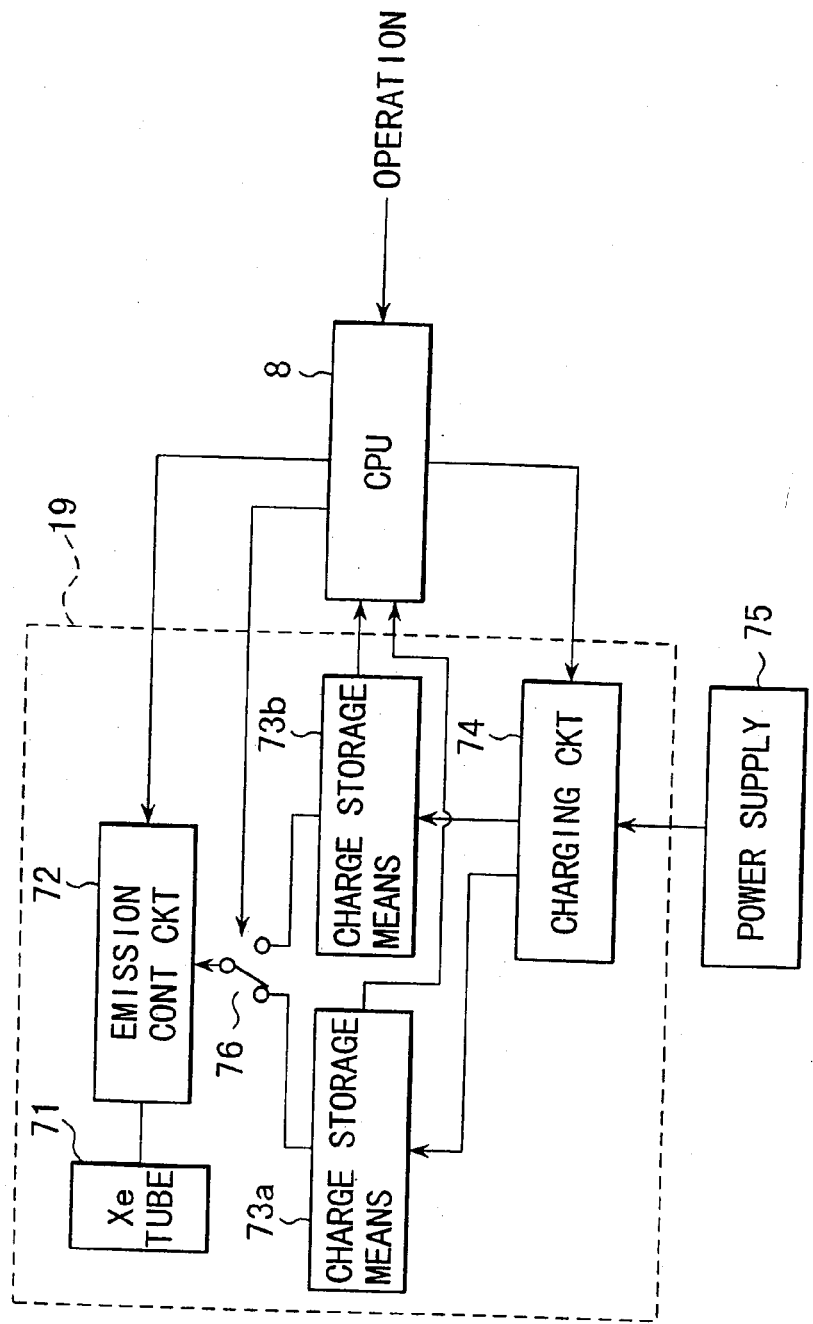

Further, while the two times of emission, the smaller emission and larger emission, can be effected by using a single xenon emission tube and a single charge storage means as in the fundamental construction shown in FIG. 24, it is also possible to employ a construction where, as shown in FIG. 27, xenon emission tubes 71a and 71b are provided exclusively for a larger emission and a smaller emission, respectively. The emissions are caused with respect to a single charge storage means 73 by way of a xenon emission tube switching means 80 and respective emission control circuits 72a and 72b. In the case where two consecutive emissions are caused by using a single xenon emission tube, since a reciprocal effect may occur in the two emissions, it is necessary to have some measures such as provision of a requisite for an increased interval between the two emissions. However, by using the exclusive xenon emission tubes as in the above, the reciprocal effect between two consecutive emissions is completely eliminated and each can be caused to emit respectively at a highly accurate emission amount. It should be noted that the number of xenon tubes is not limited to two and it is also possible to provide three or more units so that one or a plurality of xenon emission tubes are selectively used therefrom.

In the above fourteenth and fifteenth embodiments, a portion of charges of a single unit of charge storage means is used respectively in each emission of the two flash emissions so that each emission corresponds to a predetermined emission amount ratio. However, for example, a xenon emission tube is limited in its voltage range where an emission can be started. In order to perform the two emissions by the same charge storage means, it is necessary to provide a restraint on the first emission amount so that the voltage of main capacitor of the charge storage means at start of the second emission is maintained above a voltage capable of causing an emission of the xenon emission tube. Further, a strobe emission can be controlled accurately by a simple construction as a full-emission where all the charge accumulated at a main capacitor is totally used by a single emitting operation.

In a sixteenth embodiment, therefore, the above described smaller emission and larger emission are each caused by using one or a plurality of exclusive charge storage means. By thus using an exclusive charge storage means for each emission, the above described restraint is not required. Further, by having exclusive charge storage means, at least one emission at the two shots of picture taking can be caused as a full-emission so that accuracy thereof is improved. In particular, in addition to taking of picture by controlling both of the two emissions (smaller emission and larger emission) by control (dimming) of the emission amount such as by controlling emission time, it is also possible to perform picture taking where one of the emissions (smaller emission or larger emission) is performed as a full-emission and the other emission (larger emission or smaller emission) is controlled with respect to emission amount such as by controlling emission time. Furthermore, it is possible that both emissions are performed as full-emission so as to take a picture at a highly accurate emission amount ratio.

Figure 28:
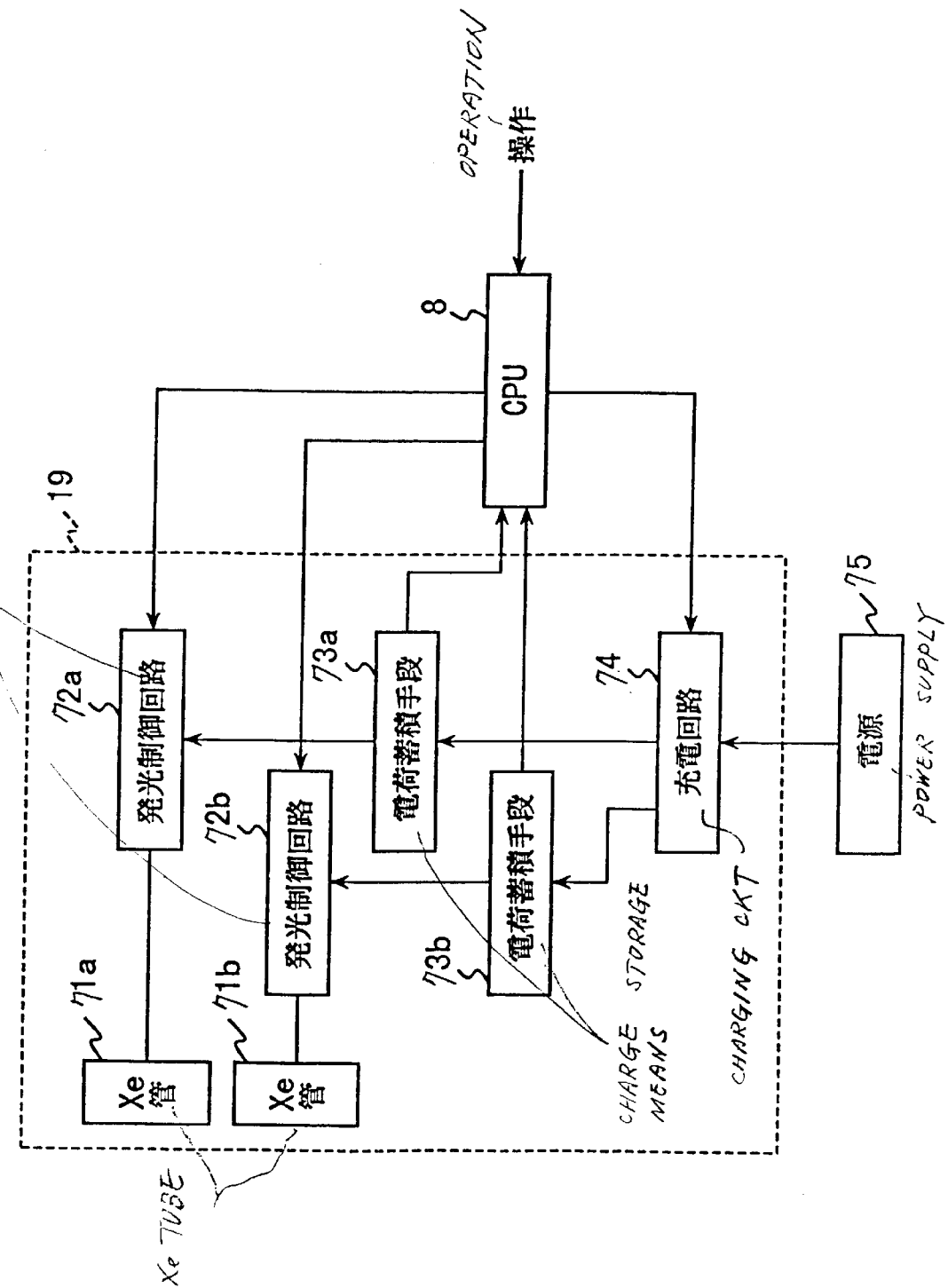
FIG. 28 is a block diagram showing an example of construction of strobe mechanism to be used in a sixteenth embodiment of the present invention.
Figure 29:
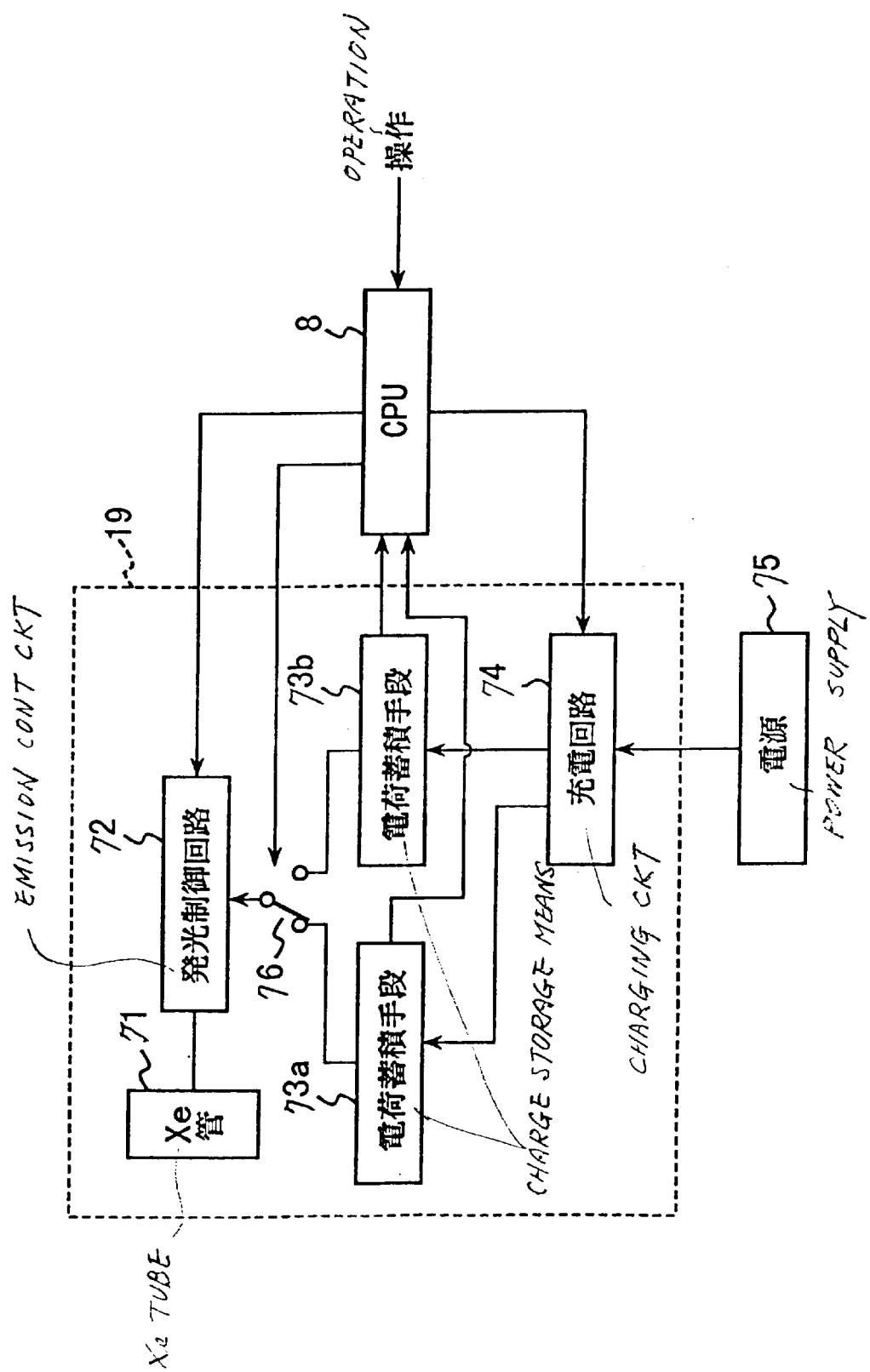
FIG. 29 is a block diagram showing another example of construction of strobe mechanism to be used in the sixteenth embodiment.

In the case where an exclusive charge storage means is thus used for each emission, it is possible to employ either a construction where, as shown in FIG. 28, two xenon emission tubes 71a, 71b are provided and are respectively combined with separate charge storage means 73a, 73b through emission control circuits 72a, 72b to meet the smaller emission and larger emission, or a construction where, as shown in FIG. 29, two charge storage means 73a, 73b are used for one xenon emission tube 71 by switching them through a changeover switch 76. If a single xenon emission tube is thus used in common, it is possible to achieve a reduction in circuitry size.

Figure 30:
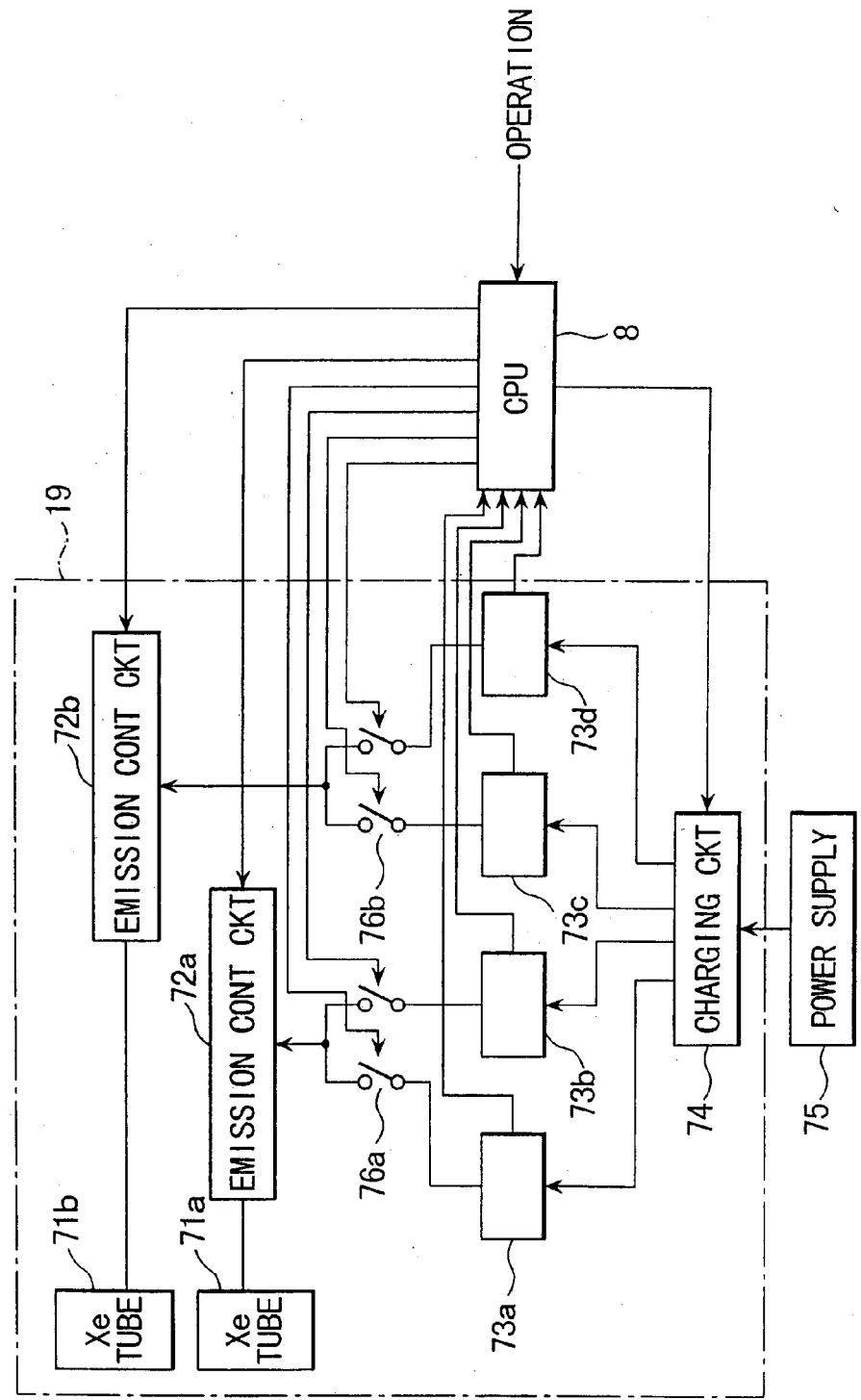
FIG. 30 is a block diagram showing a further example of construction of strobe mechanism to be used in the sixteenth embodiment.

While FIGS. 28 and 29 show a combination of two xenon emission tubes and two charge storage means through emission control circuits, or a combination of one xenon emission tube and two charge storage means through an emission control circuit and a changeover switch, it is also possible that the smaller emission and larger emission are respectively performed by combining optional xenon emission tubes and optional charge storage means. For example, as shown in FIG. 30, it is also possible to use a construction where only certain ones out of a plurality of charge storage means can be connected to one xenon emission tube. In particular, two xenon emission tubes 71a, 71b and four charge storage means 73a, 73b, 73c, 73d are used such that the two charge storage means 73a, 73b are connected to the xenon emission tube 71a through a charge storage means changeover switch 76a and an emission control circuit 72a and the remaining two charge storage means 73c, 73d are connected to the xenon emission tube 71b through a charge storage means changeover switch 76b and an emission control circuit 72b. A xenon emission tube and optional charge storage means are combined to cause each emission.

Figure 31:
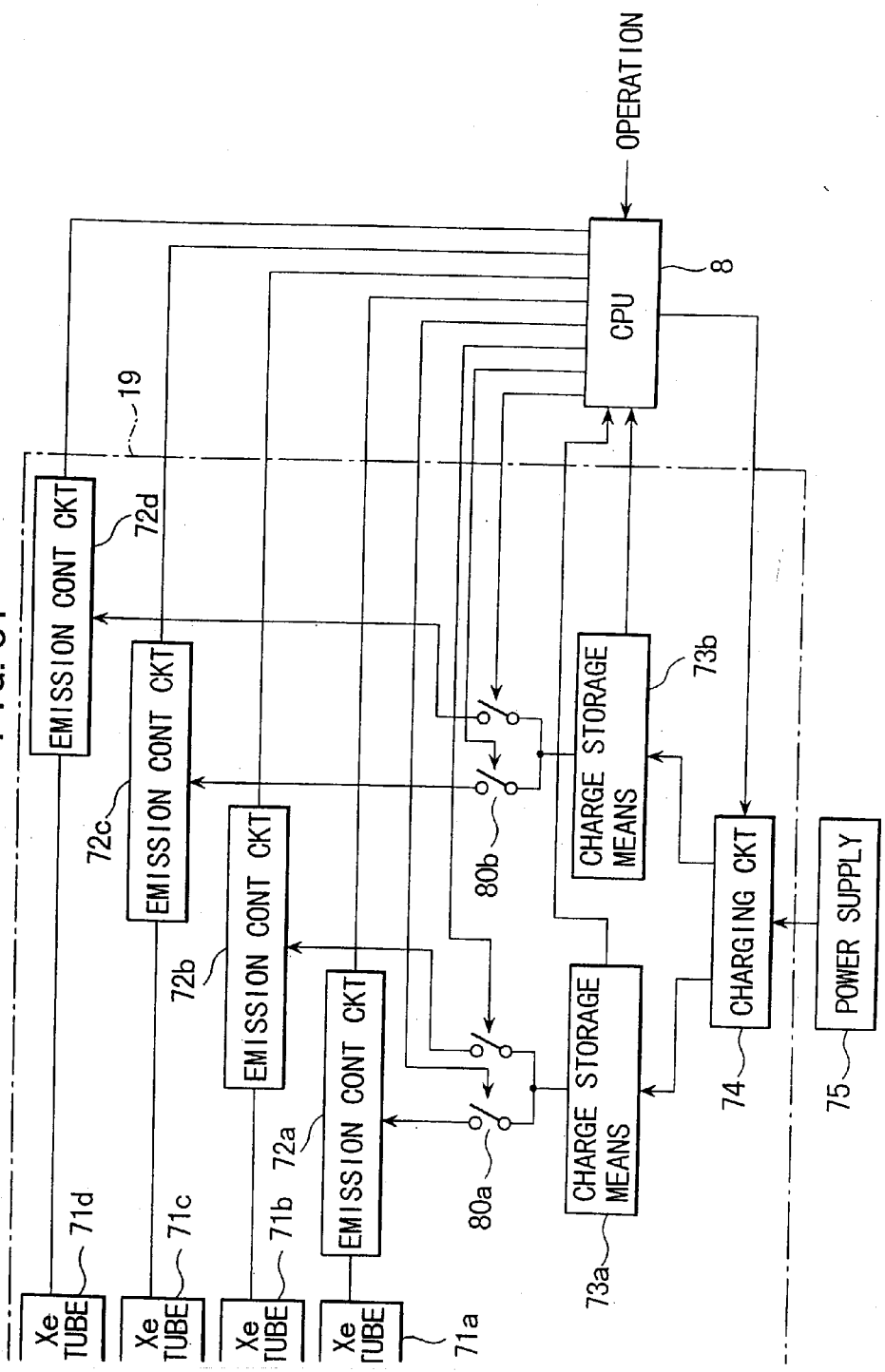
FIG. 31 is a block diagram showing a further example of construction of strobe mechanism to be used in the sixteenth embodiment.

It is furthermore possible to use a construction where, as shown in FIG. 31, only certain ones out of a plurality of xenon emission tubes are connected to one charge storage means. In particular, the construction may comprise for example four xenon emission tubes 71a, 71b, 71c, 71d and two charge storage means 73a, 73b, so that the xenon emission tubes 71a, 71b are connected to the charge storage means 73a respectively through emission control circuits 72a, 72b and a xenon emission tube changeover switch 80a while the xenon emission tubes 71c, 71d are connected to the charge storage means 73b respectively through emission control circuits 72c, 72d and a xenon emission changeover switch 80b. One of the xenon emission tubes 71a, 71b and one of the xenon emission tubes 71c, 71d are selectively caused to emit.

Figure 32:
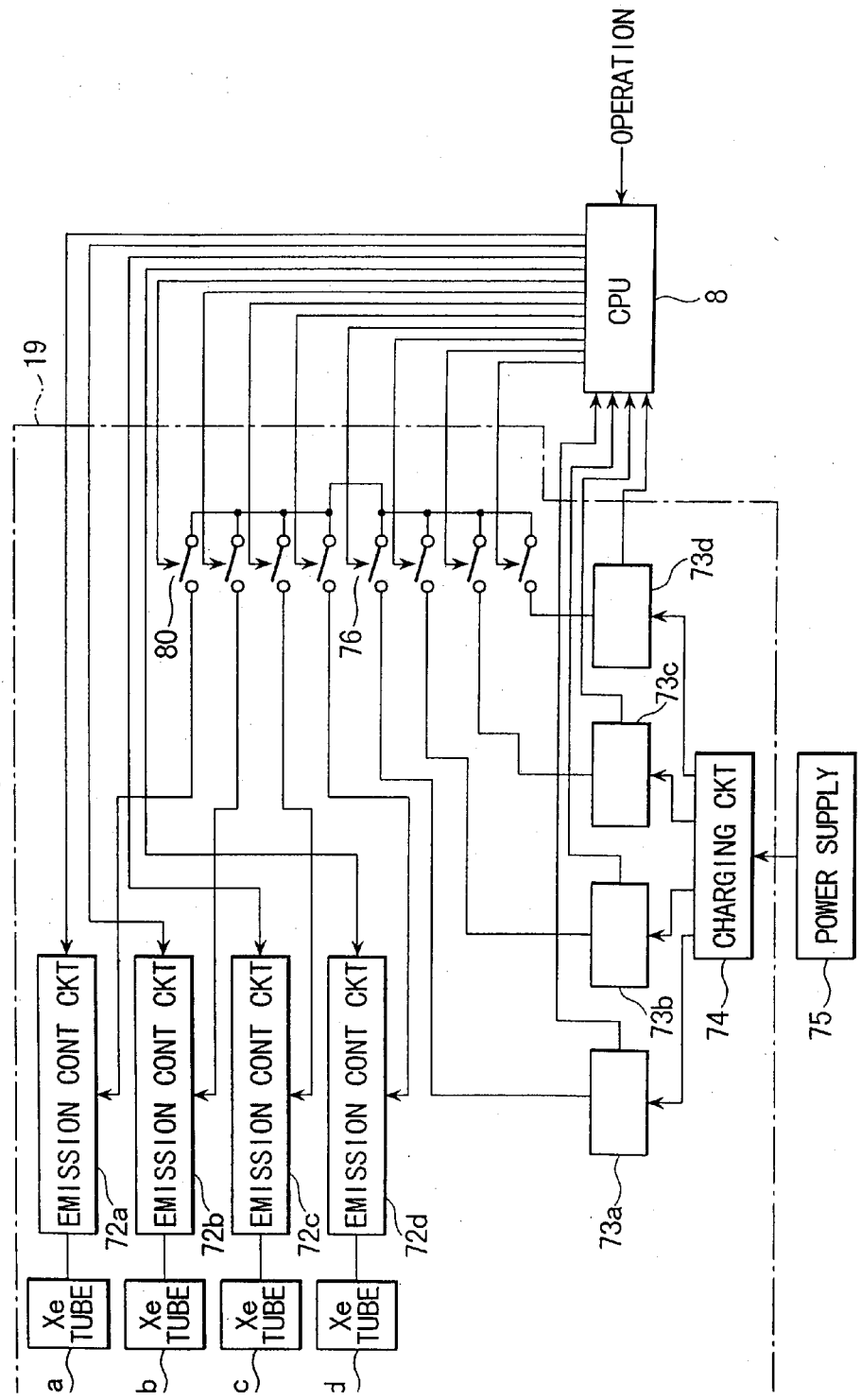
FIG. 32 is a block diagram showing a further example of construction of strobe mechanism to be used in the sixteenth embodiment.

Moreover, it is possible to use a construction where, as shown in FIG. 32, any ones of xenon emission tubes out of a plurality of xenon emission tubes and any ones of charge storage means out of a plurality of charge storage means can be selectively combined. In particular, the construction may comprise for example four xenon emission tubes 71a, 71b, 71c, 71d and four charge storage means 73a, 73b, 73c, 73d such that each xenon emission tube is connected to the four charge storage means respectively through emission control circuits 72a, 72b, 72c, 72d, an xenon emission tube changeover switch 80 and a charge storage means changeover switch 76. Each xenon emission tube can optionally and selectively be connected to any one of the charge storage means.

Figure 33:
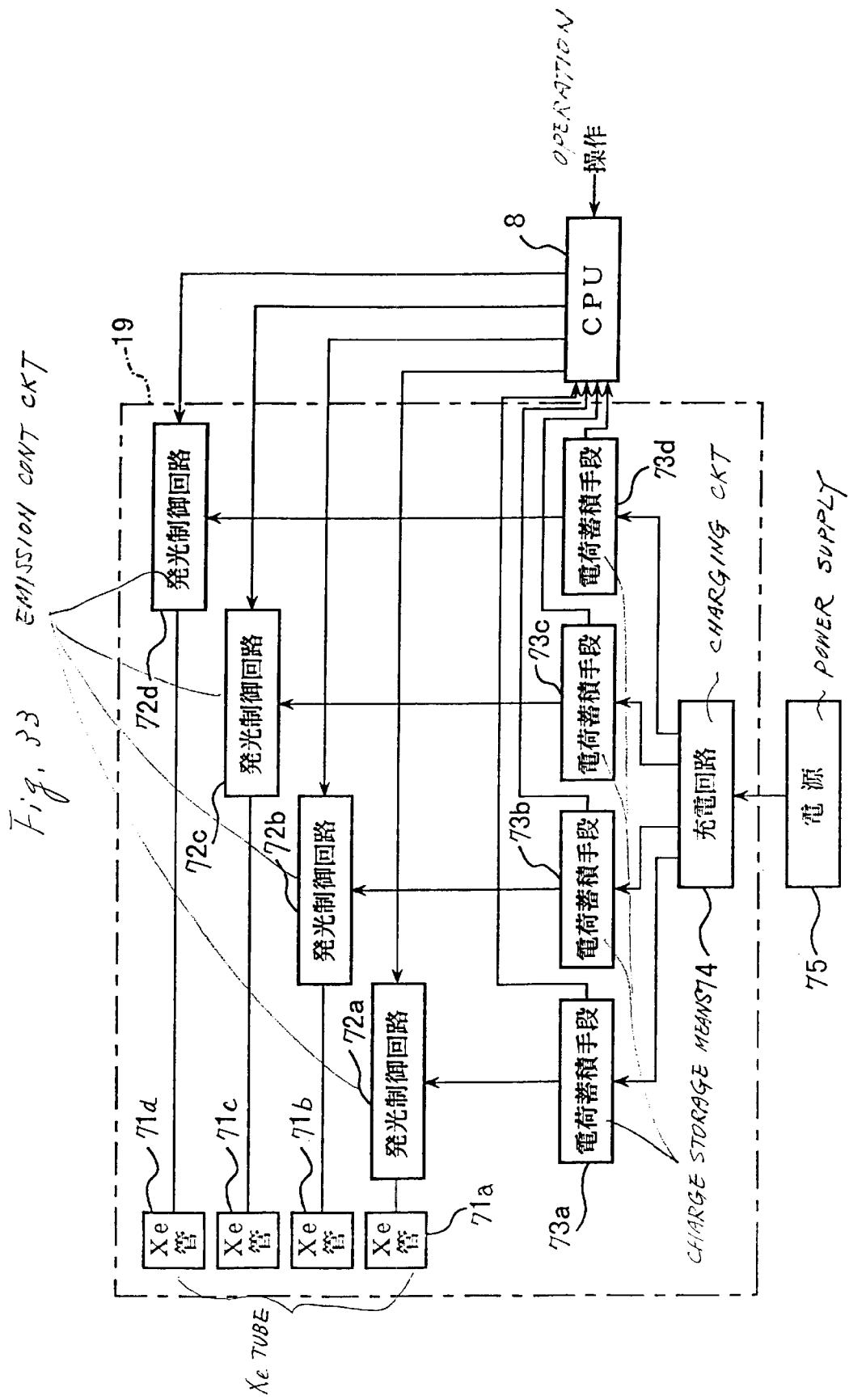
FIG. 33 is a block diagram showing a further example of construction of strobe mechanism to be used in the sixteenth embodiment.

In addition, even in the case where combinations are specified and limited of the plurality of xenon emission tubes and the plurality of charge storage means, it is possible to use a construction where, as shown in FIG. 33, three or more of such combinations are provided without defining those for use in a smaller emission and those for use in a larger emission so that combinations for smaller emission and larger emission are selectively used respectively from the above three or more combinations. In particular, the construction may comprise for example four xenon emission tubes 71a, 71b, 71c, 71d and four charge storage means 73a, 73b, 73c, 73d such that each xenon emission tube is connected to each charge storage means respectively through emission control circuits 72a, 72b, 72c, 72d. The xenon emission tubes are selectively caused to emit by controlling the emission control circuits by means of control signal from CPU.

A seventeenth embodiment will now be described. In the case of generating two image pickup signals of different exposure amount by using a strobe light, an emission amount of strobe light is adjusted as described above, so as to achieve a predetermined emission amount ratio. In doing so, an emission amount based on the reflectance of an object can be obtained and the accuracy of an emission amount ratio be improved by using a technique referred to as direct photometry where an actual emission amount is measured.

Figure 34:
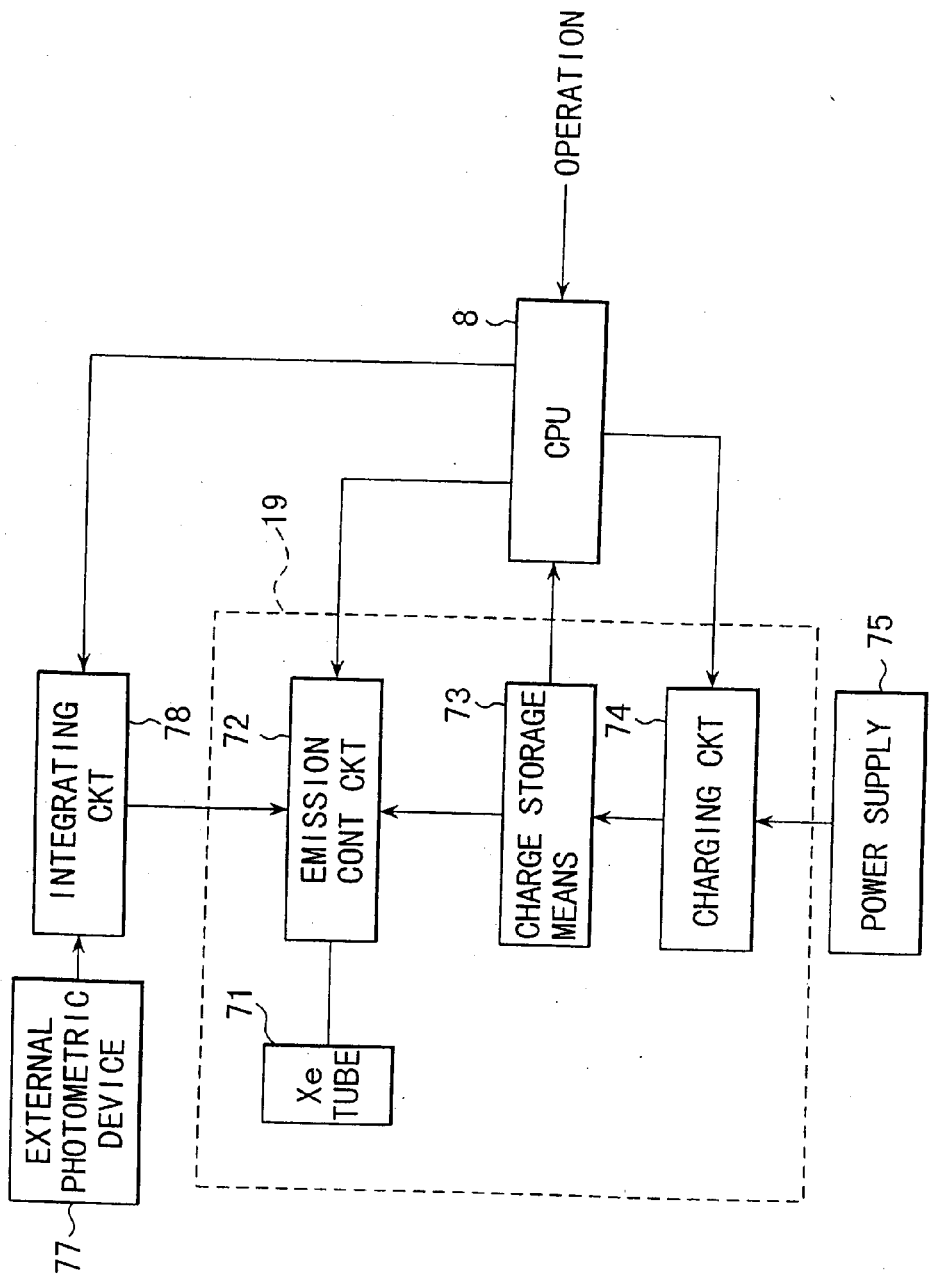
FIG. 34 is a block diagram showing an example of construction of the part related to strobe mechanism to be used in a seventeenth embodiment of the present invention.

In particular, as shown in FIG. 34, there are provided an external photometric device 77 and an integrating circuit 78 for integrating quantity of light measured by the photometric device 77. Emission and integration are started by control signal from CPU 8. The output of photometric integration at the integrating circuit 78 is inputted to an emission control circuit 72 to control timings of start and stop of an emission of a xenon emission tube 71. As another method, it is also possible that the integrated output of the integrating circuit 78 is inputted to CPU 8 and timings of start and stop of an emission of the xenon emission tube 71 are controlled in accordance with control signal from CPU 8.

Figure 35:
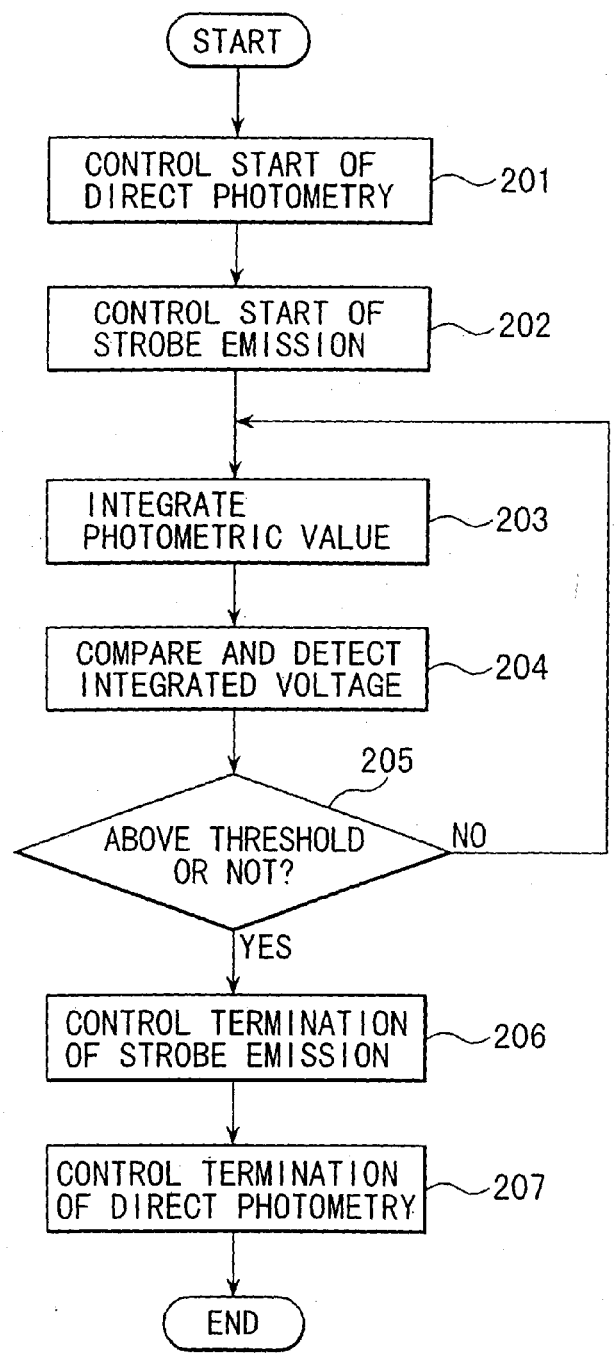
FIG. 35 is a flowchart for explaining operation of the seventeenth embodiment.

A description will be given below by way of a flowchart shown in FIG. 35 with respect to control operation of strobe emission in the seventeenth embodiment constructed as the above. First, control is effected of start of direct photometry of the external photometric device 77 (step 201). Next, control is effected of start of strobe emission of the xenon emission tube 71 (step 202), and an integrating operation of photometric value of the photometric device 77 is performed at the integrating circuit 78 (step 203). An integrated voltage value corresponding to the integrated photometric value is compared with a threshold voltage corresponding to a preset emission amount to output a comparison detection signal (step 204). Based on such output, a determination is made as to whether or not the integrated voltage value exceeds the threshold voltage (step 205). If the integrated voltage is determined as exceeding the threshold voltage, an emission stop signal is transmitted to the emission control circuit 72, where control of termination of emission of the xenon emission tube 71 is effected (step 206) and control is then effected of termination of direct photometry operation of the photometric device 77 (step 207).

Figure 36:
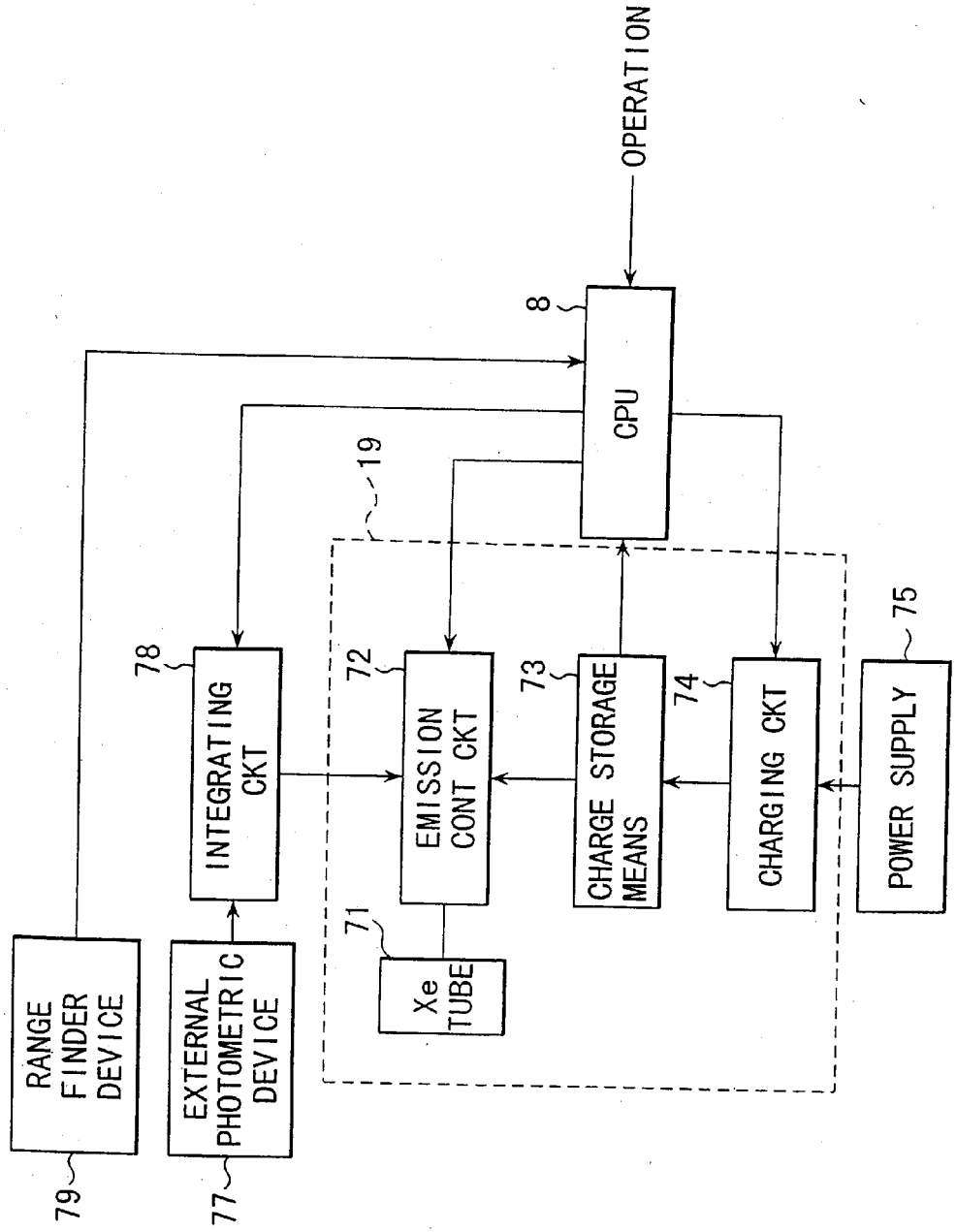
FIG. 36 is a block diagram showing an example of construction of the part related to strobe mechanism to be used in an eighteenth embodiment of the present invention.

Here, when an emission amount is thus controlled by measuring a reflected light of an actual object as in the above, a problem occurs that accuracy is not quite adequate if such emission amount is to be controlled to a small value. An eighteenth embodiment is made to eliminate this problem. An absolute value of emission amount can be set accurately by separately providing a range finding device 79 for obtaining a distance information as shown in FIG. 36 so as to provide CPU 8 with the distance information. Specifically, a smaller emission can be controlled based on such distance information so that the smaller emission amount be set even more accurately. In particular, since an optimum emission amount is experimentally determined in advance in accordance with distance from the object, the attainment of distance information makes it possible to accurately set an emission amount of smaller emission such as by means of control of emission time.

Figure 37:
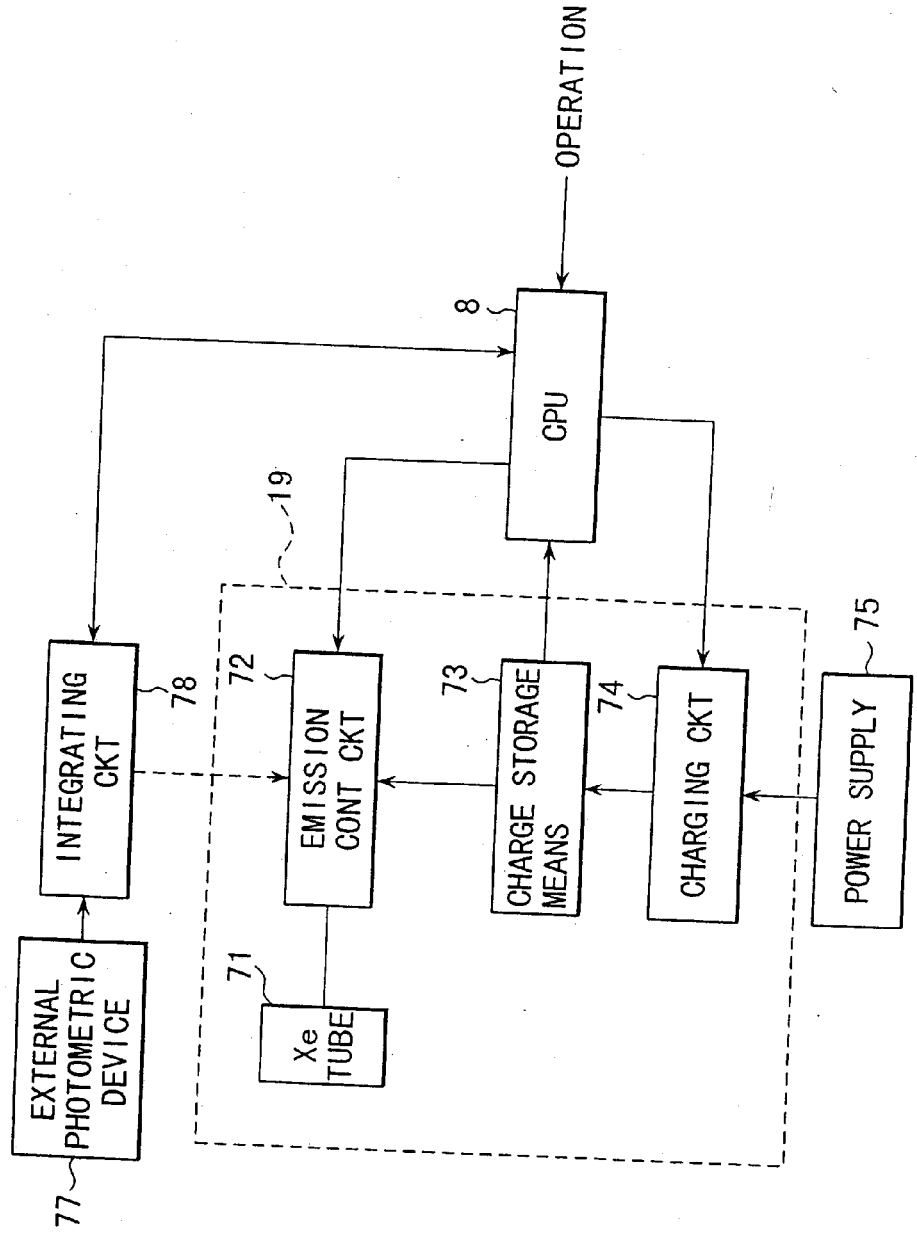
FIG. 37 is a block diagram showing an example of construction of the part related to strobe mechanism to be used in a nineteenth embodiment of the present invention.
Figure 38:
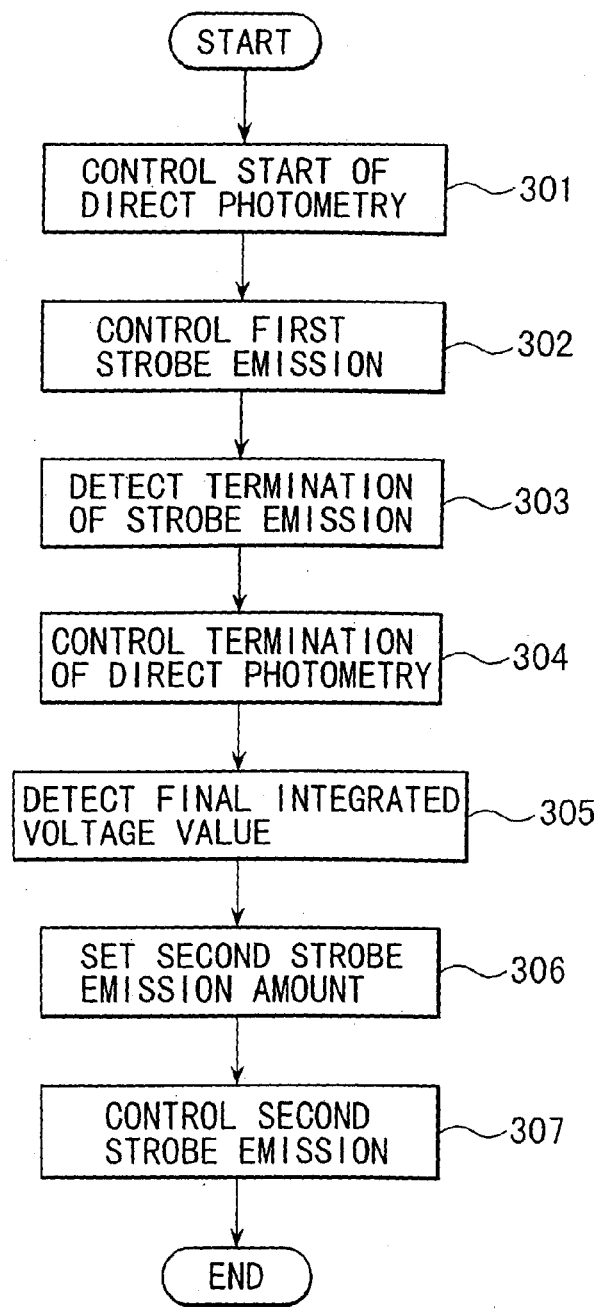

A nineteenth embodiment will now be described. In this embodiment, as shown in FIG. 37, the emission amount of strobe light at a first shot of picture taking is measured by means of direct photometry using an external photometric device 77 and an integrating circuit 78. The measured result is fed back to determine an emission amount of the second strobe light. It is thereby possible to effect an emission of the second strobe light at such emission amount that variance in emission amount of the first strobe light is absorbed. In this way, too, accuracy in setting an emission amount ratio can be improved. The emission amount of the second strobe light in this case may be controlled by a time duration of emission or a voltage at charge storage means or it may be controlled by performing direct photometry by a photometric device in a similar manner as the emission of the first strobe light.

Figure 38:
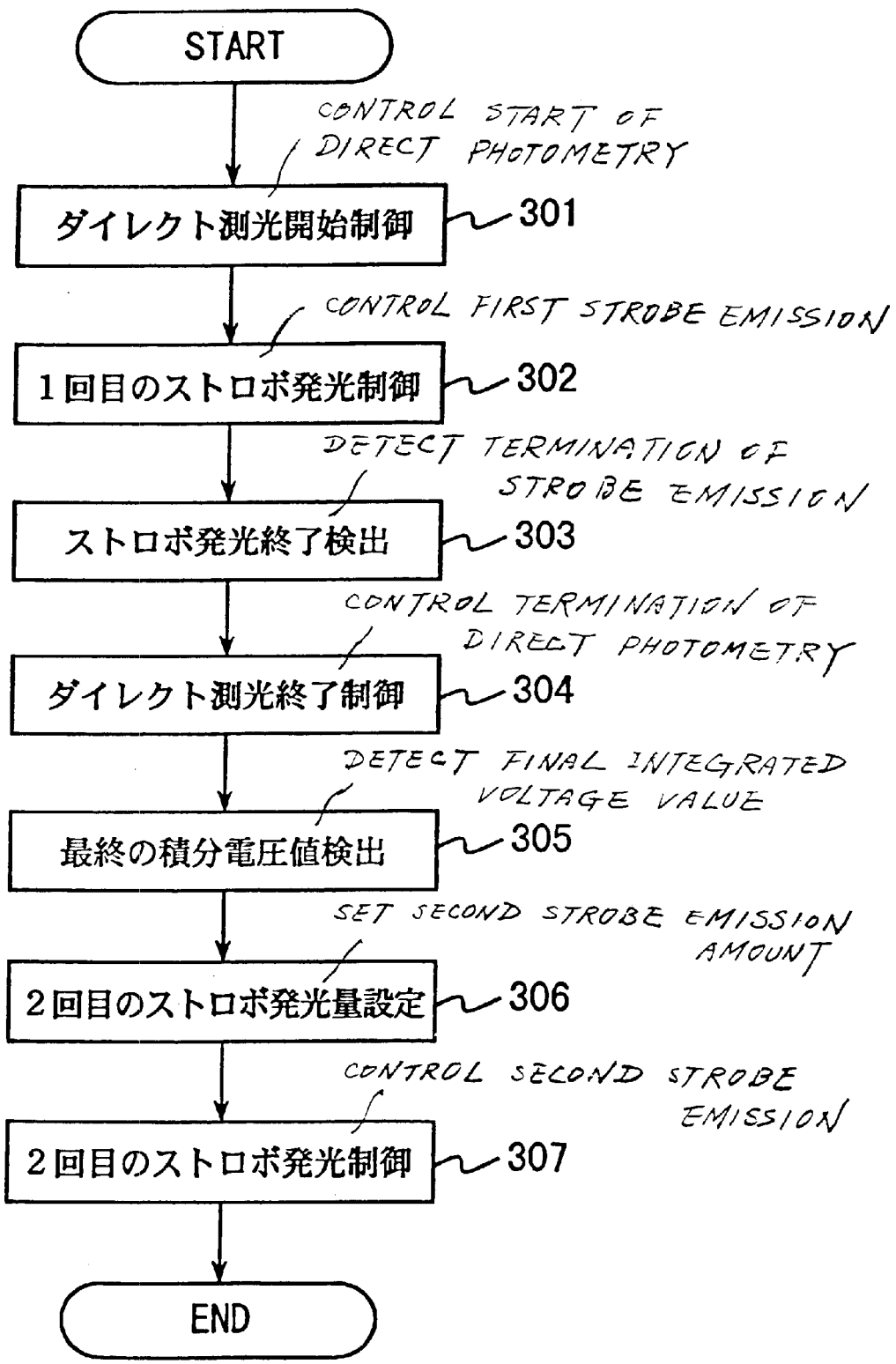
FIG. 38 is a flowchart for explaining operation of the nineteenth embodiment.
Figure 1:
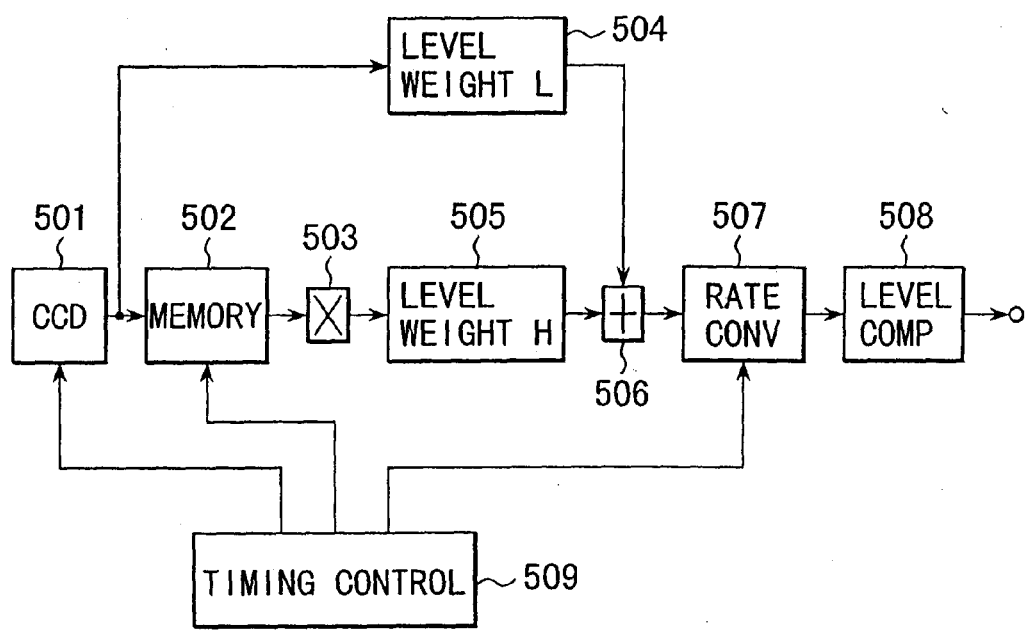
Figure 2:
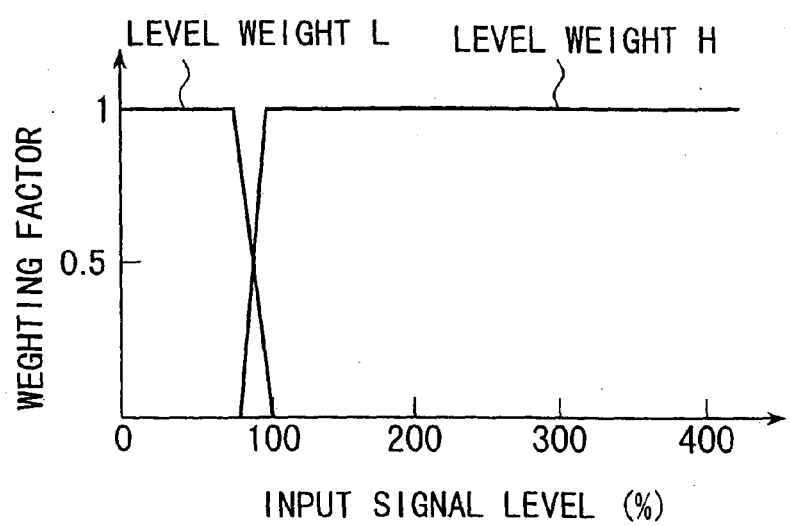
Figure 3:
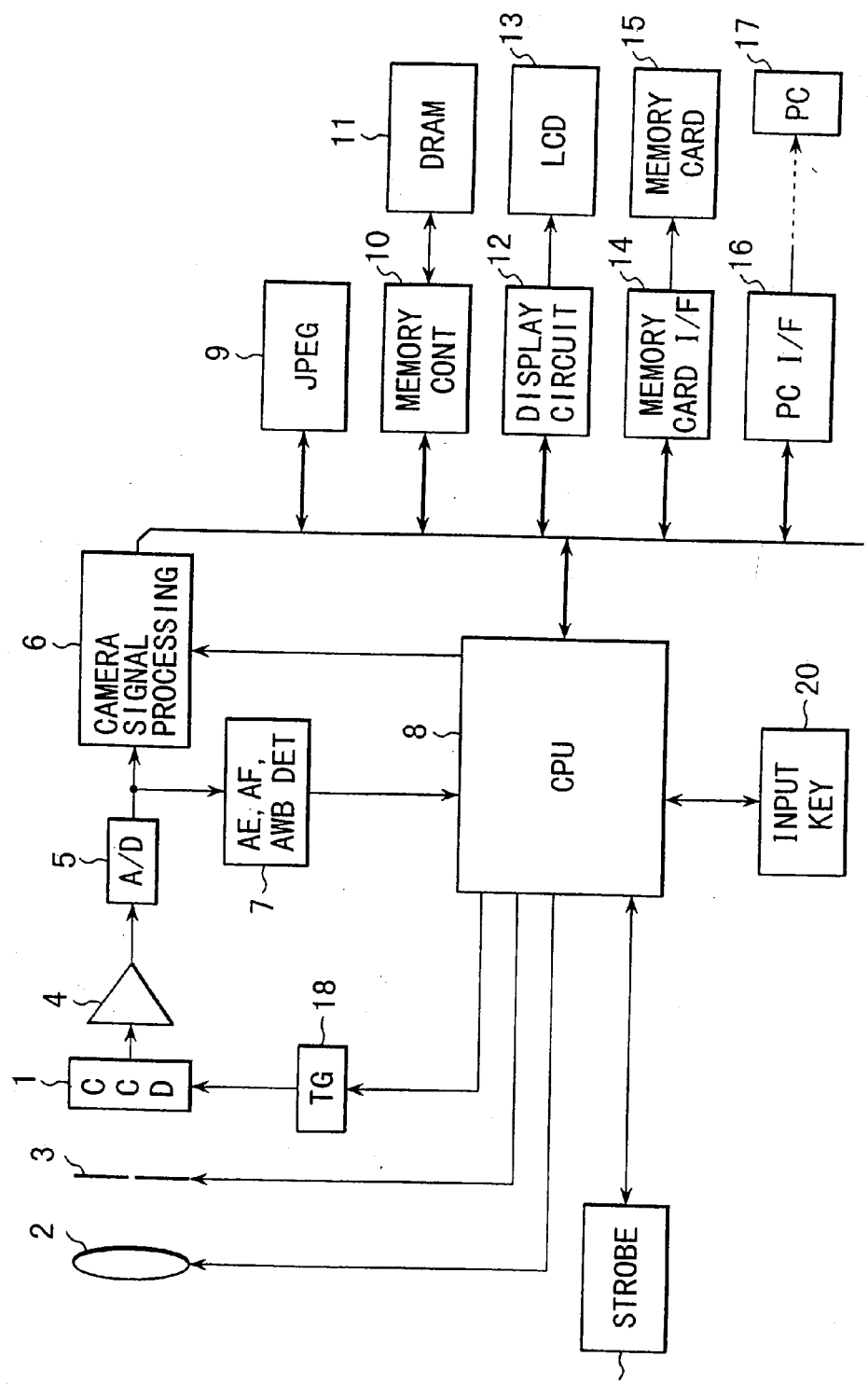
Figure 4:
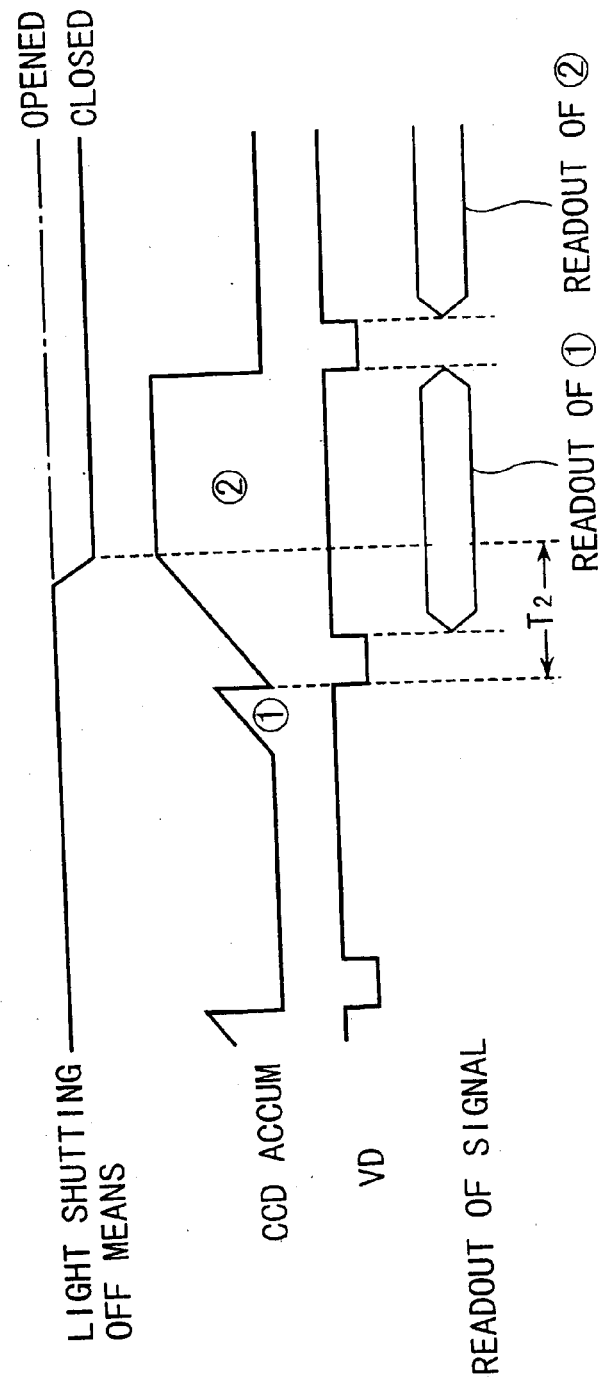

The operation of the nineteenth embodiment will now be described in more detail by way of a flowchart shown in FIG. 38. First, control is effected of start of direct photometry by the external photometric device 77 (step 301). Next, control (dimming control) of the first strobe emission by the xenon emission tube 71 is started and the strobe emission by the xenon emission tube 71 is terminated such as by control of emission time of the xenon emission tube 71, or by detection of a change in the integrated voltage of the integrating circuit 78, or by detection of a change in the charging voltage of main capacitor of the charge storage means 73 (step 302). However, since the xenon tube 71 possesses a surplus emission characteristic where an emission is continued for a short time period after an emission stop control, the direct photometry by the photometric device 77 is continued further even after the emission stop control. A termination of emission is detected at a point in time when the emission has substantially been terminated upon an elapse of a time period set by a timer, or at a point in time when the integrated voltage at the integrating circuit 78 has substantially become constant, or at a point in time when the charging voltage of main capacitor of charge storage means has substantially become constant (step 303). Next, control of termination of direct photometry operation of the photometric device 77 is effected (step 304), and a final integrated voltage value of the integrating circuit is detected (step 305). Next, based on such detected value, setting is effected of the second strobe emission amount by the xenon emission tube (step 306), and control is effected of the second strobe emission by the xenon emission tube (step 307).

A twentieth embodiment will now be described. A technique has previously been shown where emissions are caused by determining ratio between two emission amounts so that the two strobe emission amounts at the two shots of picture taking fall under an emission amount corresponding to the capacitance of a single charge storage means. However, if, without such previous setting, an emission amount of the second time is set based on a measurement of emission energy amount of the first time, the remaining amount of charge of the charge storage means may fall short of the set emission amount of the second emission, where a proper emission amount ratio to be set cannot be achieved. In the present embodiment, even when such state has occurred, an exposure amount ratio by normal light and an emission amount ratio by strobe light can be set equal to each other.

Figure 39:
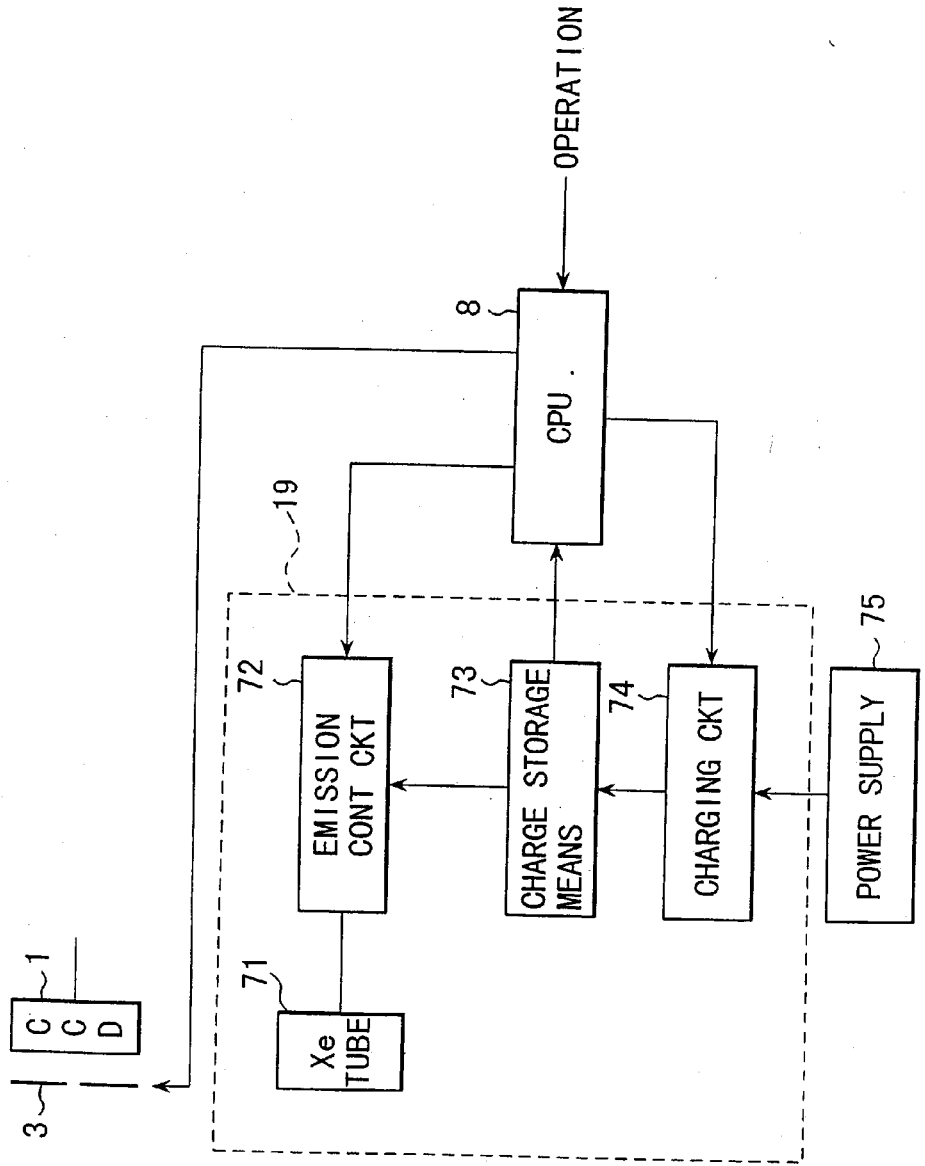
FIG. 39 is a block diagram showing an example of construction of the part related to strobe mechanism to be used in an twentieth embodiment of the present invention.

In this embodiment, as shown in FIG. 39, the remaining voltage of a charge storage means 73 after a first shot of picture taking is inputted to CPU 8. If a second emission based on such voltage is smaller than that in accordance with a previously set emission amount ratio, the second emission is performed in its unmodified form and a second exposure amount is controlled by a new exposure amount ratio based on an emission amount ratio to be set anew. Setting of the second exposure amount is effected by controlling the shutter 3 from CPU 8. Determination as to whether a remaining voltage of the charge storage means 73 is sufficient or not is made based on a correspondence data between emission amounts and capacitor voltages which is provided internally of CPU 8 in advance. If the remaining voltage of the charge storage means is smaller than a capacitor voltage corresponding to the previously set second emission amount, it is determined as insufficient. Alternatively, a ratio of an energy amount corresponding to difference in voltages before and after the first emission to an energy amount corresponding to an emission based on the remaining voltage (voltage after the first emission) is obtained by measuring voltages of the charge storage means 73 before and after the first emission and by inputting such value to CPU 8 to execute a predetermined arithmetic. The energy amount ratio and the emission amount ratio previously set by CPU 8 are then compared with each other. It may be determined as insufficient when the energy amount ratio is smaller.

Figure 40:
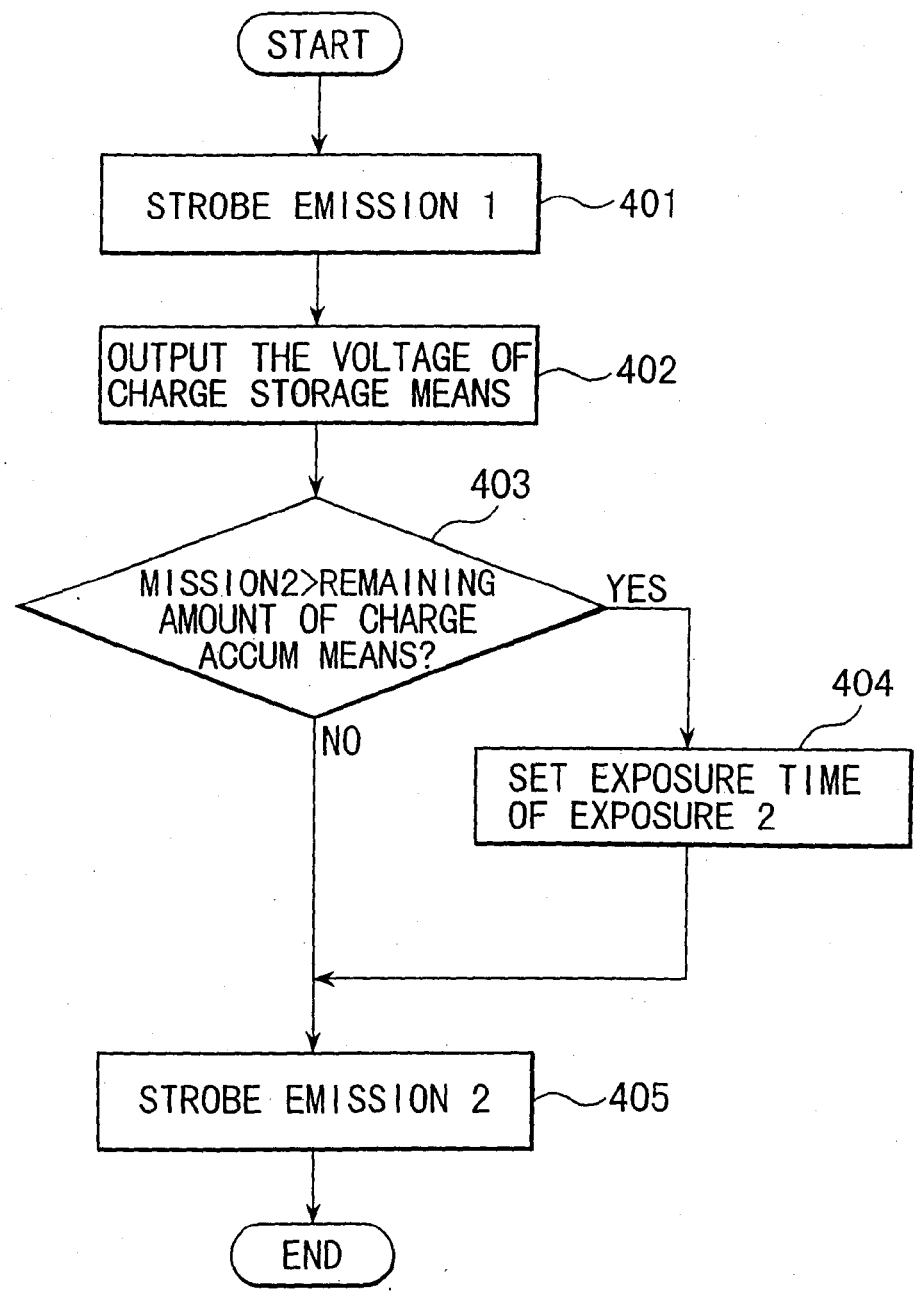
FIG. 40 is a flowchart for explaining operation of the twentieth embodiment.

The operation of the twentieth embodiment will now be described in detail by way of a flowchart shown in FIG. 40. At first, an emission is effected of strobe light at a first shot of picture taking. A second emission amount is set to an optional value which has previously been determined. Alternatively, it is computed based on an emission amount by direct photometry of the first emission which has been performed by using a photometric device (step 401). Next, the remaining value of charge of the charge storage means after the first emission is measured such as by voltage output of the charge storage means (step 402), and a determination is made as to whether or not an emission amount corresponding to such remaining value is greater than the proper second emission amount computed based on the value of the above direct photometry of the first time (step 403). Then, if the emission amount corresponding to the remaining value is smaller than the second emission amount computed based on the photometric value of the first time, an emission is caused at the second shot of picture taking so as to totally use the remaining value of the charge storage means. An emission amount ratio in that case is set anew by a computation. Correspondingly to such newly set emission amount ratio, an exposure time such as by a means for shutting off light (mechanical shutter) at the second shot of picture taking is adjusted so as to equalize the exposure amount ratio to the above newly computed emission amount ratio (step 404) and a second strobe emission is effected (step 405). It should be noted that if, in the above determination at step 403, the emission amount corresponding to the remaining value of the charge storage means is greater than a second emission amount computed based on the photometric value of the first time, a second strobe emission is effected by the second emission amount computed based on the photometric value of the first time in a similar manner as the above described nineteenth embodiment.

It should be noted that, in the above described twentieth embodiment, a case is shown where an emission amount of strobe light at the second shot of picture taking is computed based on an emission amount according to direct photometry of the first emission performed by using a photometric device, i.e., only the emission at the first shot of picture taking is actually measured and an emission at the second shot of picture taking is computed based on arithmetic. However, it is also possible to actually measure the first and second emissions so as to equivalently set an exposure amount ratio by normal light in accordance with the actually measured emission amount ratio. In particular, a xenon emission tube is set to a predetermined emission amount ratio and is caused to emit at a timing in the second half of the first shot of picture taking and at a timing in the first half of the second shot of the picture taking. The ratio between the two strobe emission amounts is measured by a photometric device. A photoelectric charge accumulating time of image pickup device at the second shot of picture taking is set in such a manner as to correspond to the actually measured emission amount ratio. A further reduction is thereby possible of the effect due to variance in a strobe emission amount.

Of the above described embodiments, in those embodiments including a step of actually measuring an emission amount of xenon emission tube, the emission amount of xenon emission tube can be measured not only by measurement using an external photometric device but also based on an actual measurement of voltage value of the charge storage means. In this case, it is not necessary to provide an external photometric device and a voltage measuring means of charging circuit of the charge storage means can be used in common. Further, of the above described embodiments, in those embodiments including a step of controlling an emission amount of the xenon emission tube (dimming control), the dimming control in any of the cases can be performed by selectively using control of emission time of the xenon emission tube, control of direct photometry by an external photometric device, or control based on voltage measurement of the charge storage means.

Furthermore, of the above described embodiments, in those embodiments where at least one of the xenon emission tube and the charge storage means is consisting of a plurality of units, a single emission can be caused to emit by controlling a plurality of xenon emission tubes or a plurality of charge storage means and it is also possible to use again a xenon emission tube or charge storage means which has been used in a first emission.

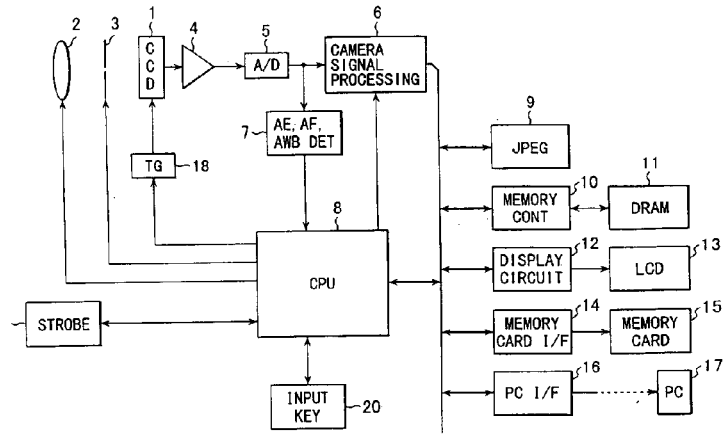

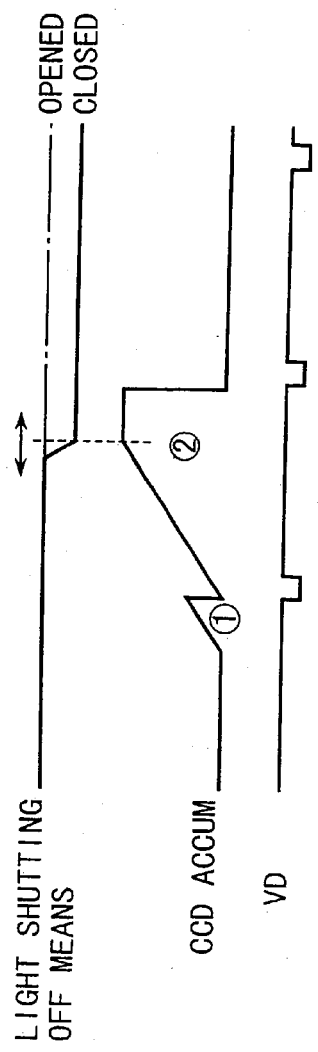

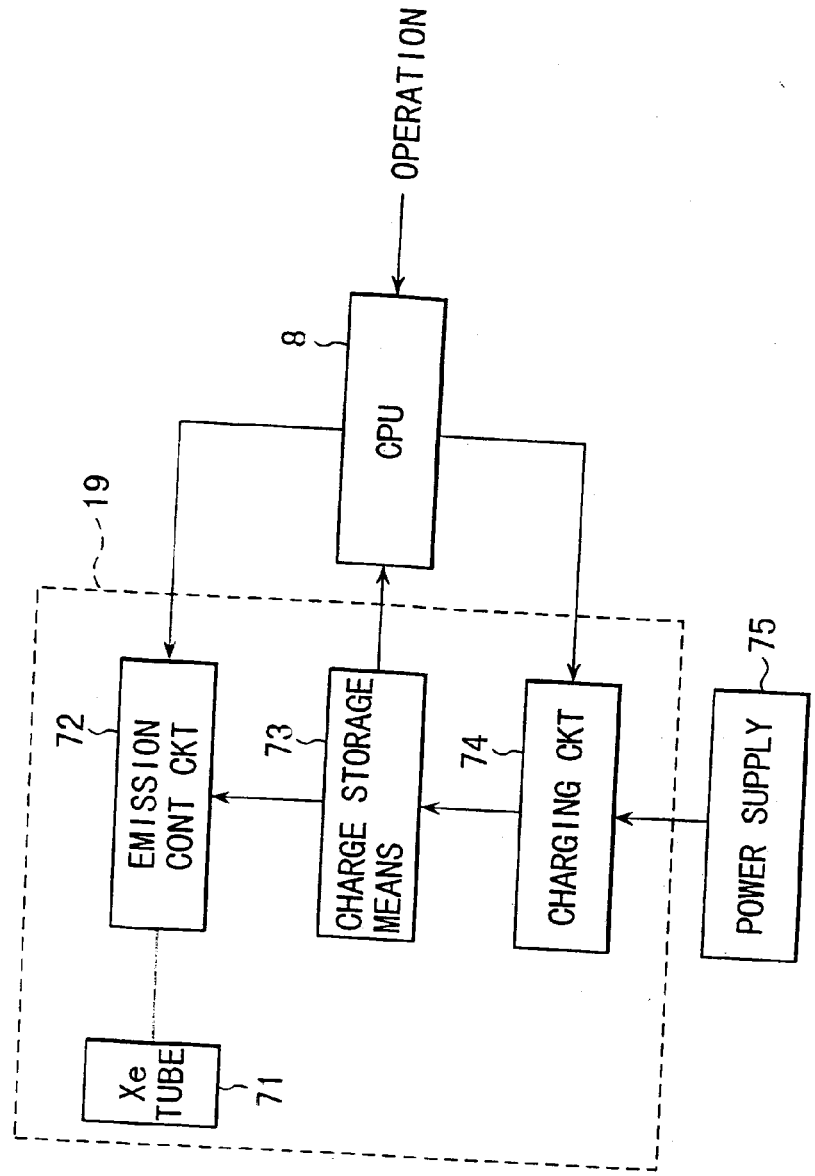

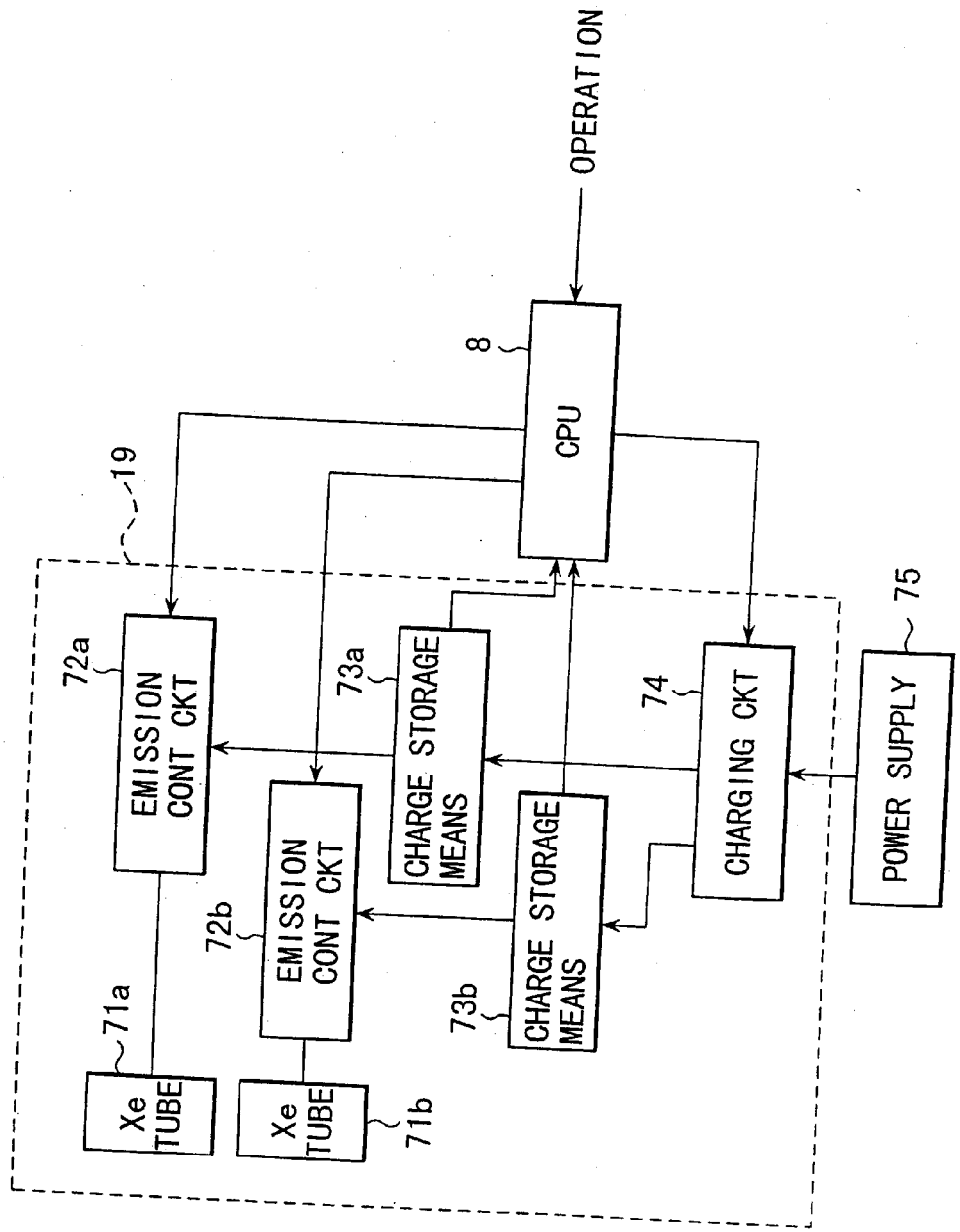

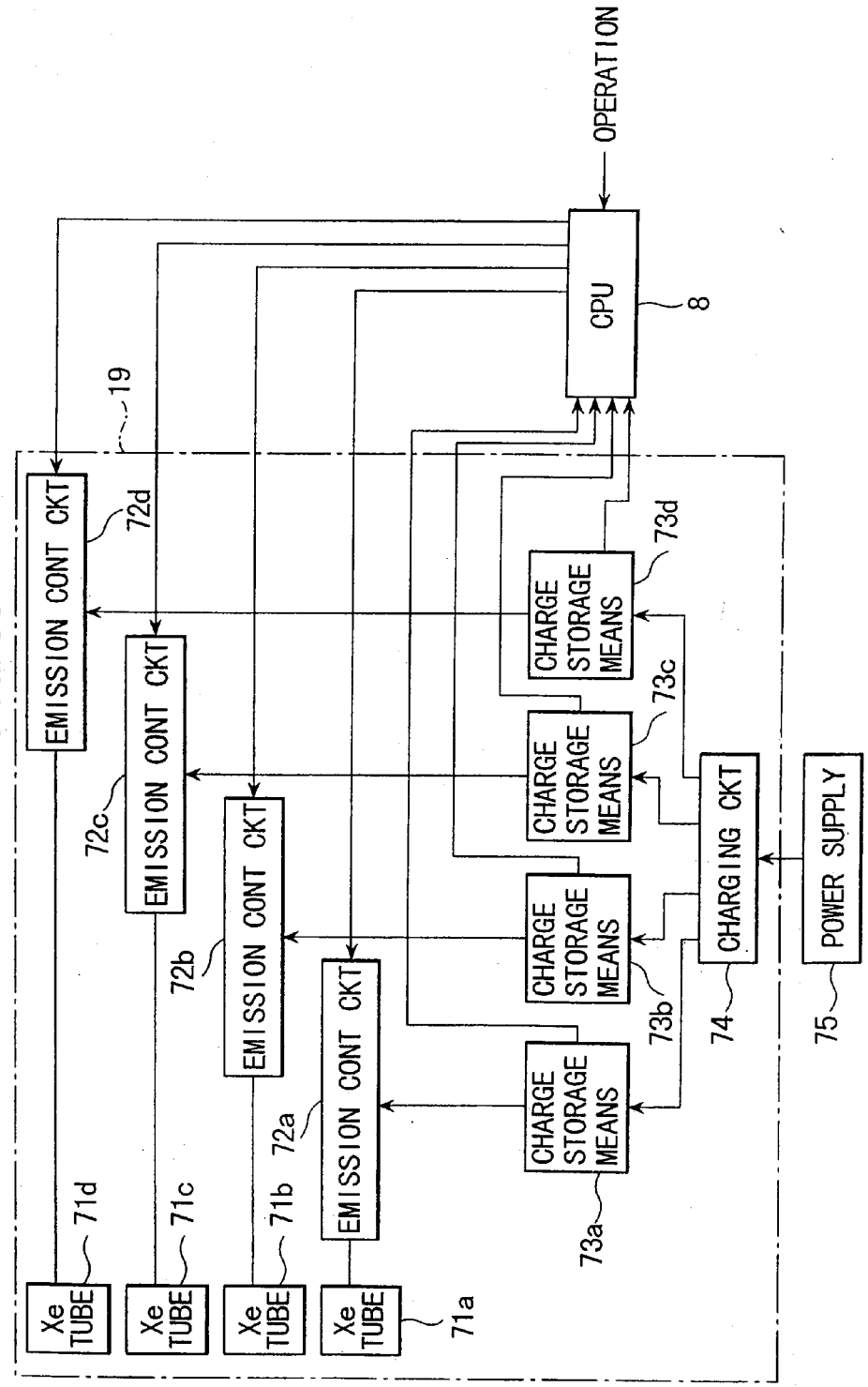

What is claimed is:

1. An electronic camera comprising:

optical means for forming an optical image of object of picture taking;

image pickup means for generating image pickup signals by taking picture and effecting photoelectric conversion of an image of the object formed at the optical means;

flash emission means for illuminating the object;

exposure condition designating means for designating exposure conditions at said image pickup means;

image pickup signal synthesizing means for synthesizing two image pickup signals from two separate shots of picture taking at said image pickup means by exposure conditions designated by the exposure condition designating means;

flash emission control means for controlling emission of said flash emission means in connection with the exposure conditions with respect to each shot at the time of said two shots of picture taking; and control means for controlling operation of each of the foregoing means, wherein said exposure condition designating means includes one or both of electronic shutter means for desirably controlling an exposure amount by controlling photoelectric charge accumulation of said image pickup means and light shut off means for shutting off light from a light receiving surface of said image pickup means, said control means controlling one or both of said electronic shutter means and said light shut off means, and said flash emission means to equalize between said two shots of picture taking an emission amount ratio by light from said flash emission means and an exposure amount ratio by normal light excluding the light from said flash emission means.

2. The electronic camera according to claim 1, wherein the exposure amount ratio by normal light of said two shots of picture taking is set by ratio of photoelectric charge accumulating time of the two shots at said image pickup means.

3. The electronic camera according to claim 1, wherein said flash emission means comprises a single charge storage means for accumulating emission energy of the flash emission means such that the total of emission amounts at the two shots of picture taking of the flash emission means is set equal to or lower than the total emission energy of said single charge storage means.

4. The electronic camera according to claim 1, wherein said flash emission means comprises a plurality of charge storage means differing from each other in capacitance value for accumulating emission energy of the flash emission means such that a full emission of the flash emission means is caused at each of the two shots of picture taking by selectively using the plurality of charge storage means so as to make a difference in the total capacitance values to be respectively used.

5. The electronic camera according to claim 1, wherein said flash emission means comprises a plurality of charge storage means for accumulating emission energy of the flash emission means such that one picture taking is performed by a smaller emission based on a full emission using one single or a plurality of charge storage means and the other picture taking is performed by a larger emission based on an emission under dimming control using the other single or plurality of charge storage means.

6. The electronic camera according to claim 5, wherein said dimming control is effected by control of emission time of said flash emission means.

7. The electronic camera according to claim 5 further comprising a photometry means, said dimming control being effected based on detection of a predetermined emission amount by direct photometry of said photometry means.

8. The electronic era according to claim 5, wherein said dimming control is effected based on measurement and detection of a predetermined voltage at the charge storage means.

9. The electronic camera according to claim 5, wherein, when dimming is to be effected of the flash emission means at the second shot of picture taking, an emission amount of light from the flash emission means at the first shot of picture taking is measured and an emission amount under dimming control of the flash emission means at the second shot is set based on the measured emission amount so as to correspond to a previously set emission amount ratio of the flash emission means between the two shots of picture taking.

10. The electronic camera according to claim 9 further comprising a photometry means, the emission amount of the flash emission means at the first shot of picture taking being measured by direct photometry of said photometry means.

11. The electronic camera according to claim 9, wherein the emission amount of the flash emission means at the first shot of picture taking is obtained by a voltage measurement at said charge storage means.

12. The electronic camera according claim 1, wherein said flash emission means comprises a plurality of charge storage means for accumulating emission energy of the flash emission means such that one picture taking is performed by a smaller emission based on an emission under dimming control using one single or plurality of charge storage means and the other picture taking is performed by a larger emission based on a full emission using the other single or plurality of charge storage means.

13. The electronic camera according to claim 12, wherein said dimming control is effected by control of emission time of said flash emission means.

14. The electronic camera according to claim 12 further comprising a photometry means, said dimming control being effected based on detection of a predetermined emission amount by direct photometry of said photometry means.

15. The electronic camera according to claim 12, wherein said dimming control is effected based on measurement and detection of a predetermined voltage at the charge storage means.

16. The electronic camera according to claim 12, wherein, when dimming is to be effected of the flash emission means at the second shot of picture taking, an emission amount of light from the flash emission means at the first shot of picture taking is measured and an emission amount under dimming control of the flash emission means at the second shot is set based on the measured emission amount so as to correspond to a previously set emission amount ratio of the flash emission means between the two shots of picture taking.

17. The electronic camera according to claim 16 further comprising a photometry means, the emission amount of the flash emission means at the first shot of picture taking being measured by direct photometry of said photometry means.

18. The electronic camera according to claim 16, wherein the emission amount of the flash emission means at the first short of picture taking is obtained by a voltage measurement at said charge storage means.

19. The electronic camera according to claim 1, wherein said flash emission means includes at least one charge storage means for accumulating emission energy of the flash emission means such that the two shots of picture taking are performed as illuminated by a smaller emission and a larger emission each based on an emission under dimming control.

20. The electronic camera according to claim 19, wherein said dimming control is effected by control of emission time of said flash emission means.

21. The electronic camera according to claim 19 further comprising a photometry means, said dimming control being effected based on detection of a predetermined-emission amount by direct photometry of said photometry means.

22. The electronic camera according to claim 19, wherein said dimming control is effected based on measurement and detection of a predetermined voltage at the charge storage means.

23. The electronic camera according to claim 19, wherein, when dimming is to be effected of the flash emission means at the second shot of picture taking, an emission amount of light from the flash emission means at the first shot of picture taking is measured and an emission amount under dimming control of the flash emission means at the second shot is set based on the measured emission amount so as to correspond to a previously set emission amount ratio of the flash emission means between the two shots of picture taking.

24. The electronic camera according to claim 23 further comprising a photometry means, the emission amount of the flash emission means at the first shot of picture taking being measured by direct photometry of said photometry means.

25. An electronic camera according to claim 23, wherein the emission amount of the flash emission means at the first shot of picture taking is obtained by a voltage measurement at said charge storage means.

26. The electronic camera according to claim 1, wherein emission amounts of said flash emission means are measured to obtain an emission amount ratio based on the emission amount, the exposure amount ratio by normal light being set as the same as the emission amount ratio.

27. The electronic camera according to claim 26, wherein the emission amount ratio is obtained by measuring an emission amount of the flash emission means at the first shot of picture taking and by computing a second emission amount by calculation based on the first emission amount.

28. The electronic camera according to claim 27 further comprising a photometry means for measuring an emission amount of said flash emission means based on direct photometry by said photometry means.

29. The electronic camera according to claim 27, wherein an emission amount of said flash emission means is obtained by a voltage measurement at said charge storage means.

30. The electronic camera according to claim 26, wherein the emission a mount ratio is obtained by measuring emission amounts of the flash emission means at the first and second shots of picture taking.

31. The electronic camera according to claim 30 further comprising a photometry means for measuring an emission amount of said flash emission means based on direct photometry by said photometry means.

32. The electronic camera according to claim 30, wherein an emission amount of said flash emission means is obtained by a voltage measurement at said charge storage means.

33. The electronic camera according to claim 26 further comprising a photometry means for measuring an emission amount of said flash emission means based on direct photometry by said photometry means.

34. The electronic camera according to claim 26, wherein an emission amount of said flash emission means is obtained by a voltage measurement at said charge storage means.

35. The electronic camera according to claim 1, wherein said flash emission means comprises one xenon emission tube and one charge storage means and is caused to emit at the two shots of picture taking by using the one xenon emission tube and the one charge storage means.

36. The electronic camera according to claim 35, wherein said charge storage means comprises one main capacitor.

37. The electronic camera according to claim 35, wherein said charge storage means comprises a plurality of main capacitors connected in parallel.

38. The electronic camera according to claim 1, wherein said flash emission means comprises one xenon emission tube, a plurality of charge storage means and charge storage means switching means and is caused to emit at the two shots of picture taking by using the one xenon emission tube and at least one of the charge storage means switched and selected by the charge storage means switching means.

39. The electronic camera according to claim 38, wherein said charge storage means comprises one main capacitor.

40. The electronic camera according to claim 38, wherein said charge storage means comprises a plurality of main capacitors connected in parallel.

41. The electronic camera according to claim 1, wherein said flash emission means comprises a plurality of xenon emission tubes, one charge storage means and xenon emission tube switching means and is caused to emit at the two shots of picture taking by using at least one xenon emission tube switched and selected by said xenon emission tube switching means and the one charge storage means.

42. The electronic camera according to claim 41, wherein said charge storage means comprises one main capacitor.

43. The electronic camera according to claim 41, wherein said charge storage means comprises a plurality of main capacitors connected in parallel.

44. The electronic camera according to claim 1, wherein said flash emission means comprises a plurality of xenon emission tubes, a plurality of charge storage means, xenon emission tube switching means and charge storage means switching means and is caused to emit at the two shots of picture taking by using at least one xenon emission tube switched and selected by said xenon emission tube switching means and at least one charge storage means switched and selected by the charge storage means switching means.

45. The electronic camera according to claim 44, wherein said charge storage means comprises one main capacitor.

46. The electronic camera according to claim 44, wherein said charge storage means comprises a plurality of main capacitors connected in parallel.

47. The electronic camera according to claim 1, wherein each emission of the flash emission means at the two shots of picture taking is effected as a single emission.

48. The electronic camera according to claim 1, wherein the respective emissions of the flash emission means at the two shots of picture taking are effected either as one unit emission and a collection of a plurality of times of unit emission or each as a collection of a plurality of times of unit emission.

49. The electronic camera according to claim 1, wherein the respective emissions of the flash emission means at the two shots of picture taking are effected as a smaller emission and a larger emission in that order.

50. The electronic camera according to claim 1 further comprising range finding means, an emission of said flash emission means being controlled to an optimum emission amount corresponding to a distance information obtained by said range finding means.

51. The electronic camera according to claim 50, wherein the emission to be controlled correspondingly to said distance information is a smaller emission.

52. The electronic camera according to claim 1 further comprising pre-photometry means, an emission of said flash emission means being controlled by using a pre-photometry information obtained by said pre-photometry means.

53. The electronic camera according to claim 52, wherein said pre-photometry means comprises external photometry means.

54. The electronic camera according to claim 52, wherein said pre-photometry means is used in common as said image pickup means.

55. The electronic camera according to claim 1 further comprising pre-photometry means, an emission of said flash emission means being controlled by using a pre-photometry information obtained at said pre-photometry means by causing a pre-emission of the flash emission means.

56. The electronic camera according to claim 55, wherein said pre-photometry means comprises external photometry means.

57. The electronic camera according to claim 55, wherein said pre-photometry means is used in common as said image pickup means.

* * * * *

UNITED STATES PATENT AND TRADEMARK OFFICE
CERTIFICATE OF CORRECTION

PATENT NO.    : 6,744,471 B1
DATED         : June 1, 2004
INVENTOR(S)   : Minoru Kakinuma et al.

It is certified that error appears in the above-identified patent and that said Letters Patent is hereby corrected as shown below:

The title page should be deleted to appear as per attached title page.

The sheets of drawings consisting of figures 1-31 should be deleted to appear as per attached figures 1-40.

Signed and Sealed this

Twenty-first Day of September, 2004

JON W. DUDAS
*Director of the United States Patent and Trademark Office*

(12) United States Patent
Kakinuma et al.

(10) Patent No.: US 6,744,471 B1
(45) Date of Patent: Jun. 1, 2004

(54) ELECTRONIC CAMERA THAT SYNTHESIZES TWO IMAGES TAKEN UNDER DIFFERENT EXPOSURES

(75) Inventors: Minoru Kakinuma, Hachioji (JP);
Hidetoshi Fukuda, Yokohama (JP);
Hiroaki Koseki, Kokubunji (JP);
Osamu Inagaki, Hachioji (JP);
Kuniaki Saito, Tokorozawa (JP)

(73) Assignee: Olympus Optical Co., LTD, Tokyo (JP)

( * ) Notice: Subject to any disclaimer, the term of this patent is extended or adjusted under 35 U.S.C. 154(b) by 0 days.

(21) Appl. No.: 09/204,276

(22) Filed: Dec. 3, 1998

(30) Foreign Application Priority Data

Dec. 5, 1997 (JP) ............................................. 9-350185
Dec. 11, 1997 (JP) ............................................. 9-361661
Feb. 16, 1998 (JP) ............................................. 10-048594

(51) Int. Cl.$^7$ .......................... G03B 9/70; H04N 5/222; H04N 5/225
(52) U.S. Cl. ................. 348/371; 348/216.1; 348/218.1; 396/166
(58) Field of Search ................... 548/370, 371, 548/216.1, 217.1, 296, 218.1; 396/61, 160, 173, 322, 182; 382/159, 161, 166

(56) References Cited

U.S. PATENT DOCUMENTS

| | | | | |
|---|---|---|---|---|
| 4,467,248 A | * | 8/1984 | Watanabe et al. | 315/241 P |
| 4,647,975 A | * | 3/1987 | Alston et al. | 348/222.1 |
| 5,111,116 A | * | 5/1992 | Takeda | 315/241 P |
| 5,115,169 A | * | 5/1992 | Aoki | 315/241 R |
| 5,148,212 A | * | 9/1992 | Serikawa et al. | 396/61 |
| 5,282,042 A | * | 1/1994 | Yoshida et al. | 348/367 |
| 5,420,635 A | * | 5/1995 | Konishi et al. | 348/362 |
| 5,640,622 A | * | 6/1997 | Matsui et al. | 396/173 |
| 5,640,624 A | * | 6/1997 | Lee | 396/205 |
| 5,682,201 A | * | 10/1997 | Ogawa | 348/224.1 |
| 5,835,794 A | * | 11/1998 | Lo et al. | 396/4 |
| 5,946,035 A | * | 8/1999 | Suh | 348/371 |
| 6,195,127 B1 | * | 2/2001 | Sugimoto | 348/370 |
| 6,278,490 B1 | * | 8/2001 | Fukuda et al. | 348/362 |

FOREIGN PATENT DOCUMENTS

| | | | | |
|---|---|---|---|---|
| JP | 02100028 A | * | 4/1990 | ........... G03B/15/05 |
| JP | 02125573 | | 5/1990 | |
| JP | 02125573 A | * | 5/1990 | ........... H04N/5/225 |

(List continued on next page.)

*Primary Examiner*—Wendy R. Garber
*Assistant Examiner*—John M. Villecco
(74) *Attorney, Agent, or Firm*—Westerman, Hattori, Daniels & Adrian, LLP

(57) ABSTRACT

Disclosed herein is an electronic camera for generating an image having a wide dynamic range by synthesizing two image pickup signals of different exposure amount generated by using an electronic shutter function and means for shutting off light, shading of image pickup signals resulting from difference in charge accumulating time among the pixels of image pickup device due to operation from opened state to closed state of the means for shutting off light being corrected by a shading correction means to form a synthesized image without an occurrence of false color due to shading. Also provided is an electronic camera generating two image pickup signals of different exposure amount by two shots of picture taking each using a flash emission in combination, at least one of an electronic shutter of image pickup device and means for shutting off light, as well as an emission of the flash emission means, being controlled to equalize between the two shots of picture taking ratio of exposure by normal light excluding light from the flash emission means and ratio of emission amount by the light from the flash emission means so that the two image pickup signals can be readily generated as having a predetermined exposure amount ratio in every part of a frame of picture even when a flash emission is used in combination.

57 Claims, 31 Drawing Sheets